(12) United States Patent
Nowinski et al.

(10) Patent No.: US 7,647,096 B2
(45) Date of Patent: Jan. 12, 2010

(54) METHODS AND APPARATUS FOR CALCULATING AND PRESENTING THE PROBABILISTIC FUNCTIONAL MAPS OF THE HUMAN BRAIN

(75) Inventors: Wieslaw L. Nowinski, Singapore (SG); Dzmitry Bialou, Singapore (SG)

(73) Assignee: Kent Ridge Digital Labs, Singapore (SG)

( * ) Notice: Subject to any disclaimer, the term of this patent is extended or adjusted under 35 U.S.C. 154(b) by 1124 days.

(21) Appl. No.: 10/477,695

(22) PCT Filed: Feb. 18, 2002

(86) PCT No.: PCT/SG02/00023

§ 371 (c)(1),
(2), (4) Date: Jun. 7, 2004

(87) PCT Pub. No.: WO02/093292

PCT Pub. Date: Nov. 21, 2002

(65) Prior Publication Data

US 2004/0210124 A1    Oct. 21, 2004

(30) Foreign Application Priority Data

May 14, 2001  (SG) ............................. 200102872-9

(51) Int. Cl.
*A61B 5/0476* (2006.01)
*A61B 5/05* (2006.01)
*G06K 9/00* (2006.01)

(52) U.S. Cl. ..................... 600/544; 382/128; 600/407

(58) Field of Classification Search ............... 600/407, 600/409, 372–378, 416–417, 544–545, 300, 600/122, 383, 410; 607/145, 100, 75, 45
See application file for complete search history.

(56) References Cited

U.S. PATENT DOCUMENTS 34,015 A * 12/1861 Duffy .......................... 301/113

(Continued)

FOREIGN PATENT DOCUMENTS

DE        43 26 043 A1    4/1994

(Continued)

OTHER PUBLICATIONS

Thompson et al. High-Resolution Random Mesh Algorithms for Creating a Probabilistic 3D Surface Atlas of the Human Brain. (Neuroimage 3, 19-34 (1996)).*

(Continued)

*Primary Examiner*—Eric F Winakur
*Assistant Examiner*—Lawrence N Laryea
(74) *Attorney, Agent, or Firm*—Senniger Powers LLP

(57) ABSTRACT

The present invention proposes a method for calculating, presenting, and combining probabilistic functional maps (PFMs) of the human brain representing the probability of structures existing. The method comprises three major steps: reading of data containing the coordinates of contacts, calculating the PFMs, and presenting the PFMs. The data can be read from a file in text or binary format or from a database as local or remote client. The PFM calculation comprises the following steps: forming 3D models of contacts, normalizing the contact models, voxelizing the contact models, calculating an atlas function, and calculating the PFM. The PFM can be presented alone or along with anatomical atlases. Both 3D and 2D interfaces can be used for presentation. The proposed method also includes different ways of combining the contact data and/or existing PFMs from multiple sources. This mechanism is the basis of an internet portal for stereotactic and functional neurosurgery.

23 Claims, 63 Drawing Sheets

U.S. PATENT DOCUMENTS

| | | | | |
|---|---|---|---|---|
| 4,094,307 A | * | 6/1978 | Young, Jr. | 600/544 |
| 5,038,782 A | * | 8/1991 | Gevins et al. | 600/383 |
| 5,447,166 A | * | 9/1995 | Gevins | 600/544 |
| 6,067,467 A | * | 5/2000 | John | 600/544 |
| 6,330,466 B1 | * | 12/2001 | Hofmann et al. | 600/378 |
| 6,353,762 B1 | * | 3/2002 | Baudino et al. | 607/45 |
| 6,427,086 B1 | * | 7/2002 | Fischell et al. | 607/45 |
| 6,529,774 B1 | * | 3/2003 | Greene | 600/545 |

FOREIGN PATENT DOCUMENTS

| | | |
|---|---|---|
| EP | 0 477 434 B2 | 4/1992 |
| RU | 2 177 716 C2 | 1/2002 |
| WO | WO 01/03053 A1 | 1/2001 |

OTHER PUBLICATIONS

Thompson et al. A Surface-Based Technique for Warping Three-Dimensional Images of the Brain. IEEE Tra\s.actions on Medical Imaging, vol. 15, No. 4. Aug. 1996.*

Kikinis et al. A Digital Brain Atlas for Surgical Planning, Model-Driven Segmentation, and Teaching. IEEE Transactions on Visualization and Computer Graphics, vol. 2, No. 3, Sep. 1996.*

* cited by examiner

| Field Number | Field Content | Data Type | Field Type |
|---|---|---|---|
| 1 | Structure | Text | Text |
| 2 | | Text | Boolean |
| 3 | | Text | Numerical or Text |
| 4 | Patient | Text | Text |
| 5 | | Text | Boolean |
| 6 | | Text | Numerical or Text |
| 7 | | Text | Special |
| 8 | Electrode | Text | Text |
| 9 | | Text | Boolean |
| 10 | | Text | Numerical or Text |
| 11 | | Text | Numerical or Text |
| 12 | Contact | Text | Text |
| 13 | | Text | Boolean |
| 14 | | Text | Numerical or Text |

*Fig. 7*

| Field Number | Field Content |
|---|---|
| 1 | Structure |
| 2 | TRUE |
| 3 | S1, IDS1 |
| 4 | Patient |
| 5 | TRUE |
| 6 | P1, IDP1 |
| 7 | Trans, Trans' |
| 8 | Electrode |
| 9 | TRUE |
| 10 | type 1, active, E1, IDE1 |
| 11 | 2, D1, H1, G1 |
| 12 | Contact |
| 13 | TRUE |
| 14 | active, C1, IDC1, Parameters1, Co-ordinates1 |
| 12 | Contact |
| 13 | TRUE |
| 14 | active, C2, IDC2, Parameters2, Co-ordinates2 |
| 1 | Structure |
| 2 | FALSE |
| 3 | S2, IDS2 |

*Fig. 8(a)*

| Field Number | Field Content | Data Type | Field Type |
|---|---|---|---|
| 1 | Structure | Text | Text |
| 2 | | Boolean | Boolean |
| 3 | | Text and Numbers | Numerical or Text |
| 4 | Patient | Text | Text |
| 5 | | Boolean | Boolean |
| 6 | | Text and Numbers | Numerical or Text |
| 7 | | Transformation Type | Special |
| 8 | Electrode | Text | Text |
| 9 | | Boolean | Boolean |
| 10 | | Text and Numbers | Numerical or Text |
| 11 | | Text and Numbers | Numerical or Text |
| 12 | Contact | Text | Text |
| 13 | | Boolean | Boolean |
| 14 | | Text and Numbers | Numerical or Text |

*Fig. 9*

|   | a | b | c | d | e | f | g | h | i | j | k |
|---|---|---|---|---|---|---|---|---|---|---|---|
| 1 | Structure | | | | | | | | | | |
| 2 | Unique Index ◄ | enabled | name | ID | ... | | | | | | |
| 3 | ... | ... | ... | ... | ... | | | | | | |
| 4 | Patient | | | | | | | | | | |
| 5 | Unique Index ◄ | structure | enabled | name | ID | Transformations T and T' | | | | | |
| 6 | ... | ... | ... | ... | ... | ... | | | | | |
| 7 | Electrode | | | | | | | | | | |
| 8 | Unique Index ◄ | Patient | Enabled | Type | Status | ID | number of contacts | diameter | height | gap | ... |
| 9 | ... | ... | ... | ... | ... | ... | ... | ... | ... | ... | ... |
| 10 | Contact | | | | | | | | | | |
| 11 | Unique Index | Electrode | Enabled | Status | Name | ID | parameters | co-ordinates | | | |
| 12 | ... | ... | ... | ... | ... | ... | ... | ... | | | |

*Fig. 10*

METHODS AND APPARATUS FOR CALCULATING AND PRESENTING THE PROBABILISTIC FUNCTIONAL MAPS OF THE HUMAN BRAIN

FIELD OF INVENTION

The present invention relates to methods, systems and software for calculating, presenting, and exploiting probabilistic functional maps of the human brain.

BACKGROUND OF THE INVENTION

The present inventor has developed an electronic brain atlas database [8]. There is a strong commercial interest in this database, particularly, for functional neurosurgery and the atlases have already been integrated with several commercial systems. There are two major problems associated with the current electronic brain atlas database. First, the atlases are constructed based on a few brains only. Second, these atlases are anatomical, while the actual stereotactic targets are functional. The present invention seeks to overcome both limitations and opens new possibilities, particularly, in providing a community-centric approach in stereotactic and functional neurosurgery.

During surgical procedures, such as the treatment of Parkinson's disease, electrodes (or "microelectrodes"; in this document the term "electrodes" will be used to include microelectrodes) are inserted into the patient's brain to map it in order to identify stereotactic targets. This brain mapping is able to locate the functional position of cerebral structures. The electrodes used for stereotactic and functional procedures contain one or more contacts and these contacts, while being placed within a given structure in the brain, are activated. By knowing the coordinates of the activated contacts and their size and electrophysiological properties, the activated region within the studied structure can be determined. Several electrodes may be inserted into the patient's brain during surgery, either unilaterally or bilaterally, providing information about functional location of cerebral structures for a patient treated or subject studied. By collecting the data from numerous patients, it is possible to construct probabilistic maps showing functional distribution of cerebral structures in a human brain. These functional probabilistic maps have great importance in treatment, particularly in surgery of movement disorders and in brain research.

SUMMARY OF THE INVENTION

In general terms, the present invention proposes a method for calculating, presenting, and combining the probabilistic functional maps of human brain. The method comprises three major steps: reading of data containing the coordinates of contacts, calculating probabilistic functional maps (PFM), and presenting probabilistic functional maps.

Specifically, the invention proposes a method for obtaining and presenting a functional distribution of brain structures, the method comprising:

obtaining contact data specifying the locations within the brains of a plurality of individuals of active electrical contacts which detect a structure;

using a model of a shape associated with each active contact and in a common space for the individuals, to calculate a probability function which indicates the space density of the active contacts; and presenting a representation of the calculated probability function.

The respective shape associated with each of the contacts may be the actual shape of that contact, but the invention is not limited in this respect, since the shape may alternatively be a different shape, such as one selected to take into account electrical properties of the contact (used for measuring the electrophysiological properties of the brain).

The probability function will generally be referred to here as a "probabilistic functional map" (or PFM). The PFM calculation is preferably preformed based on an array of "volume elements" (or "voxels"). It may comprise the following steps: forming 3D models of contacts, normalizing the contact models (i.e. the models are transformed into the common space, which may be by any one-to-one transformation, including linear scaling, to compensate for differences between patients), voxelizing the contact models (that is, finding the effect of each contact on each voxel), calculating an "atlas function" representing the number of active contacts associated with each voxel, and calculating the PFM.

Two approaches are proposed to voxelize the contact model: continuous and discrete. The continuous approach is much more accurate but slower than the discrete approach.

The original atlas function, calculated from the contact data, is generally a three-dimensional array of voxels each having a "value", where the voxel value indicates the density of active contacts within this voxel. The generation of the probability function from the atlas function may include a smoothing of the atlas function. In a first case, the smoothing may be by a process referred to here as reconstruction, in which the atlas function is treated as a set of samples from a continuous distribution which is then inferred. A different smoothing technique is atlas smoothing (such as, but not limited to, smoothing surfaces of structures), which may be by a process referred to here as anti-aliasing. This smoothing can be done on-the-fly or post-processed.

As explained in detail below, there are many ways in which the PFM can be graphically represented. In particular, it can be presented alone or together with patient-specific image data and/or anatomical atlases.

The proposed method also includes different ways of combining the contact data and/or existing PFMs from multiple sources. Three scenarios are proposed: two PFMs are combined, PFM is combined with contact data, or two sets of contact data are combined. This combination mechanism can be done recursively allowing many neurosurgeons to merge their data, create the combined probabilistic functional maps, and use them for more accurate targeting. This mechanism is the basis of an internet portal for stereotactic and functional neurosurgery.

Although the invention has been described above in terms of a method, all aspects and all preferable features may equivalently be expressed as a computer device having a processor arranged to carry out a method according to the invention, or a computer program product containing computer program instructions readable by a computer device to cause the computer device to carry out the method.

BRIEF DESCRIPTION OF THE DRAWINGS

Embodiments of the invention will now be described for the sake of example only.

FIG. 7 defines the text format of a data file used in the embodiment.

FIG. 8(a) presents an example of data in text format.

FIG. 9 defines the binary format of the data file.

FIG. 10 shows the database structure.

FIG. 18(b) shows the resulting atlas calculated for the data from FIG. 18a.

FIG. 37(a) shows synchronization between Parameters and other windows. Option Show reconstructed atlas is switched on.

DETAILED DESCRIPTION OF THE EMBODIMENT

1. Introduction

Figure 1A:
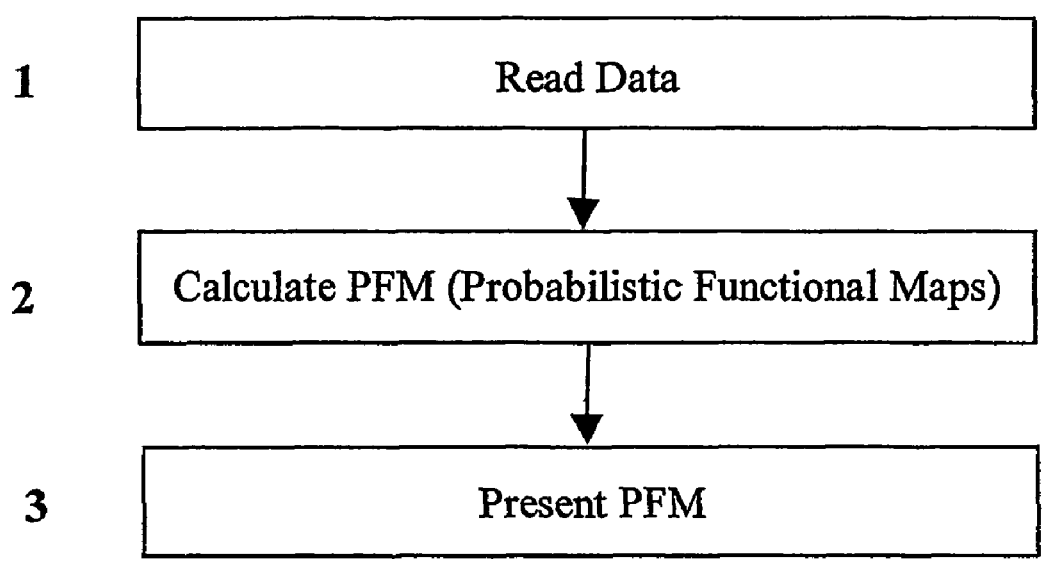
FIG. 1(a) is a flowchart showing the major steps in an embodiment of the method according to the invention.

FIGS. 1(a)-(i) and 2(a)-(d) illustrate in conceptual terms a method which is an embodiment of the present invention. The method comprises three major steps: data reading, calculating probabilistic functional maps (PFM), and presenting probabilistic functional maps. These are shown as the steps of FIG. 1(a).

Figure 1B:
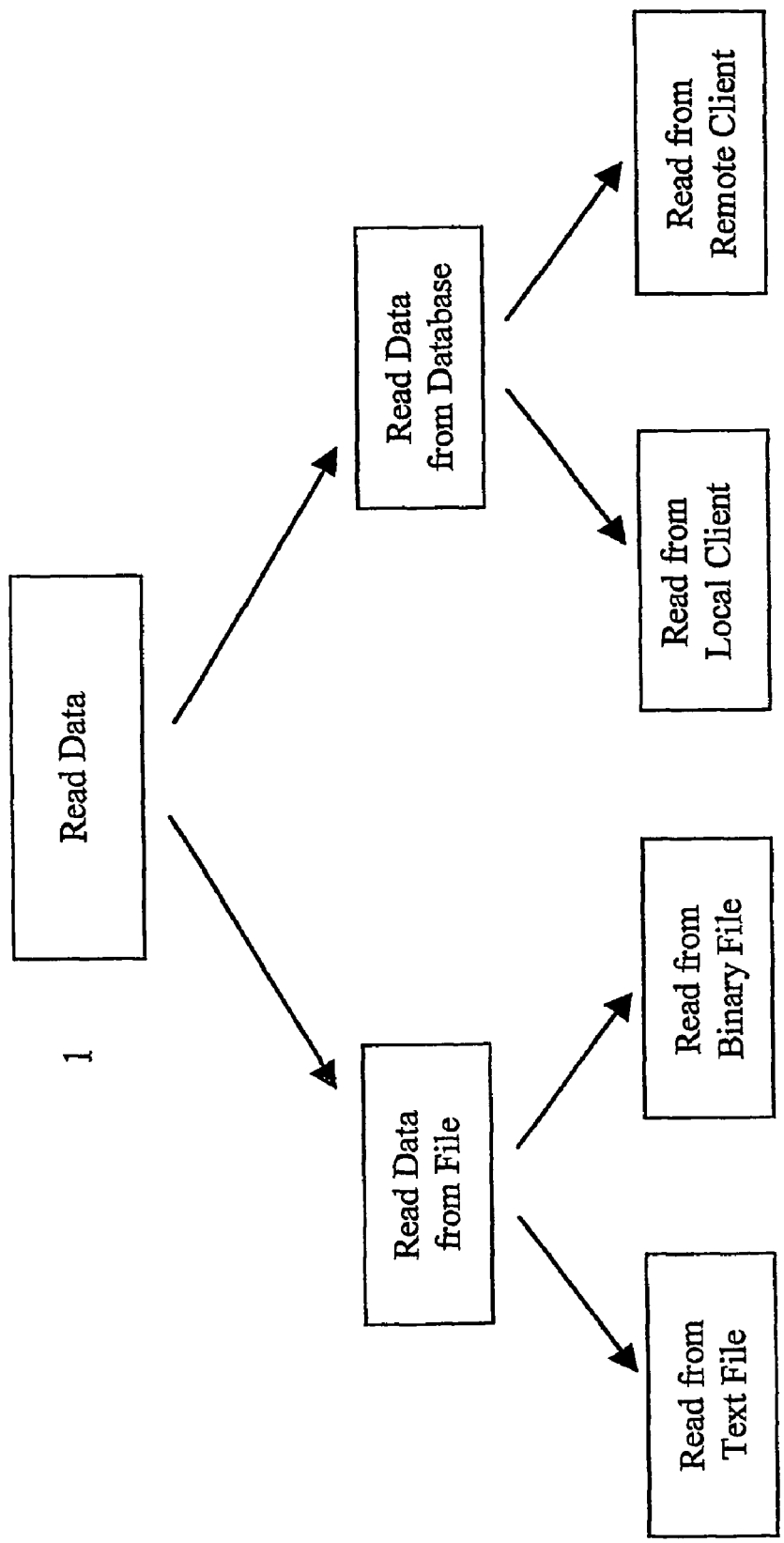
FIG. 1(b) is a flowchart showing the detailed steps for data reading.

First, the data containing information on brain mapping are read (step 1). These data contain, among other information, the coordinates of the active contacts, i.e. contact positions of electrodes within tested structures, as described below with reference to FIG. 3. The data can be read from a file in text or binary format or from a database as a local or a remote client. This tree of options is illustrated in FIG. 1(b).

Figure 1C:
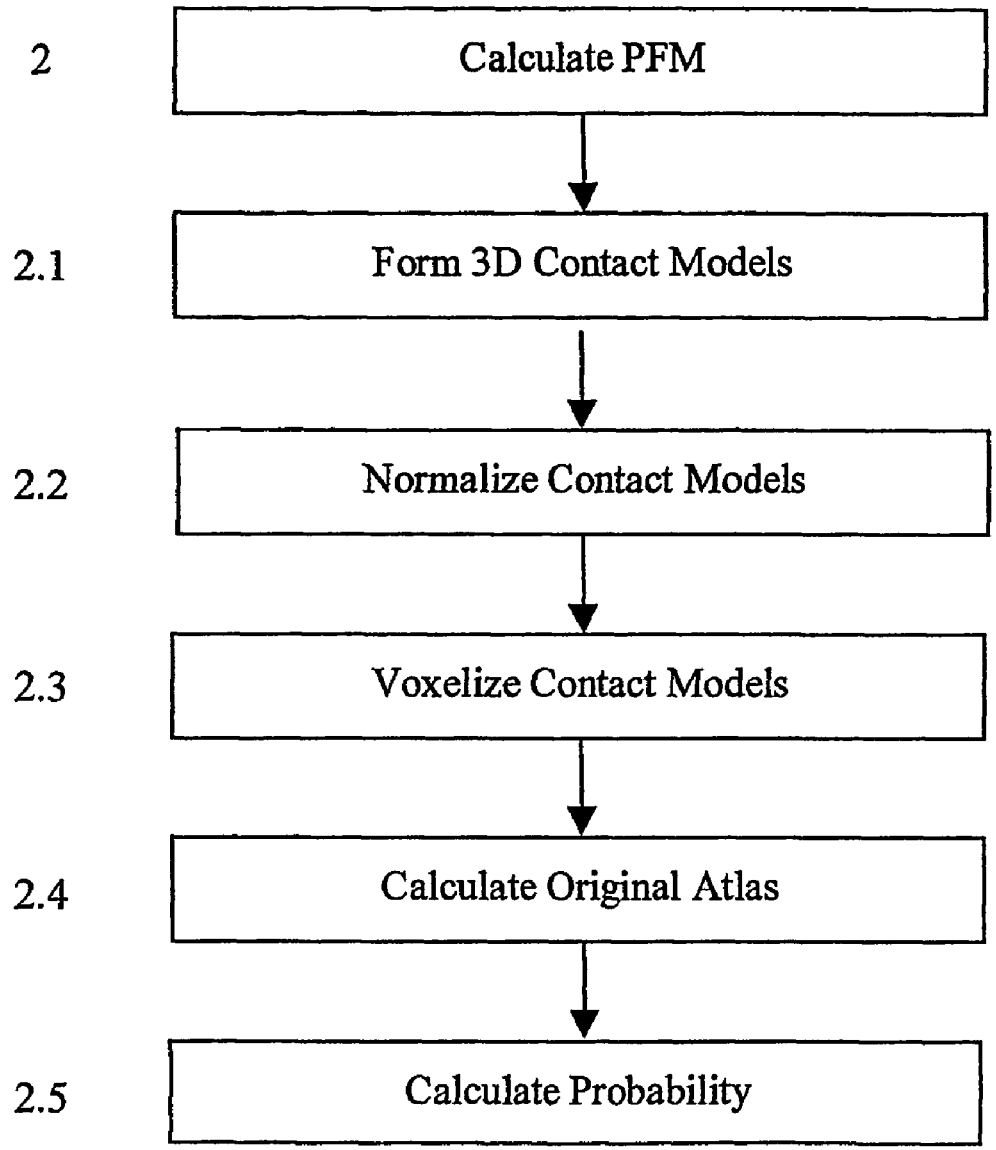
FIG. 1(c) is a flowchart showing the detailed steps for the PFM calculation.

The PFM calculation (step 2) comprises the following detailed steps: forming 3D models of the contacts, normalizing the contact models, voxelizing the contact models, calculating the original atlas, and calculating probability. These steps are shown in FIG. 1(c).

Figure 1D:
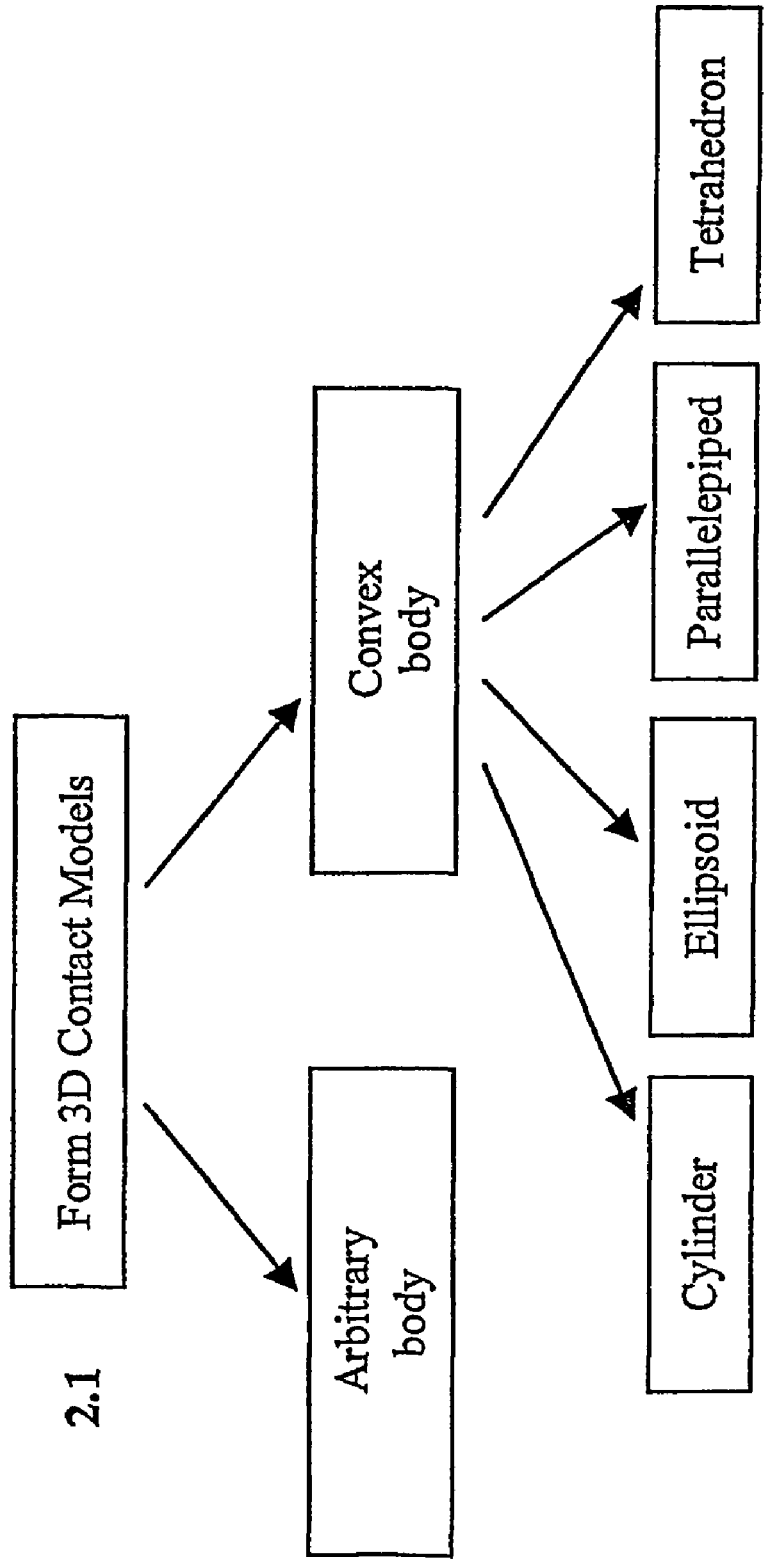
FIG. 1(d) is a flowchart showing the detailed steps for forming 3D contact models.
Figure 1E:
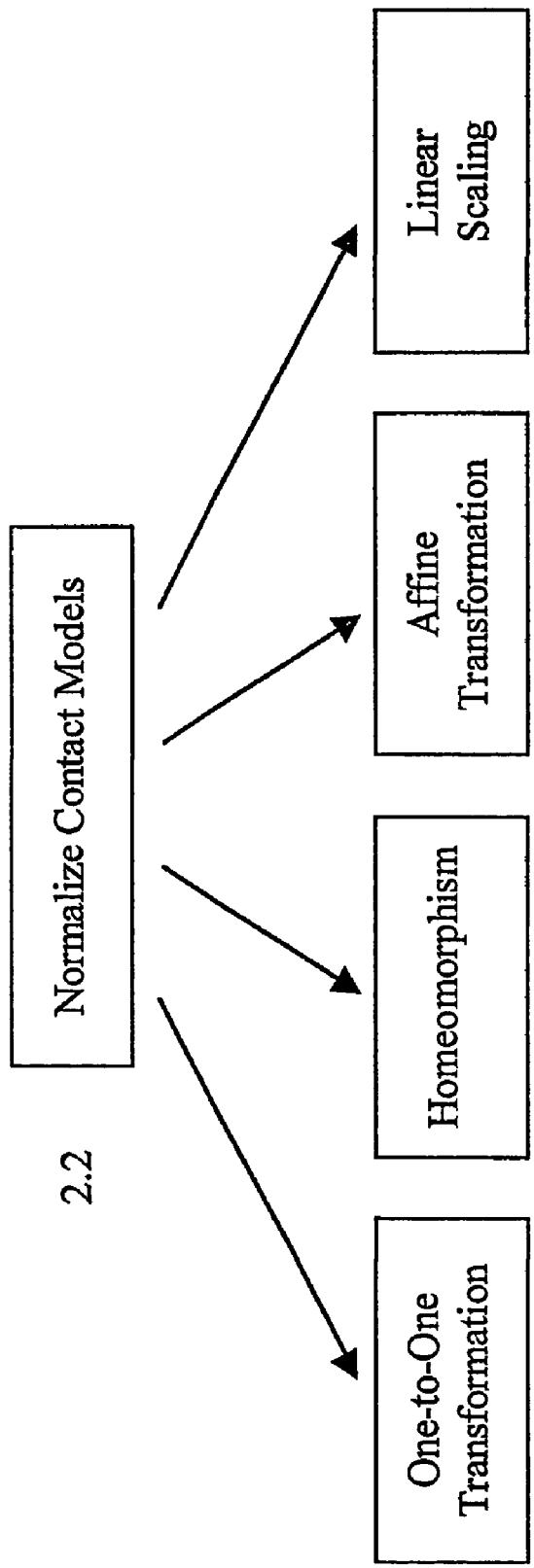
FIG. 1(e) is a flowchart showing alternative ways for contact model normalization.
Figure 1F:
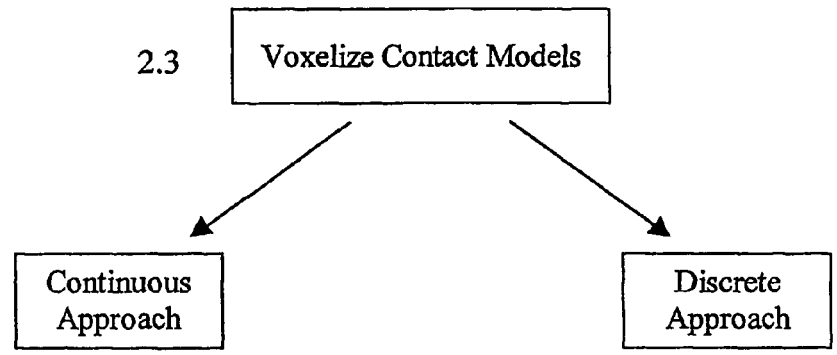
FIG. 1(f) is a flowchart showing two approaches for contact model voxelization.
Figure 1G:
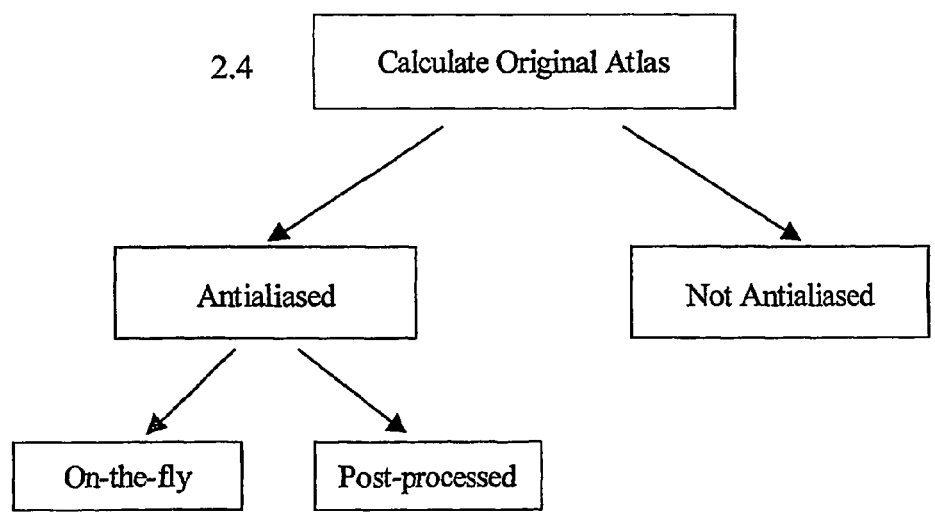
FIG. 1(g) is a flowchart showing the detailed steps for original atlas calculation.
Figure 1H:
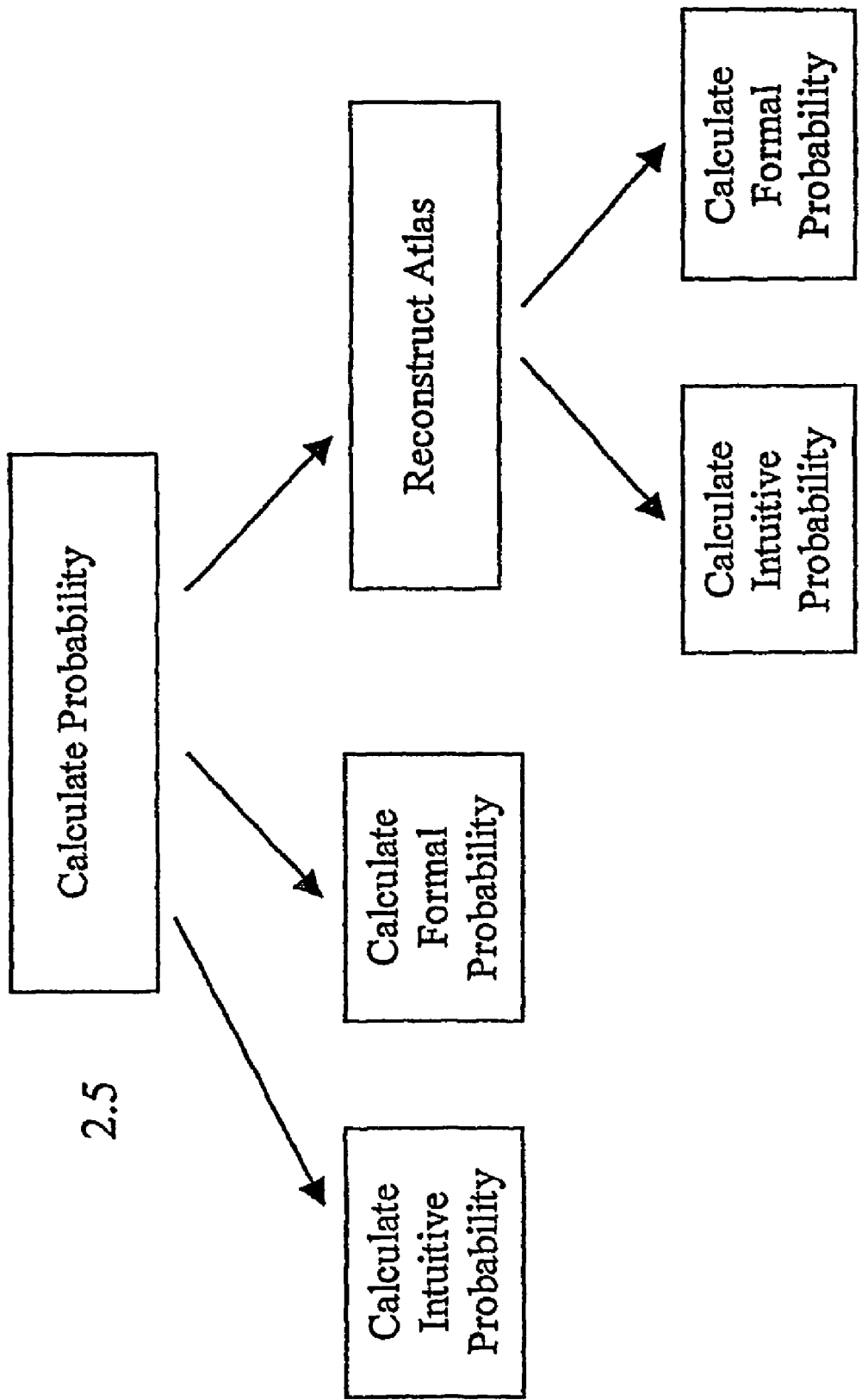
FIG. 1(h) is a flowchart showing the detailed steps for probability calculation.
Figure 1I:
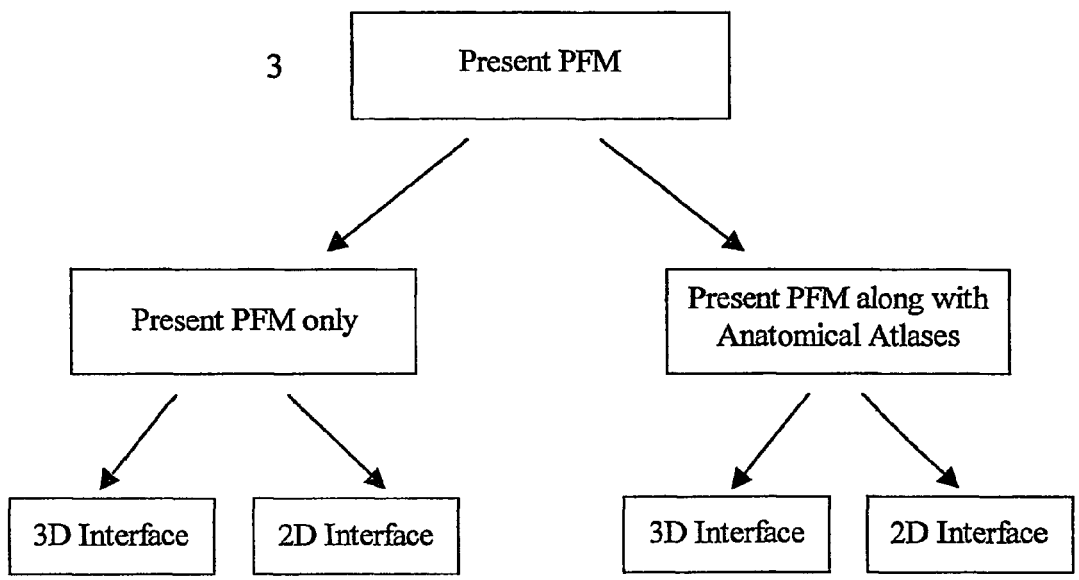
FIG. 1(i) is a flowchart showing the detailed steps for PFM presentation.

The 3D contact model can be an arbitrary body or a convex body, in particular, a cylinder, ellipsoid, parallelepiped, or tetrahedron. This array of options is shown in FIG. 1(d). The data are collected for a specific patient. In order to build a probabilistic map across the whole population, the patient-specific data is normalized and placed in a common space where different brains can be compared. This space is here called the "atlas space". Therefore, the 3D contact models are normalized and placed in the atlas space. The operation used for contact normalization can be a one-to-one transformation, homeomorphism, affine transformation, or linear scaling, an array of options shown in FIG. 1(e). Two approaches are proposed to voxelize the contact model: continuous and discrete, an array of options shown in FIG. 1(f). The continuous approach is much more accurate but slower than the discrete approach. The original atlas, calculated from the contact data, is a three-dimensional array of voxels, each voxel having a voxel value which determines the density of contacts within this voxel. This atlas can additionally be antialiased, and antialiasing can be done on-the-fly or post-processed, FIG. 1(g). If the contact data are sparse, the original atlas, calculated directly from the contact data, may have discontinuities. By treating the original atlas as a set of samples, the atlas can be smoothly reconstructed from these samples prior to probability calculation. The probability of the original or reconstructed atlas can be calculated by using intuitive approaches or formal methods, an array of options shown in FIG. 1(h). The PFMs can be presented and used in numerous ways (major step 3). The PFM can be presented alone or along with the anatomical atlases. Both 3D and 2D interfaces can be used for PFM presentation, options shown in FIG. 1(i).

The proposed method also includes various ways of combining the contact data and/or existing PFMs from multiple sources. Three basic scenarios are covered by this invention: two PFMs are combined (FIG. 2(a)), one PFM is combined with contact data (FIG. 2(b)), or two sets of contact data are combined (FIG. 2(c)). This combination mechanism can be done recursively allowing many neurosurgeons to merge their data, create the combined probabilistic functional maps, and use them for more accurate targeting (FIG. 2(d)). This mechanism is the basis of an internet portal for stereotactic and functional neurosurgery.

2. Definitions

The present text uses the following definitions:
1. Space or atlas space. All results are calculated and presented in three-dimensional (3D) space but they are also valid for any finite-dimensional space as well. Any point or vector with coordinates x, y, and z in this space is denoted by (x,y,z).
2. Structure. A Structure is a part of human brain for which its functional distribution is calculated in the atlas space. A structure is modeled as an arbitrary restricted set of points in the space, which means that volume of such set is constrained.
3. Electrode. An Electrode is a probe inserted into the brain, being able to collect the data
4. Contact. A Contact is a part of electrode being able to measure signals from the brain. A Contact is treated as a restricted set of points, such that we can uniquely determine membership of any point relative to this set (i.e. whether any given point is within a contact or not). In the embodiment described here each Contact is modeled as a cylinder, however, in general this invention does not limit the model of the contact, and any contact may for example be an ellipsoid, parallelepiped, tetrahedron, or ball.
5. Active contact. An Active contact is a contact which detects the structure. One option in the embodiment is to ignore (i.e. treat as inactive) all contacts of any given electrode other than the one which is most clinically active. Alternatively, all contacts having an activity above a predetermined or selectable activity level may be treated as active. Geometrically, an active contact has an intersection with the studied structure.
6. Active electrode. An attribute of that electrode inserted into the brain which detects the studied structure. An electrode is active if any of its contacts is active, and passive if and only if all its contacts are passive.
7. Atlas function. An Atlas function is any function that characterizes spatial density of active contacts. The atlas function value in point (x,y,z) is denoted by function a(x,y,z).
8. Atlas. An atlas is a voxelised version of an atlas function.
9. A probabilistic functional map (PFM) is a function of the atlas function. It is generally in the range 0 to 1.
10. Best atlas target. Best atlas target is the subset of a given structure where the atlas function has the maximum value.

Figure 3:
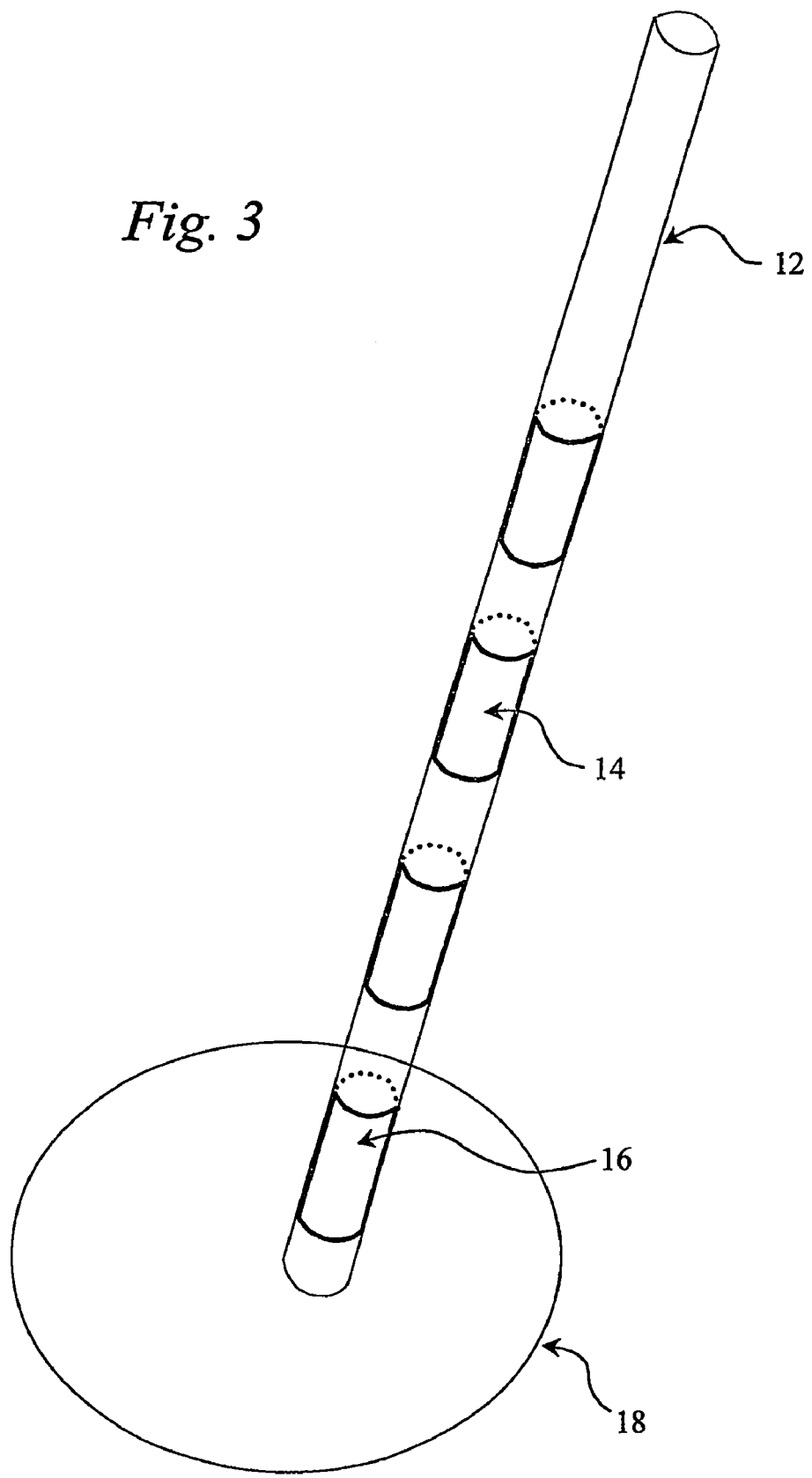
FIG. 3 illustrates a typical four-contact electrode used for brain mapping inserted into a structure.
Figure 4:
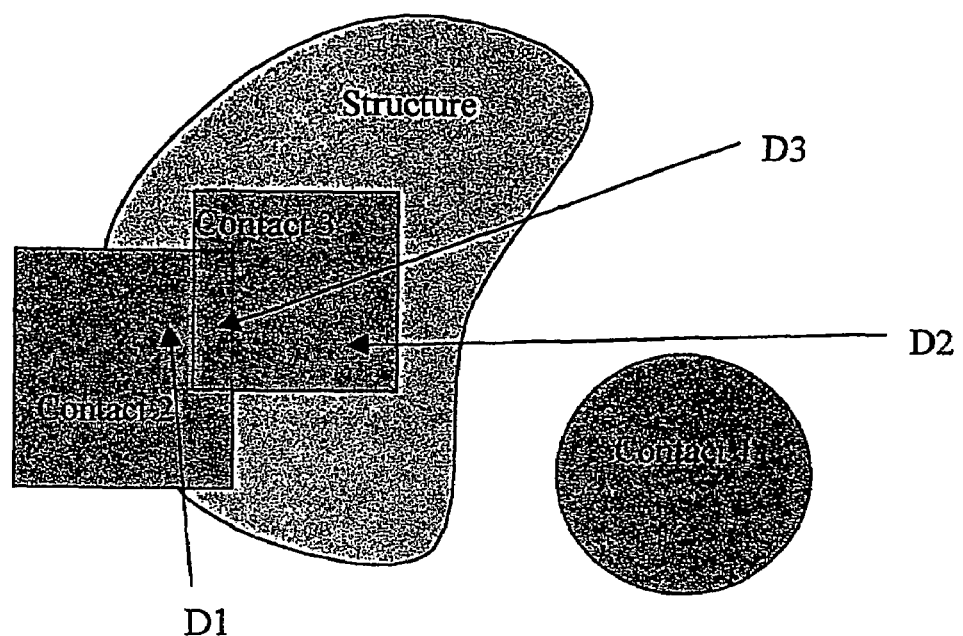
FIG. 4 illustrates the calculation of the probabilistic functional maps for a single structure from three contacts with different locations with respect to this structure.

FIGS. 3 and 4 will now be used to explain the definitions of a number of terms used in this text. A possible elongate single electrode 12 is shown FIG. 3. The electrode 12 touches a structure 18 at its lower end. In FIG. 3 the electrode is shown as having four cylindrical contacts, such as those shown as 14 and 16.

The calculation of the PFMs in a two-dimensional (2D) case is illustrated in FIG. 4. In FIG. 4 three contacts are shown: contact 1 is a circle, and contacts 2 and 3 are respective rectangles. In FIG. 4, contact 1 does not intersect with the structure, so it is not active. Contact 2 intersects with the structure in the volume marked as D1. Contact 3 intersects with the volume in the area marked as D2. Thus, both of Contacts 1 and 2 are active. The intersection between D1 and D2 is marked as D3. In domains D1, D2, the atlas function value equals to 1, in D3 its value is 2, and in the rest of the space its value equals to 0, where each value characterizes space density of the active contacts. Domain D3 is the best atlas target, as the maximum value of the atlas function is there.

3. Reading Data

The concept of PFMS, and the definition of them above, can be exploited in several ways. First, for some initial data, the core PFMs can be calculated and made available to the neurosurgical and brain mapping communities. Second, the neurosurgeon can use it remotely to calculate the individual PFM for his/her own data Third, the neurosurgical community can remotely contribute data to be stored in a central database and combined together. Based on these multi-center data, the combined PFM can be calculated. Finally, the neurosurgeon can remotely combine his/her data with the data of some other (selected) neurosurgeons available in the database and calculate the individual combined PFM.

The data reading step accounts for all these scenarios and the fact that the data can be read from a file or database.

During the brain mapping procedure, the data are collected for every studied cerebral structure. For a given structure, the list of names (patients, subjects) is given, and for each name the active electrodes along with the coordinates of their active contacts are provided.

3.1 Data Representation

Figure 5:
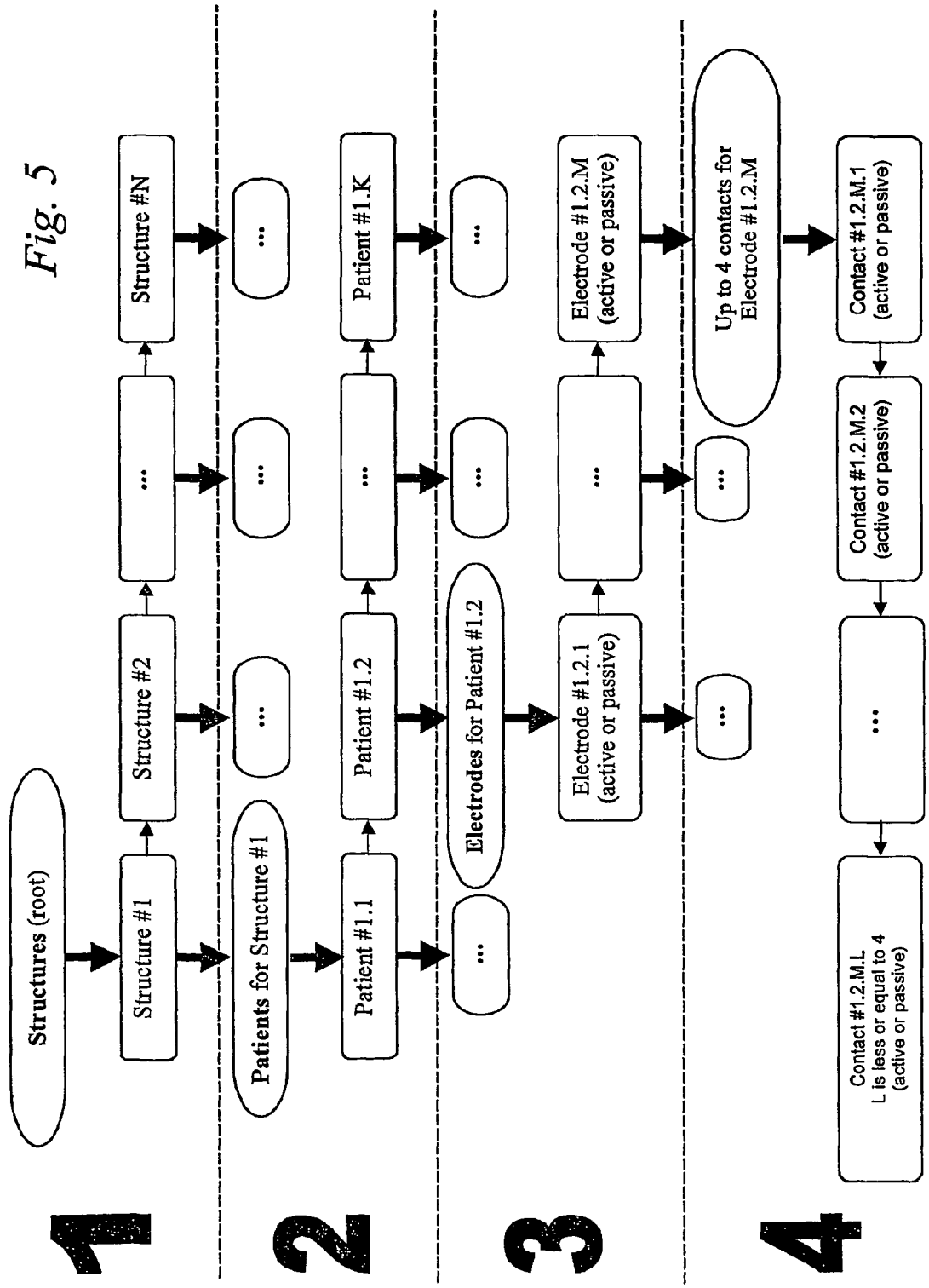
FIG. 5 defines the tree structure of the brain mapping data from which the probabilistic functional maps are constructed.

The brain mapping data from which the PFM are calculated, are represented as a (hierarchical) tree structure, see FIG. 5. The levels of this hierarchy respectively contain the following:

1. First level (the root of tree) is the list of studied structures. Each element of this list contains a structure identifier. In FIG. 5 the number of structures is denoted by N.
2. Second level is, for each of the studied structures, a list of patients (subjects) for which the data are collected for that structure. Each element of the list contains a patient (subject) identifier. In FIG. 5, the number of patients for structure 1 is denoted by 1.K.
3. Third level is, for each patient, the list of electrodes for that patient. Each element of this list contains the identifier of an electrode, and its type and status, i.e., active or passive (not active). Type of electrode uniquely identifies its geometry along with the contacts including the diameter of electrode, number of contacts, contact height, and gap between contacts. In FIG. 5 the number of electrodes for patient 1.2 (i.e. the second patient for structure 1), is labeled 1.2.M.
4. Fourth level (the leaves of tree) is the list of contacts for a given electrode. Each element of this list contains the contact identifier, and its coordinates and status (active, passive). For current electrodes, the number of contacts for each electrode is a maximum of 4, but the present invention is not limited in this respect since newer and future electrodes may have more than 4 electrodes. Specifically, in FIG. 5 the number of contacts for electrode 1.2.M (i.e. the M-th electrode for patient 2 or feature 1) is referred to as 1.2.M.L.

In order to calculate the PFM, the complete tree can be used or, alternatively, any selected subtree containing data of interest. For this purpose, each node of the tree (Structure, Patient, Electrode, or Contact) has a special flag called "enabled" (with values true or false). If some node is enabled (true) then all nodes from its subtree, relating to a part of the brain which is being studied, will be taken into account during atlas function calculation.

3.2 Reading Data From File

When the data is read from a file, the format of data file should take into account the following factors:

1. The Time taken to read the data should preferably be minimized.
2. The Size of the file should preferably be minimized.
3. The Preparation and editing of the data file should be preferably facilitated.

Figure 6:
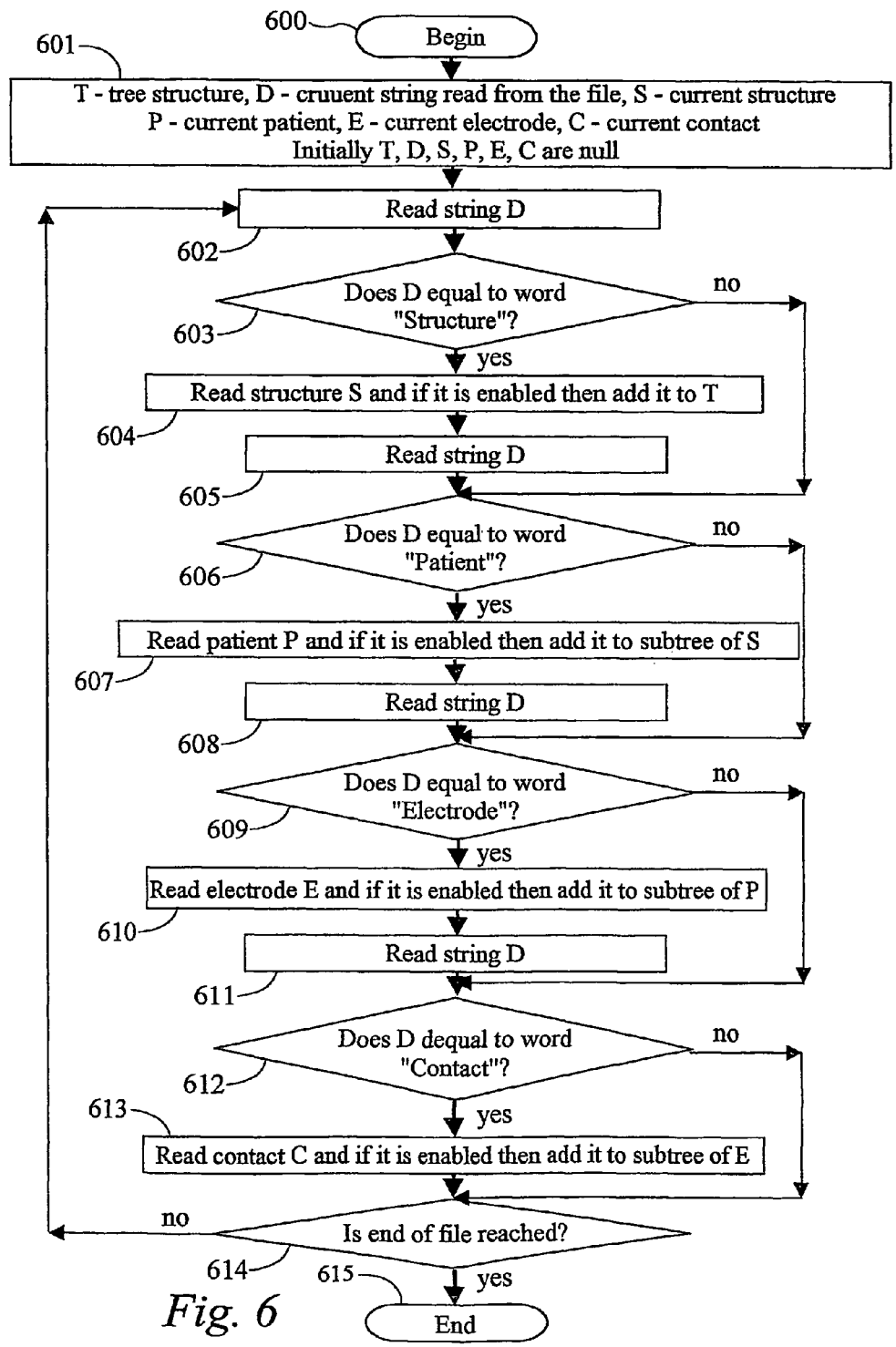
FIG. 6 is a flowchart of the algorithm used by the embodiment for data reading from data file.

In the embodiments discussed here, two file formats are exploited: text format and binary format. For either case, FIG. 6 is a flow diagram of an algorithm for constructing a tree T according to FIG. 5 from the series of strings constituting the data file. The algorithm of FIG. 6 is equally applicable to adding the new data file to an existing tree according to FIG. 5.

The flowchart of FIG. 6 begins in step 600. As shown in FIG. 6, the series of strings (records) is accessed (step 601), and the strings D of the data file are read consecutively from the data file (step 602). In each case, it is determined whether the current string D identifies a "structure" (step 603), and if so (and the read "structure" is "enabled"), the "structure" is added to the tree of FIG. 5 (step 604). If it is not a structure, it is determined whether the string D identifies a "patient" (step 606), and if so (and the read "patient" is "enabled"), the "patient" is added to the tree T of FIG. 5 (step 607). If it is not a structure or a patient, it is determined whether the string D identifies an "electrode" (step 609), and if so (and the read "electrode" is "enabled"), the "electrode" is added to the tree T of FIG. 5 (step 610). If it is not a structure, a patient nor an electrode, it is determined whether the string D identifies an "contact" (step 612), and if so (and the read "contact" is "enabled"), the "contact" is added to the tree T of FIG. 5 (step 613).

Thus, a string which corresponds to any element of the tree T can be read from the file and added to the tree structure only if that element is enabled. Each element S, P, or E (Structure, Patient, Electrode) added to the tree becomes the root of its own subtree, i.e. having a hierarchy descending from it down to level 4 (that is, the level of the Contacts C).

3.2.1. Text Format of the Data File

The table of FIG. 7 illustrates a text format data file suitable for use in the embodiment. This data file consists of a series of fields. The first column of the table numbers the fields of the data file (certain rows of the table are left blank for ease of reading, though the data file itself shows no such blanks). The second column of the table ("field content") explains the meaning of the corresponding field. The third column shows the type of data provided in the corresponding field (in all cases this is text, since this data file is a text file). The fourth and final column of the table gives the type of information which is specified by the corresponding field. For example, table 2 stores a Boolean value, represented as text. Rows 1-3 relate to structures, rows 4 to 7 relate to patients for whom this structure has been investigated, rows 8 to 11 relate to an electrode used for this patient. Rows 12 to 14 relate to a contact for this electrode.

Specifically, information about the structure starts in field 1. Field 2 indicates whether the structure is enabled or disabled for reading and processing. Field 3 is information about the structure (its name, ID, etc). Information about the current patient begins in field 4. Field 5 indicates whether the patient is enabled or disabled. Field 6 gives information about the patient (name, ID, etc). Field 7 gives the appropriate space transformation T for the patient, and its inverse T'. Information about the current electrode begins in field 8. Field 9 indicates whether the electrode is enabled or disabled. Field 10 gives information about the electrode (type, status (active or passive), name, ID, etc). Field 11 gives information about the contacts of the electrode (number, diameter, height, gap). Information about the current contact begins in field 12. Field 13 indicates if the contact is enabled or disabled. Field 14 is information about the contact (status (active or passive), name, ID, parameters, coordinates, etc).

This format gives the following effects:
1. The Data reading time is not minimized, since substantial time is needed for transformation from text to numerical formats.
2. The File size is not minimized, since more space is required to keep numerical data as text.
3. File preparation and editing are facilitated.

Figure 8B:
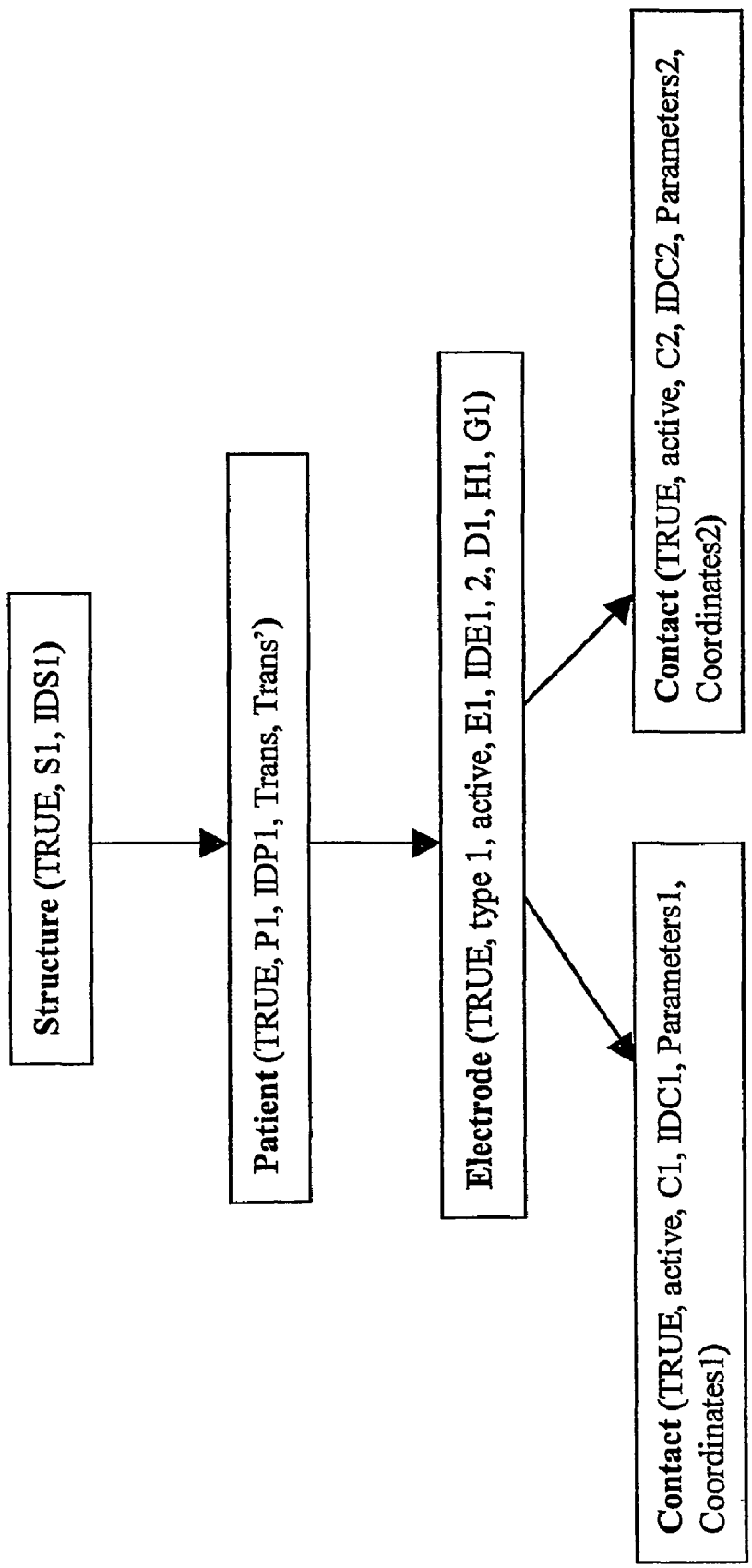
FIG. 8(b) shows the resultant tree structure.

FIG. 8(*a*) shows an example of a text file according to FIG. 7. The left column of the table is numbering of the field corresponding to the left column of FIG. 7, and the right column of the table is the content of the corresponding field.

FIG. 8(*b*) shows the resultant tree structure for the structure specified by the top row of the table of FIG. 8(*a*), constructed from this file. The data relating to this structure includes two active contacts, so rows 12 to 14 are present twice. Note that the table of FIG. 8(*a*) contains also (at the bottom) the first three rows of a different structure (this is therefore not present in the tree structure shown in FIG. 8(*b*) as the structure is not enabled).

3.2.2 Binary Format of the Data File

The binary format of the data file is shown in FIG. 9. The structure of this table corresponds closely to that of FIG. 7, with the sole different that the data type for each field is not limited to text data, but is selected from text, Boolean and numerical data types according to what is most efficient to represent the corresponding data type.

This format results in the following effects:
1. The data reading time is minimized, since data are kept in its native format.
2. The file size is minimized, since numerical data are kept in its native format.
3. Direct file preparation and editing are not possible, and customized software tools must normally be used for this purpose.

3.3 Reading Data From Database

The brain mapping data can also be read from a database. Two cases are covered by this invention: reading database from a local client and from a remote client.

3.3.1 Database Structure

A database structure suitable for use in the invention is illustrated by the table of FIG. 10. The left column and the top row are provided in the table to permit a referencing of the elements of the database. Thus, not all elements of the table correspond to an element of the database, since some elements of the table are provided for the sake of explanation. For example element (1,a) of table is a heading to indicate that rows 1 to 3 of the table relate to a structure, while elements (2,a) to (2,e) are headings show the forms of information which are provided for that structure. Elements (3,a) to (3,e) actually correspond to fields of the database containing that information.

Similarly, rows 4 to 6 of the table relate to a patient for whom that structure has been investigated. Rows 7 to 9 relate to an electrode for that patient. Rows 10 to 12 relate to a contact for that electrode.

Each row of type 3 corresponds to one set of rows of types 4 to 6. Each row of type 6 corresponds to one set of rows of types 7 to 9. Each row of type 9 corresponds to one set of rows of types 10 to 12.

Figure 11:
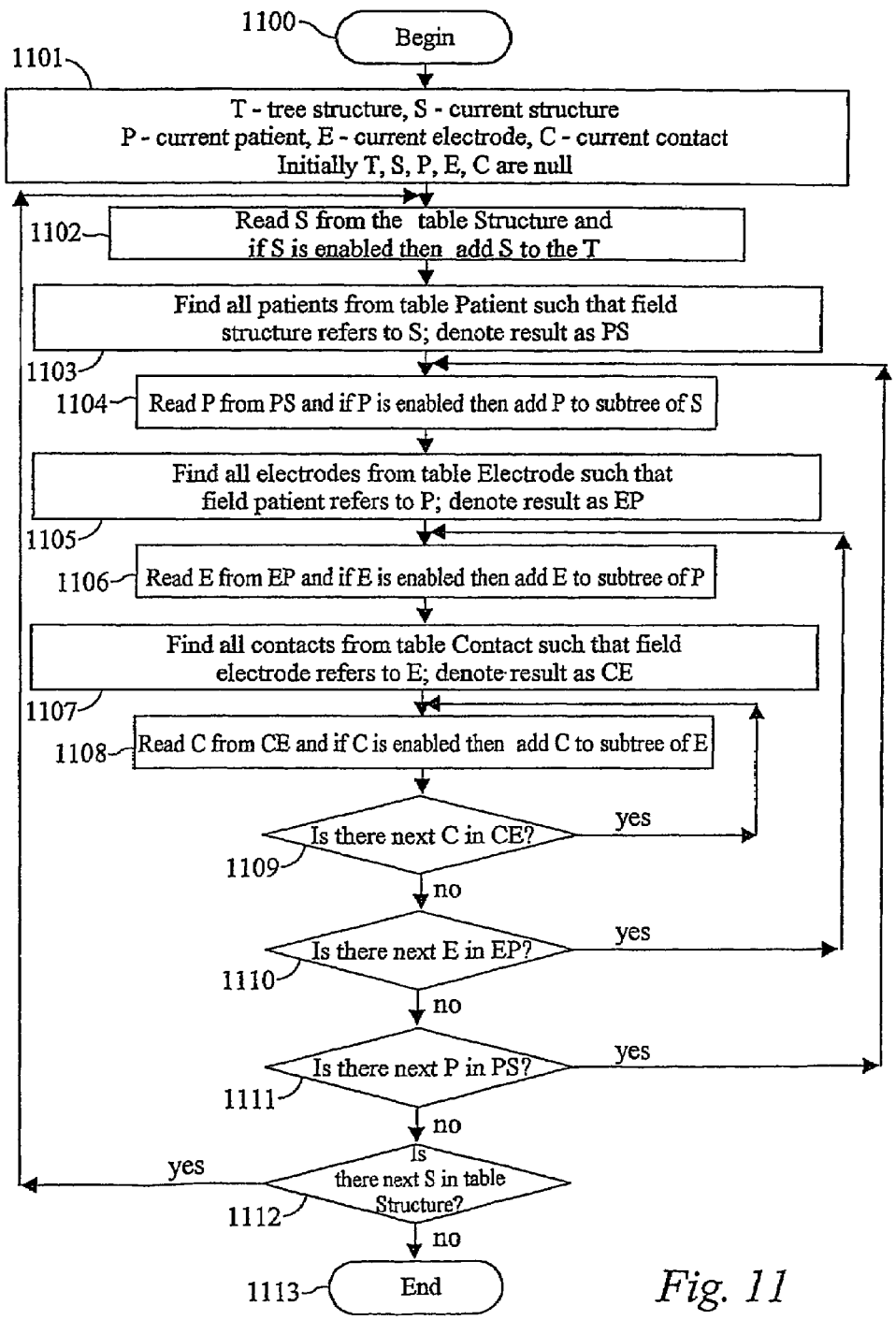
FIG. 11 is a flowchart of the algorithm for data reading from the database.

The database shown in FIG. 10 permits fast data reading and easy conversion into the tree structure of FIG. 5 by using the algorithm the flowchart of which is shown in FIG. 11.

In contrast to the algorithm show in FIG. 6 in which strings are processed in their order through the file, in FIG. 10 the database is structured such that it is possible to construct the whole of the tree in FIG. 5 one structure at a time. The algorithm of FIG. 11 begins at step 1100, and in step 1101 the database is accessed. Step 1102 is the first step in a loop, terminating in step 1112 in which each structure S is successively read and each S which is enabled is added to the tree (step 1102). In the step 1103 each of the patients PS for the present structure S are found. A loop is performed in which each patient P of PS which is enabled is added to the tree (step 1104), and in step 1105 all the electrodes EP for the present patient P are found. A loop is performed in which each electrode E of EP which is enabled is added to the tree (step 1106), and in step 1107 all contacts CE for the present electrode E are found. A loop is performed in which each contact C of CE which is enabled is added to the tree (step 1108). Step 1109 terminates the loop begun in step 1108. Step 1110 terminates the loop begun in step 1106. Step 1111 terminates the loop begun in step 1104. Step 1112 terminates the loop begun in step 1102.

3.3.2 Reading Database From a Local Client

Figure 12:
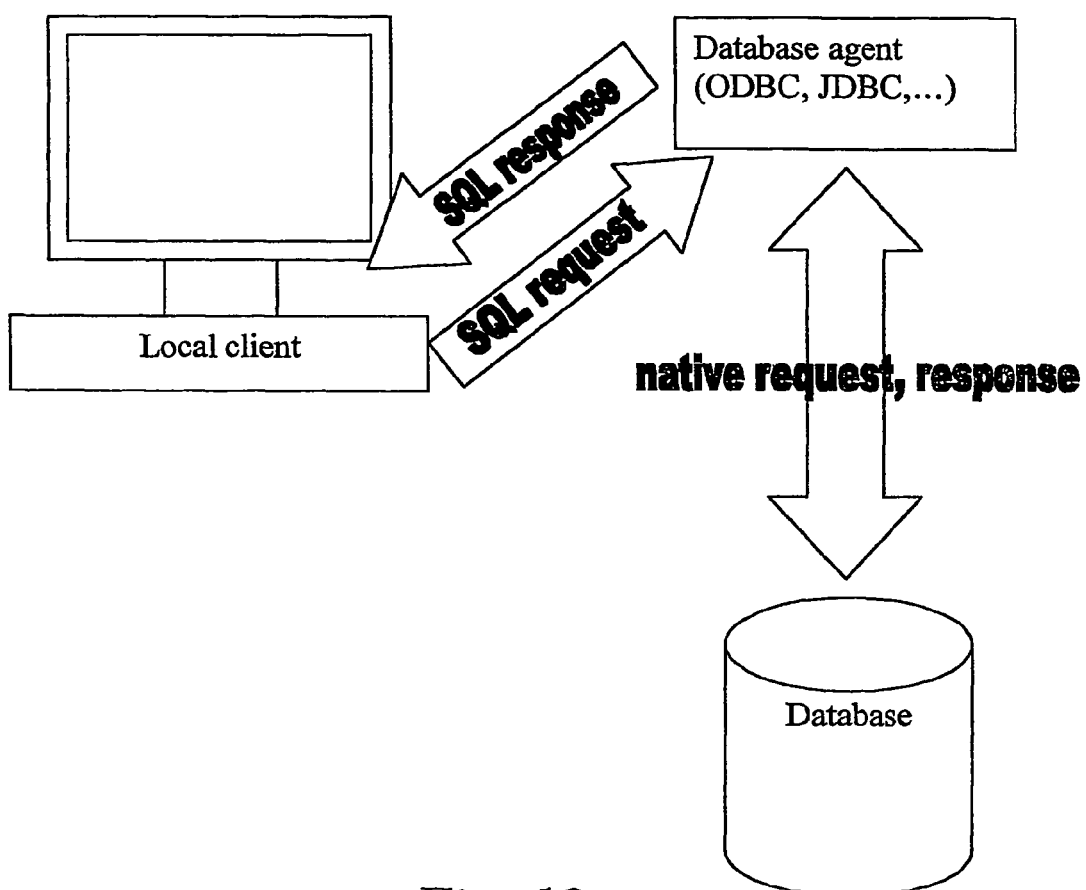
FIG. 12 shows a scheme of interaction between a local client and a database.

In this case, the client and database are located on the same machine or the client and database are located on different machines but within the same Intranet. For reading database, SQL is used [6]. To connect to the database, any database agent can be used, such as ODBC, JDBC [6], depending on specific language, database management system, and operational system used to run the atlas function-based application. These options are shown schematically in FIG. 12.

3.3.3 Reading Database From Remote Client

Figure 13:
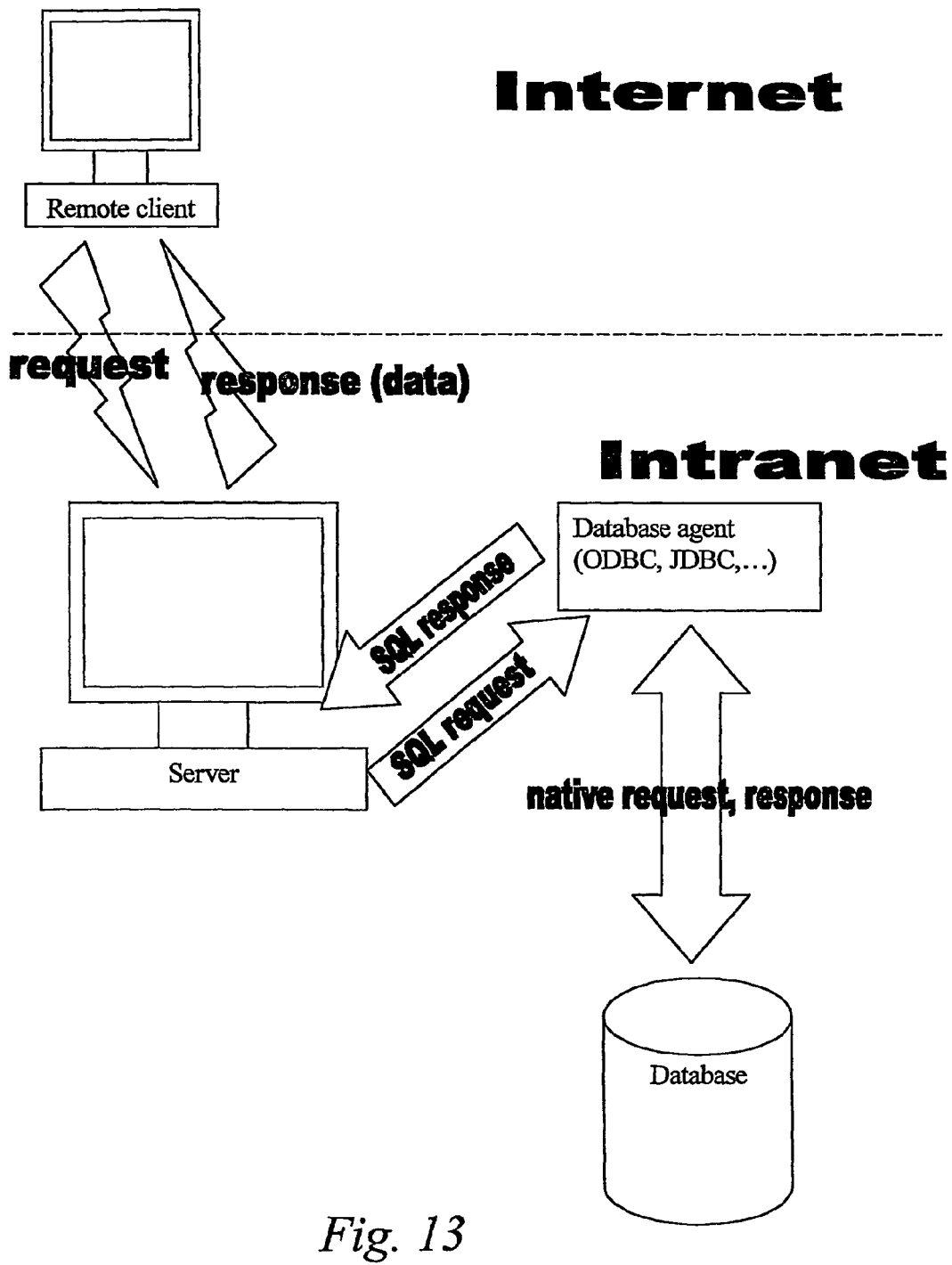
FIG. 13 shows a scheme of interaction between a remote client and a database.

In this case, the client is remote, i.e., located outside of Intranet of the database. The client requests the server agent (servlet, cgi, ISAPI, etc. [7]) to get the data in the binary or text format. The server agent analyzes parameters of the response and reads the database as local client, converts the read data to the requested format, and sends the results to the waiting remote client. This is shown schematically in FIG. 13.

4. Calculation of the Probabilistic Functional Maps

We first present the general description of atlas function calculation in the continuous space with an arbitrary contact and then provide the specific description in the voxelized space with the contacts modeled as cylinders.

4.1 Atlas Function Calculation in Continuous Atlas Space

The general principle of atlas function construction is the following. The atlas function is constructed from a given set of active contacts. For each active contact, there is a corresponding normalised contact model located in the atlas space (the normalisation compensates for patient variability). Note that the model of a given contact does not necessarily correspond to the physical shape of the contact; for example, even if the contact is a cylinder, a contact model for that contact may be defined which is not necessary a cylinder—it may be a more complicated shape describing electrical properties of the contact and brain tissues. The normalised contact model in the atlas space is formed by normalising this contact model.

The atlas function a(x,y,z) is set initially to zero. Then, all active contacts are processed such that for each active contact normalised model and for every point (x,y,z) lying inside this active contact normalised model, the value of atlas function a(x,y,z) at point (x,y,z) is increased by one. After processing all active contacts, function a(x,y,z) contains the value of the atlas function for a considered structure.

Figure 14A:
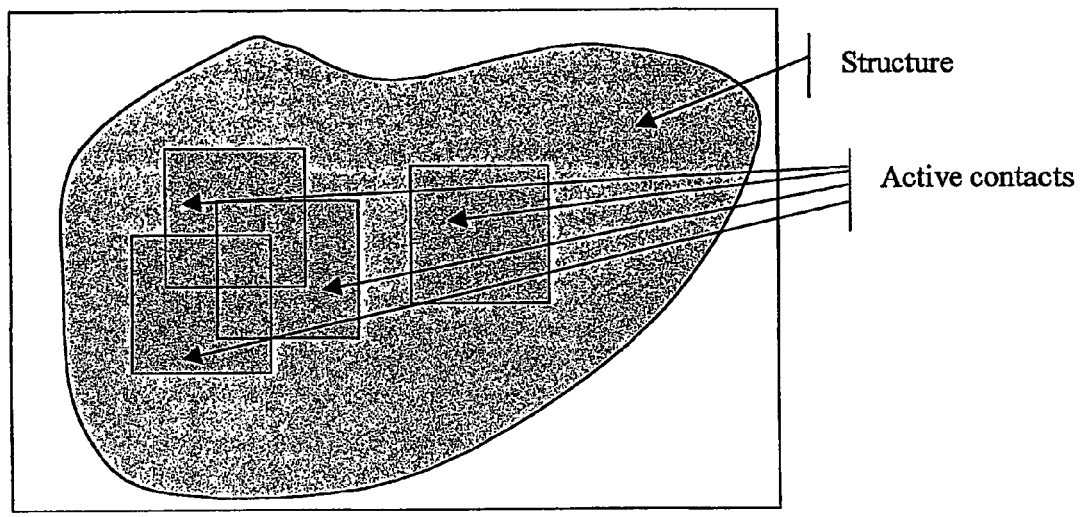
FIG. 14(a) illustrates a structure and four active contacts in a two-dimensional case.
Figure 14B:
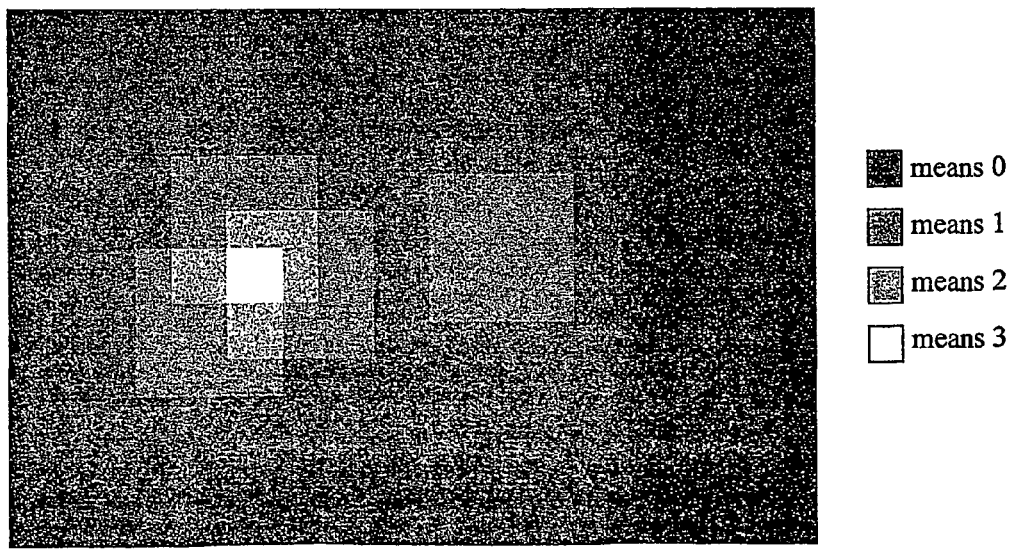
FIG. 14(b) shows an atlas function calculated for the data from FIG. 14(a).

FIGS. 14(*a*) and 14(*b*) illustrates the principle of this method in a two-dimensional case for four active contacts. FIG. 14(*a*) shows the locations within the structure of the four active Contacts, and FIG. 14(*b*) shows the resultant values of the atlas function, as grey-tone levels. Each contact contributes to the atlas function.

Figure 15:
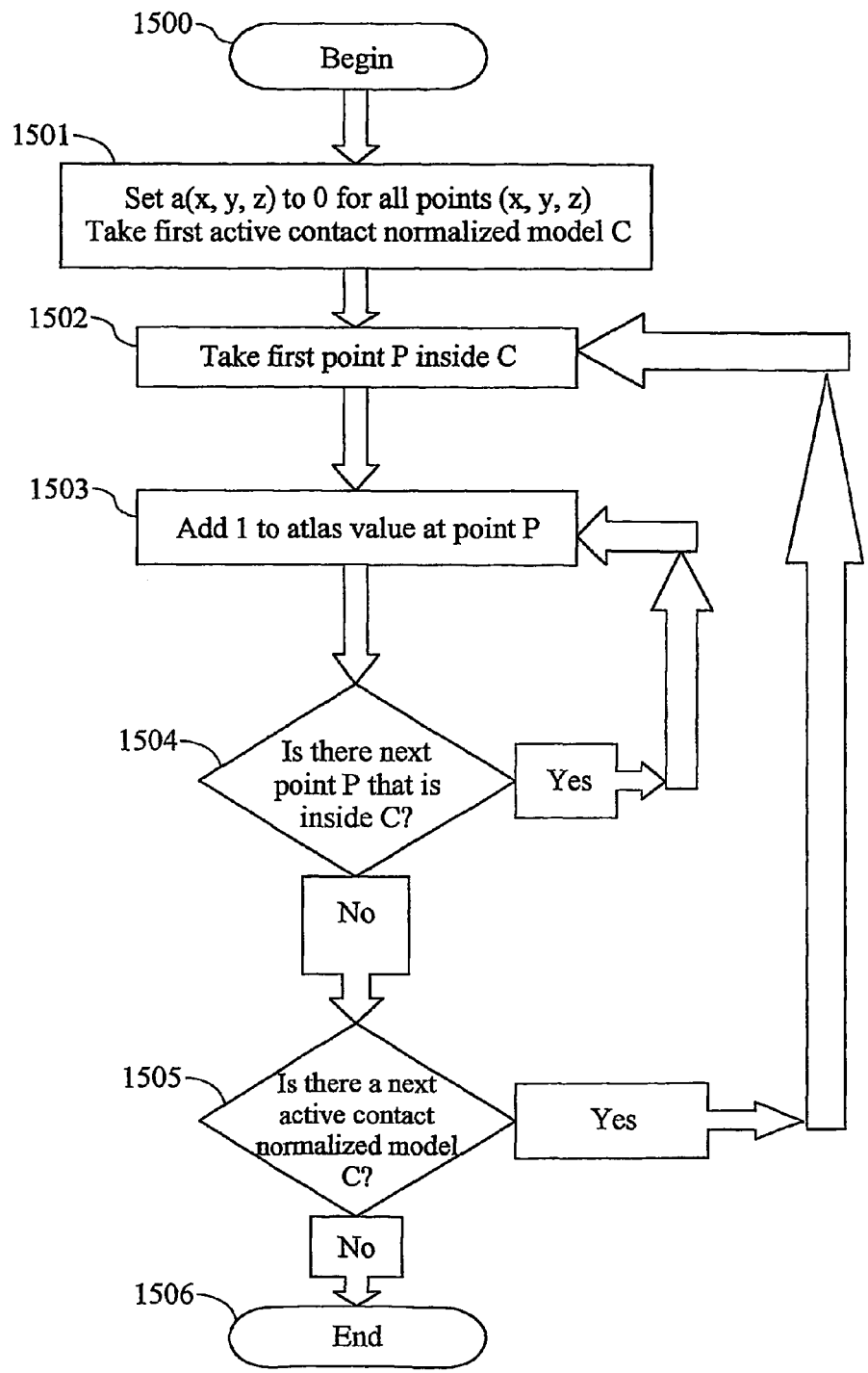
FIG. 15 is a flowchart of an algorithm used by the embodiment for the calculation of the atlas.

FIG. 15 shows a flowchart of the algorithm for the calculation of the atlas function. Beginning at step 1500, the algorithm initializes a(x,y,z) to zero (step 1501), and proceeds to a first of the active Contact normalised models. As part of a loop between step 1502 and step 1505, the process considers each active Contact normalized model C in turn, and as part of this in a loop between steps 1503 and step 1504 for each Contact normalized model C considers in turn every point P (having location (x,y,z) within the Contact normalized model). 1 is added to the value of atlas function a(x, y, z) for each point in step 1503. The algorithm terminates at step 1506.

This algorithm calculates the atlas function in the entire atlas space provided that the number of active contacts is sufficient. For instance, for an assumed uniform distribution of active contacts, their number should be higher that the ratio of the volume of structure to the volume of contact. When the number of available active contacts is not sufficient, the originally calculated atlas function may optionally not be determined at all (i.e. it remains zero) in some regions or it may have discontinuities (abrupt changes in atlas function values).

Figure 16A:
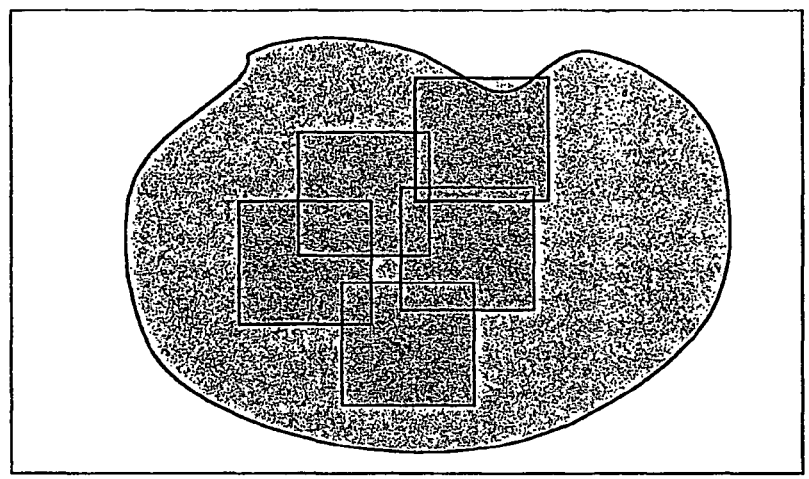
FIG. 16(a) illustrates a two-dimensional structure and five active contacts.
Figure 16B:
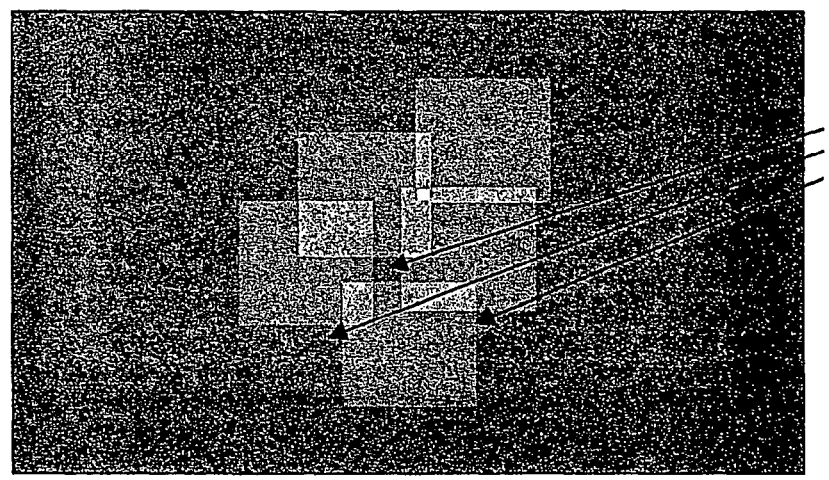
FIG. 16(b) illustrates the discontinuities (changes in atlas value bigger than 1) for the contact data calculated from FIG. 16(a).
Figure 16C:
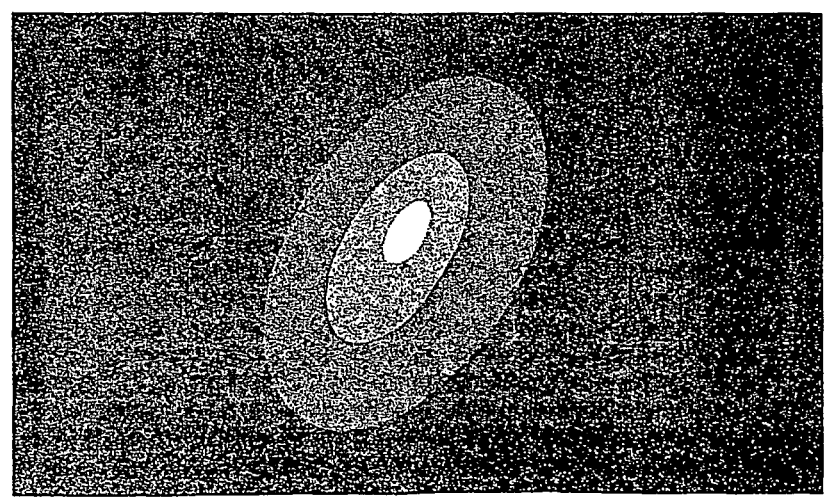
FIG. 16(c) shows the reconstructed atlas from the data from FIG. 16(b).

This is as illustrated in FIGS. 16(*a*) and 16(*b*), where FIG. 16(*a*) shows five Contacts within a structure, and FIG. 16(*b*) shows the resultant atlas function as grey-tone levels. The points of FIG. 16(*b*) indicated by the arrows differ from neighboring points by an amount which is greater than one.

In this case, the values of the atlas function calculated by using the algorithm from FIG. 15 and shown in FIG. 16(*b*), can be treated as samples from which the continuous atlas function will be reconstructed.

4.2 Atlas Function Reconstruction From Samples

A smooth atlas function A(x,y,z) is reconstructed from the original atlas function a(x,y,z) in the following steps.
1. Calculate V, the integral of the original atlas function a(x, y,z) over the whole space.
2. Calculate p(x,y,z), the result of dividing a(x,y,z) by V. Function p(x,y,z) is interpreted as joint probability density [1] of a random vector (x,y,z).
3. By using p(x,y,z), the marginal probability densities [1] p(x), p(y), p(z) are calculated for each coordinate of vector (x,y,z).
4. By using p(x), p(y), p(z), the mean value [1] and standard deviation [1] are calculated for each coordinate of the random vector (x,y,z).
5. We assume that vector (x,y,z) is normally distributed and based on the previous steps create theoretical joint probability density of the normal distribution [1] g(x,y,z) (Gaussian model) as analytical representation of p(x,y,z).
6. From determination of p(x,y,z) it follows that the value of the reconstructed atlas function A(x,y,z) is equal to multiplication of g(x,y,z) by V.

FIG. 16(*c*) shows the result of atlas function reconstruction in the two-dimensional case. The reconstructed atlas function is smooth, and there are no discontinuities in it as the difference between neighboring points is less or equal to 1.

We will now consider the process set out above more formally. Denoting $$V = \int_{-\infty}^{+\infty} \int_{-\infty}^{+\infty} \int_{-\infty}^{+\infty} a(x, y, z) dx\, dy\, dz,$$

we introduce joint probability density of random vector $$w = \begin{pmatrix} x \\ y \\ z \end{pmatrix} \text{ by:}$$

$$p(x, y, z) = \frac{a(x, y, z)}{V} \tag{R.1}$$

Without loss of generality let us consider x coordinate. Then $$\mu_x = \int_{-\infty}^{+\infty} x p(x) dx$$

is the mean value of x, $$\sigma_x = \sqrt{\int_{-\infty}^{+\infty} (x - \mu_x)^2 p(x) dx}$$

is the standard deviation of x, $$p(x) = \int_{-\infty}^{+\infty} \int_{-\infty}^{+\infty} p(x, y, z) dy\, dz$$

is marginal probability density of x. Thus we create a threevariate Gaussian with joint probability density:

$$g(x, y, z) = g(w) = \frac{1}{\sqrt{(2\pi)^3 |M|}} e^{-\frac{1}{2}(w-\mu)^T M^{-1}(w-\mu)}, \tag{R.2}$$

where $$\mu = \begin{pmatrix} \mu_x \\ \mu_y \\ \mu_z \end{pmatrix} \text{ and } M = \begin{pmatrix} \sigma_x^2 & m_{xy} & m_{xz} \\ m_{xy} & \sigma_y^2 & m_{yz} \\ m_{xz} & m_{yz} & \sigma_z^2 \end{pmatrix}$$

is a nonsingular second moment matrix.

Using formulas (R.1) and (R.2) we can reconstruct the atlas function:

$$a(x,y,z) = V g(x,y,z) \tag{R.3}$$

Thus formula (R.3) allows us to present the atlas function as analytical function. From the properties of the normal distribution it follows that a structure can be described as threedimensional ellipsoid with center in μ and semi-axis vectors $$\left(3\sigma_x \frac{v_x}{|v_x|}, 3\sigma_y \frac{v_y}{|v_y|}, 3\sigma_z \frac{v_z}{|v_z|}\right), \text{ where}$$

$$M^{-1} = \begin{pmatrix} v_x^T \\ v_y^T \\ v_z^T \end{pmatrix} \begin{pmatrix} \lambda_x & 0 & 0 \\ 0 & \lambda_y & 0 \\ 0 & 0 & \lambda_z \end{pmatrix} (v_x, v_y, v_z). \tag{R.4}$$

$$\begin{pmatrix} \lambda_x \\ \lambda_y \\ \lambda_z \end{pmatrix}$$

are eigenvalues of $M^{-1}$, and $(v_x, v_y, v_z)$ are eigenvectors of $M^{-1}$. After creation of g(x,y,z) we have to check how adequate is the created Gaussian model g(x,y,z) to the original probability p(x,y,z). For this one can use Pearson chi-square test [1] or Kolmogorov-Smirnov test [1]. If g(x,y,z) does not satisfy to any of the above tests, one can use clustering [3] and create/check a Gaussian model for each generated cluster. This process can be done recursively until all clusters can be represented as Gaussian models.

4.3 Voxelized Atlas Space

The PFM are discrete maps and the results in the continuous atlas space have to be converted into the discrete space. The discrete space is composed of voxels, elementary parallelepipeds, each with width $h_x$, height $h_y$, and length $h_z$. Any voxel can be uniquely addressed with integer coordinates i,j, and k which determine voxel's center (x,y,z), where x is equal to i times $h_x$, y is j times $h_y$, and z is k times $h_z$. It is assumed that the voxel is uniform, meaning that the atlas function value in the voxel's center (x,y,z) determines atlas function value in any other point inside this voxel. Therefore, we have to determine the atlas function a(x,y,z) (or A(x,y,z)) only in the centers of voxels.

Figure 17:
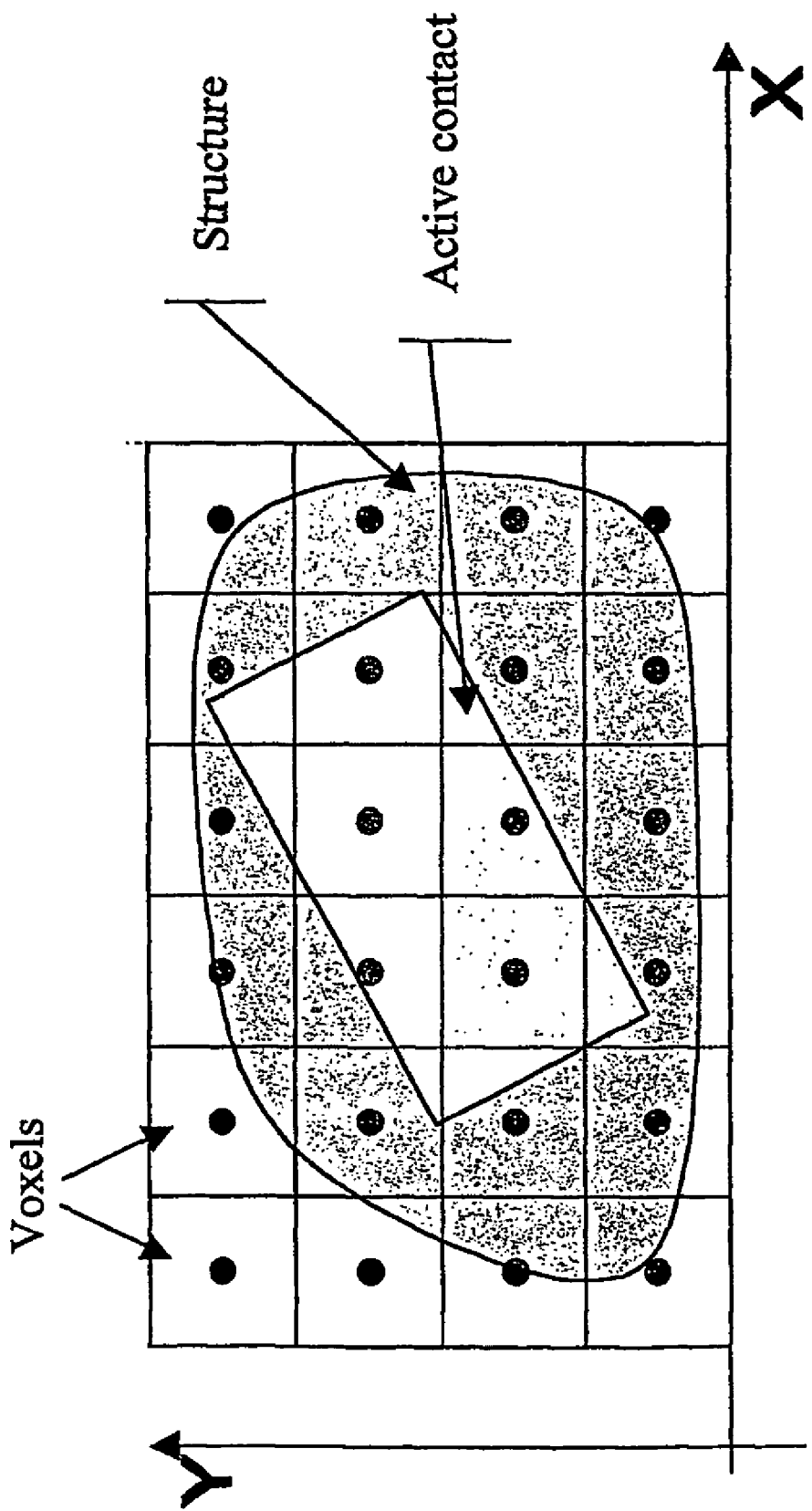
FIG. 17 illustrates voxelization of the atlas space.

FIG. 17 illustrates the above principle of voxelization of the atlas space, in a two-dimensional version of the embodiment. Voxels are shown as squares having a central point, which defines the value of the atlas function over the whole of the voxel.

4.4 Atlas Function Calculation in Voxelized Atlas Space

Starting in Section 4.1 we have explained atlas function calculation in continuous space, but we now turn to atlas function calculation in voxelised atlas space. In this case, all active contact normalised models are processed such that for each active contact normalised model, we find every voxel which intersects this active contact normalised model and then increase by one the value of the atlas function a(x,y,z) inside this voxel.

Figure 18A:
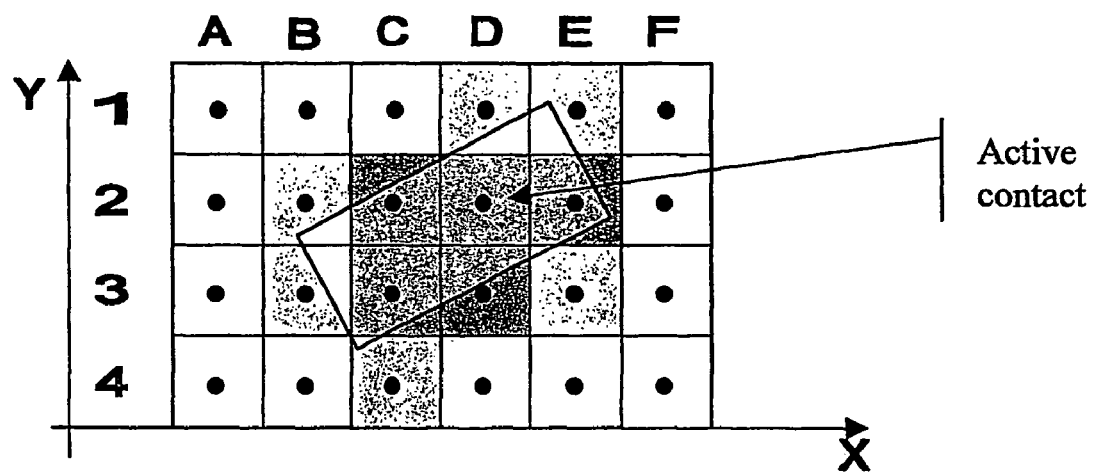
FIG. 18(a) shows a principle of atlas calculation with antialiasing in the voxelized space for a two-dimensional case.

FIG. 18(a) illustrate a principle of this method in a two-dimensional case in which each voxel is square and the active contact normalised model is rectanglar. The darker voxels in FIG. 18(a) intersect the active contact and their centers are inside it. The brighter voxels intersect the active contact but their centers are outside it.

Figure 18B:
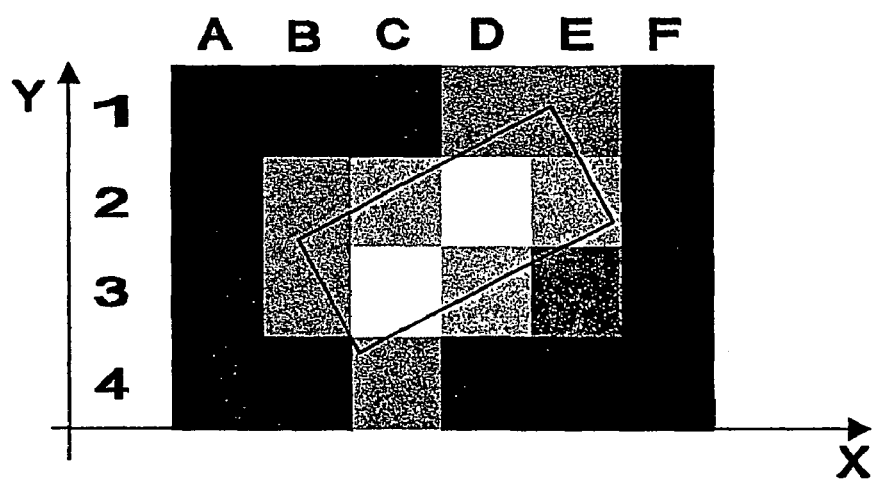

Once the atlas has been constructed, the surfaces of its structures are optionally smoothed by a process known as three-dimensional antialiasing [5]. Antialiasing can also be done on-the-fly as follows. Let S be the volume of voxel and S' the volume of that part of the voxel which belongs to the active contact. Then atlas function value inside the voxel is increased by the result of division S' by S belonging to range [0,1]. The result is as shown in FIG. 18(b), where the level of brightness of each voxel corresponds to the smoothed atlas value.

Figure 19:
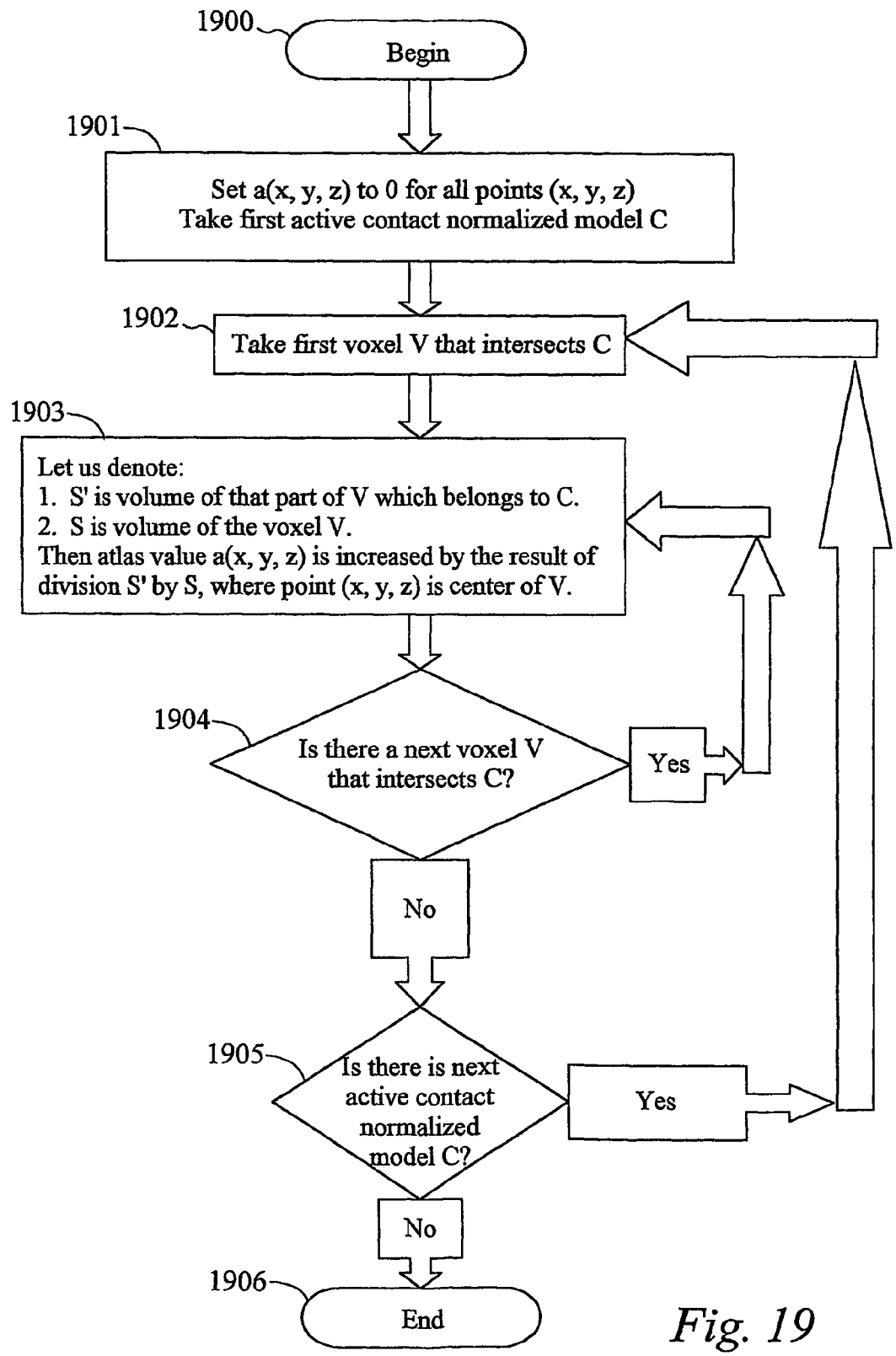
FIG. 19 is a flowchart of the atlas calculation algorithm in the voxelized atlas space with antialiasing.

FIG. 19 shows a flowchart of the atlas function calculation algorithm in the voxelized atlas space in the case that it includes antialiasing. The algorithm begins at step 1900. In step 1901 it initializes a(x,y,z) to zero. In a loop between steps 1902 and 1905, it runs through each contact normalized model C in turn, and as part of this, in a loop between steps 1903 and 1905 it runs through all the voxels V which intersect each C. In step 1903 it calculate the atlas function by the expression in the preceding paragraph.

Note that the reconstructed atlas derived in Section 4.2 can also be voxelized and the surfaces of its structures smoothed by using antialiasing.

4.5 Find the Center of Voxel for a Given Point

The value of the atlas function for any given point (x',y',z') is a(x,y,z), where (x,y,z) is the center of a voxel that contains point (x',y',z'). For given (x',y',z'), point (x,y,z) is calculated as follows:

1. divide x' by $h_x$ and convert the result to the nearest integer value i; then x equals to i multiplied by $h_x$.
2. divide y' by $h_y$ and convert the result to the nearest integer value j; then y equals to j multiplied by $h_y$.
3. divide z' by $h_z$ and convert the result to the nearest integer value k; then z equals to k multiply by $h_z$.

Figure 20:
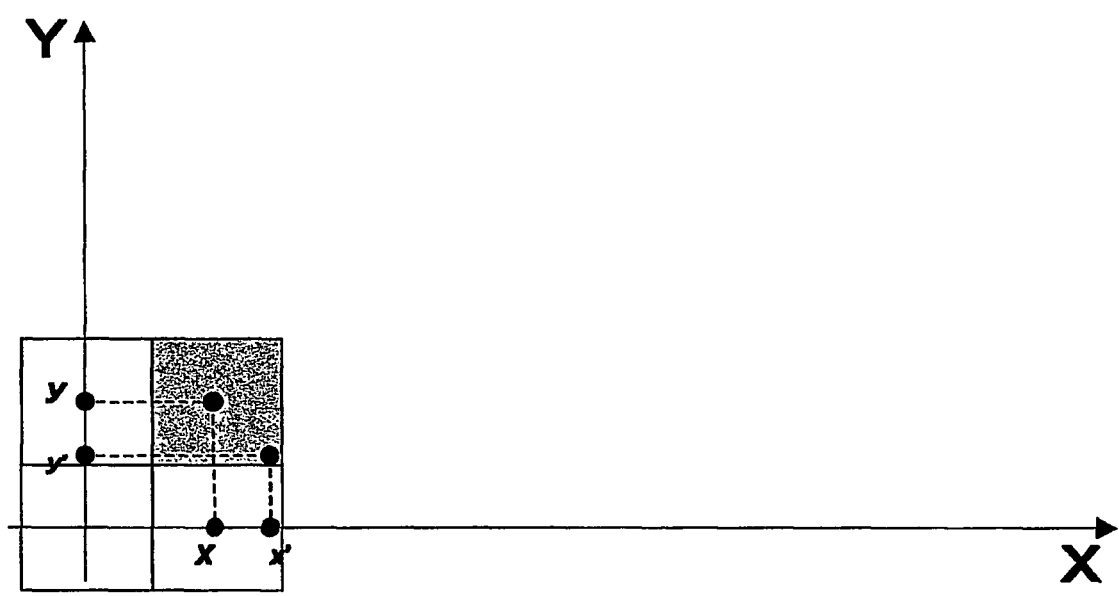
FIG. 20 shows a principle of finding the center of voxel containing a given point.

FIG. 20 illustrates finding the center of voxel containing a given point in a two-dimensional case. It is assumed that: $h_x=1$, $h_y=1$, x'=1.3, y'=0.7. Then the center of voxel containing point (x',y') is (1,1).

4.6 Voxelization of a Cylinder

Let us consider the calculation and voxelization of atlas function in more detail when the contact is modeled as a cylinder. Then, the task is to find all voxels that intersect a particular cylinder. Mathematically, the problem of localizing a point relative to a cylinder is simple. Computationally, this problem is more demanding, as all active cylindrical contacts and all voxels in the atlas space relative to a selected cylindrical contact have to be tested. At the same time, the atlas function calculation process must be fast, particularly for remote operations.

Here we propose two voxelization approaches: continuous and discrete. The continuous voxelization approach is based on an analytical representation of the cylinder and its convexity, and it is recommended when the contacts have to be voxelized precisely. The discrete approach is faster but less precise and it is based on a representation of the cylinder as a segment in a special discrete three-dimensional space.

To explain both of these approaches we define:

1. r—radius of the Contact.
2. h—height of Contact.
3. a=(x1, y1, z1)—inferior tip of contact (by "tip" we mean one extreme of the longitudinal axis of the cylinder)
4. b=(x2, y2, z2)—superior tip of contact; note that z2 is bigger or equal to z1
5. T—homeomorphism (one-to-one and continuous transformation [2]) from the space of the cylinder to the atlas space. We assume that it is linear combination of linear scaling along x, y axes, linear or non-linear scaling along z axis, and linear translation along x,y,z axes. We can also consider rotation and since it does not change the form of cylinder we can apply the rotation before T (normalization). Thus assumed T is more general than an affine transformation because non-linear scaling along z axis is allowed.

6. L—list of voxels resulting from cylinder voxelization.

Figure 21:
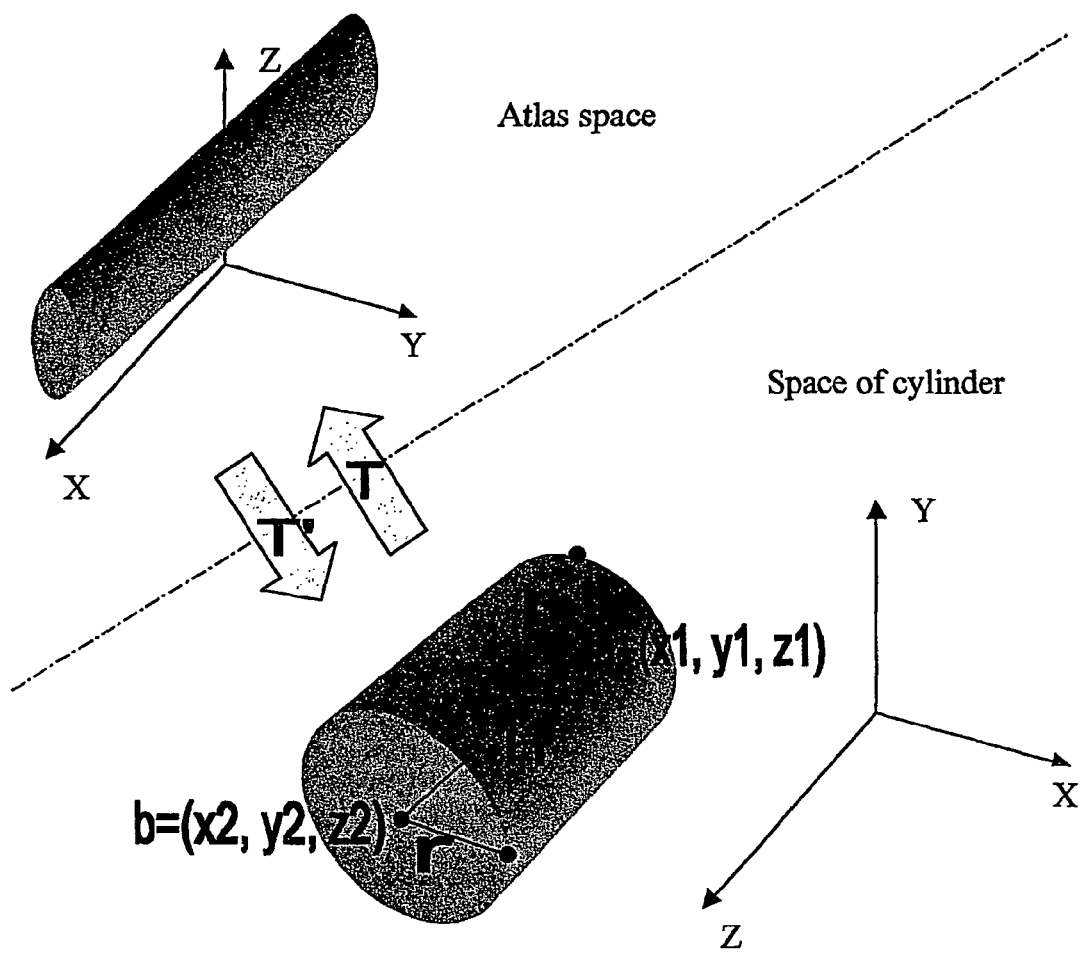
FIG. 21 illustrates the definitions of parameters describing the cylindrical contact.

FIG. 21 illustrates these above definitions of the parameters schematically.

4.6.1 Continuous Method of Cylinder Voxelization 4.6.1.1 Description of the Continuous Method The general idea of calculating the points within the cylinder is to find the limit of two coordinates (x,y). Then, by fixing these two coordinates (x,y) for each point within their limit, the limit of the third coordinate z has to be found. In this way, all the points (x,y,z) within the cylinder can be obtained. Before formulation of the algorithm, two related problems in the space of cylinder are considered.

4.6.1.1.1 Finding Minimum and Maximum of Three Coordinates of Cylinder

Figure 22:
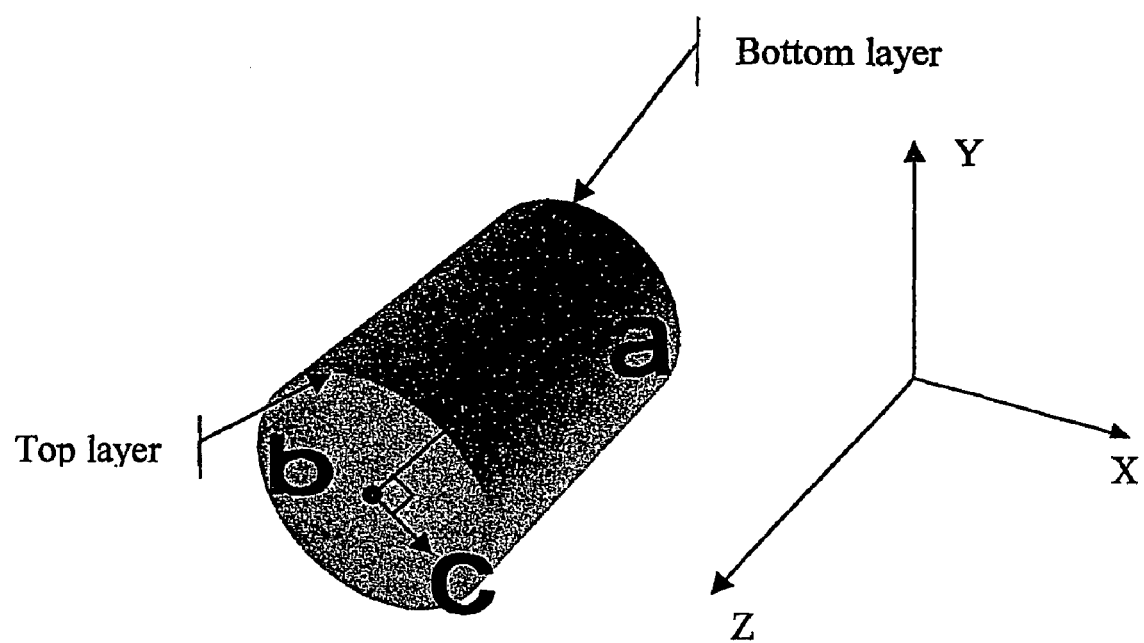
FIG. 22 illustrates the conditions that determine a point located on the top layer of the cylinder.

By "layer" we mean here a circular section of the cylinder perpendicular to the longitudinal axis of the cylinder; thus the "top layer" of the cylinder is the end surface containing point a, and the "bottom layer" of the cylinder is the end surface containing point b. It is evident that the maximum and minimum of three coordinates of cylinder are on the top and bottom layers of this cylinder as illustrated in FIG. 22. A given point c (FIG. 22) is on the top layer of the cylinder because: 1) the angle between vectors ab and bc is a right angle (90 degrees), 2) the length of vector bc is less or equal to the radius of the cylinder r.

Consider problem of finding the maximum (minimum) of x for the top layer of the cylinder. Then each point c=(x,y,z) on the top layer must satisfy simultaneously the following conditions C1 and C2:

C1. Angle between vectors bc and ba equals 90 degrees.
C2. Length of the vector bc must be less or equal to radius of the cylinder r.

These conditions are illustrated in FIG. 22. They can be checked by using the following calculations:

CC1. Calculate v as a scalar product of two vectors bc and ba. If v equals to zero, then point c satisfies condition C1.
CC2. Calculate w as scalar product of two vectors bc and bc. If w is less or equal to square of r, then point c satisfies condition C2.

Thus we have to find point c=(x,y,z) that satisfies these conditions and its x coordinate is maximum (minimum). As scalar product used in both conditions is a convex function, the standard maximization (minimization) problem of convex programming [4] holds, and the corresponding Langrange multiplier method [4] has a unique solution that gives the desired value.

The maximum (minimum) of three coordinates for the bottom layer of the cylinder can be found in the similar way. Then, by comparing the results from both layers, we can find the final maximum (minimum) of three coordinates of the whole cylinder.

4.6.1.1.2 Finding Limits of Third Coordinate for the Given Two Other Coordinates Assume that x and y are fixed. We are looking for the limits of z coordinate [zmin,zmax] such that the whole segment ef is inside the cylinder, where e=(x,y,zmin) and f=(x,y,zmax). Any point c=(x,y,z) inside the cylinder satisfies simultaneously the following two conditions C3 and C4:

C3. Point (x,y,z) must be located between the plane containing the top layer of the cylinder and the plane containing the bottom layer of the cylinder, see FIG. 23.
C4. Distance between point (x,y,z) and the line going through segment ab is less or equal to the radius of cylinder r, see FIG. 24.

Figure 23:
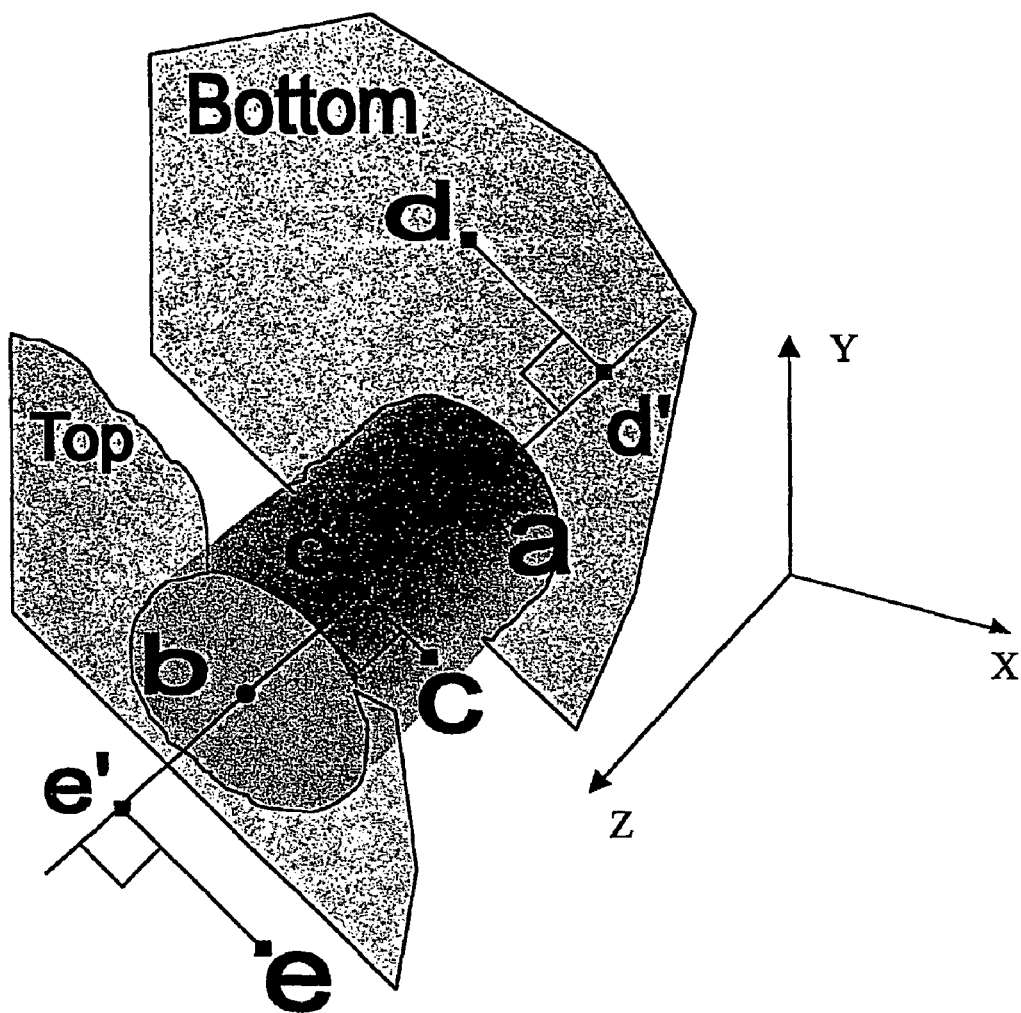
FIG. 23 illustrates the condition that determines all points located between the top and bottom planes of the cylinder.
Figure 24:
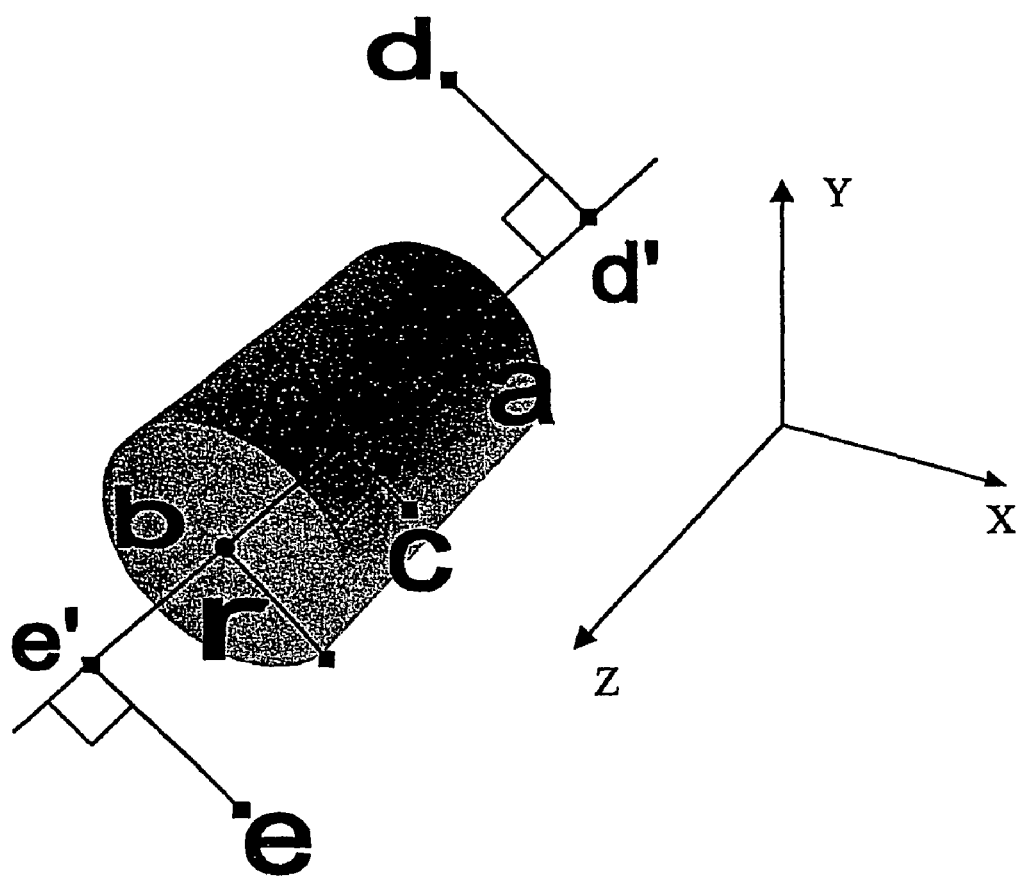
FIG. 24 illustrates the condition that determines all points distant from the cylinder axis by less or equal to the radius of the cylinder.

FIG. 23 illustrates condition C3. Points d, e do not satisfy condition C3 as they are not between planes Top and Bottom. Point c satisfies condition C3 as it is between planes Top and Bottom. FIG. 24 illustrates condition C4. Points d, e do not satisfy condition C4 as the lengths of segments dd', ee' are bigger than the radius of cylinder r. Point c satisfies condition C4 as the length of segment cc' is lower than the radius of cylinder r. Therefore, point c belongs to the cylinder.

Conditions C3 and C4 can be checked by using the following calculations:

CC3. Calculate v as a scalar product of two vectors ab and ac divided by h. If v is in the range of [0,h], then point c satisfies condition C3.
CC4. Calculate w as a square of length of vector ac minus square of v. If the square root of w is in the range of [0,r], then point c satisfies condition C4.

Alternatively, conditions C3 and C4 can be checked as follows:

CC5. Calculate v1 as a scalar product of two vectors ab and ac. Calculate v2 as a scalar product of two vectors ba and bc. If v1 and v2 are bigger or equal to zero, then point c satisfies condition C3.
CC6. Calculate vector w as a vector product [2] of two vectors ab and ac divided by h. If the length of w is less or equal to the radius of cylinder r, then point c satisfies condition C4. Another approach is to construct the normal equation [2] of the straight line passing through segment ab and then substitute coordinates of point c to this equation. If the module of result of the substitution is less or equal to the radius of cylinder r, then point c satisfies condition C4.

Figure 25:
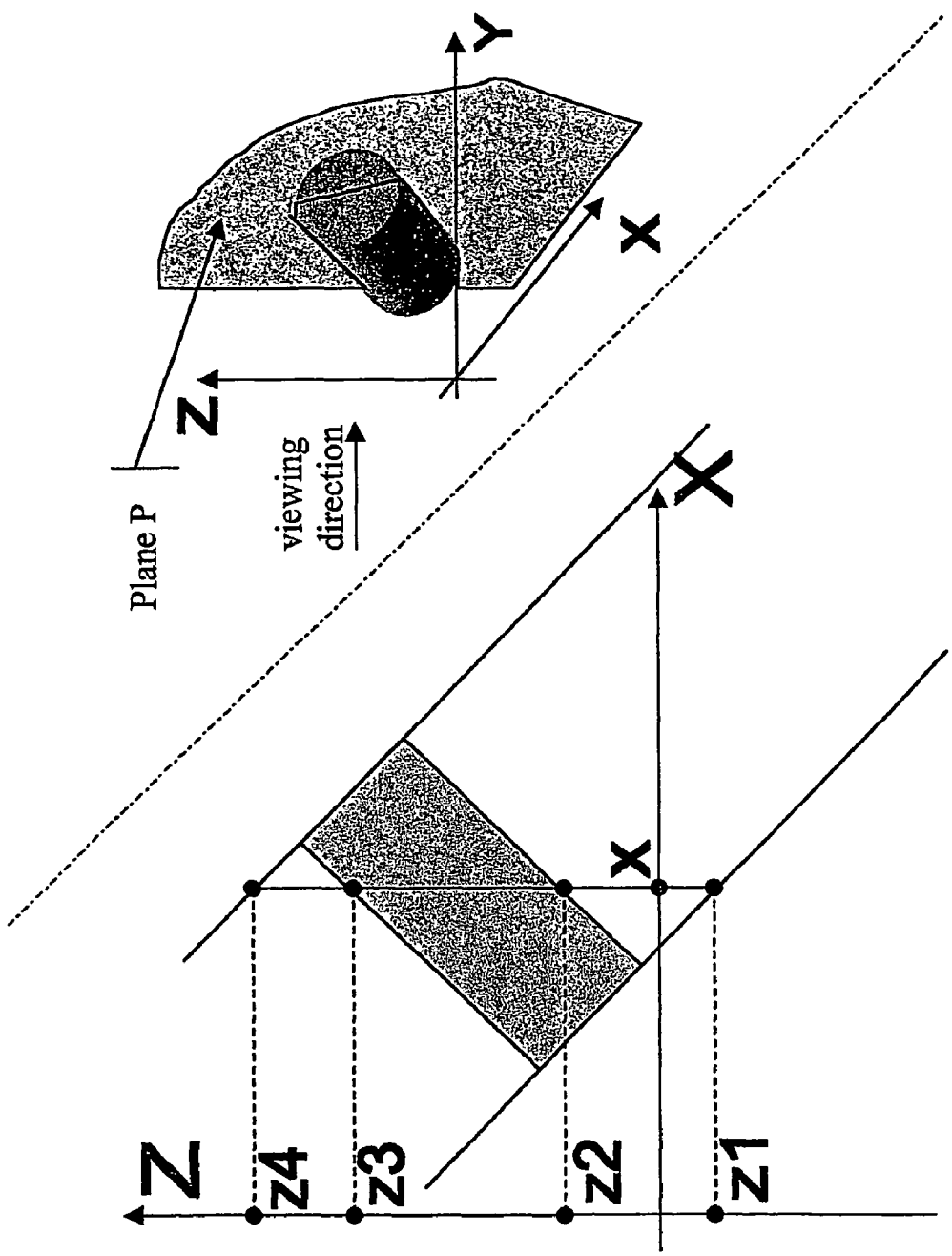
FIG. 25 illustrates a principle of determining the range of third coordinate for the given two other coordinates.

By substituting the given coordinates x and y in CC3-CC4 or CC5-CC6, we obtain the formulas determining the range of z. FIG. 25 illustrates a principle of determining the range of z for the fixed x and y. First, plane P is determined such that it is parallel to plane XZ and passes through the fixed point (x,y,0). Next, the following calculation are done on plane P:

1. From condition C3, we get z range [z1,z4]
2. From condition C4, we get z range [z2,z3]
3. The calculated limit is [zmin,xmax], where zmin is the maximum of z1 and z2, and zmax is the minimum of z3 and z4. So finally, the range is [z2,z3].

4.6.1.2 Description of the Continuous Algorithm

The algorithm for continuous voxelization of cylinder has the following steps:

1. Initially the resultant list of voxels L is empty.
2. Find the minimum and the maximum x and y limits of the cylinder and denote them by xmin', xmax' and ymin', ymax', respectively (as described in 4.6.1.1.1).
3. By using transformation T, transform xmin', xmax' and ymin', ymax' to the atlas space. The results are xmin, xmax and ymin, ymax respectively.
4. By using transformation T', transform $h_x$ and $h_y$ to the cylinder space. The resulting values are $h_x'$ and $h_y'$. As a result, for any point (x,y) from rectangle [xmin,xmax]×[ymin,ymax], there is a unique corresponding point (x',y') from rectangle [xmin',xmax']×[ymin',ymax'].
5. Let x'(x) be in range [xmin',xmax']([xmin,xmax]) with step $h_x'(h_x)$, and y'(y) be in range [ymin',ymax']([ymin,ymax]) with step $h_y'(h_y)$. For every point (x',y')((x,y)), the following operations are performed:
   5.1. If there is a range of z coordinate [zmin',zmax'] such that segment e'f' belongs to the cylinder, where e'=(x',y',zmin') and f'=(x',y',zmax'), (as described in 4.6.1.1.2) then the following steps are performed:

5.1.1. By using transformation T, transform zmin' and zmax' to the atlas space and denote them by zmin and zmax, respectively.

Figure 26:
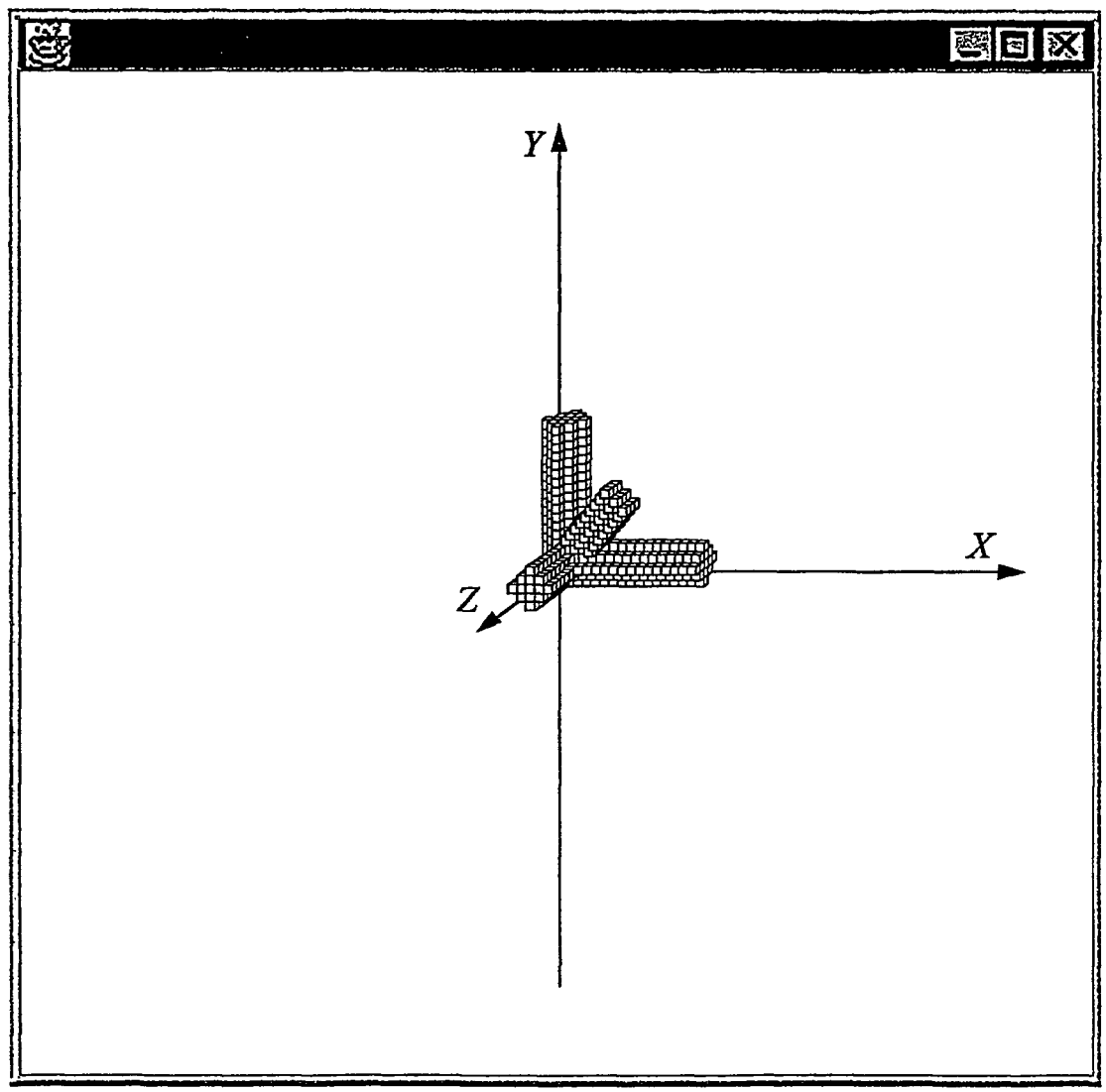
FIG. 26 presents the result of cylinder voxelization by the continuous algorithm.

5.1.2. Each voxel containing point (x,y,z), where z is changing from zmin to zmax with step $h_z$, is added to the resultant list L FIG. 26 presents the result of cylinder voxelization created by the continuous algorithm without antialiasing. Four cylinders are used with parameters r=1, h=8. The voxels shown as solid are the ones which intersect at least one of the cylinders.

4.6.2 Discrete Method of Cylinder Voxelization

The continuous method calculates the most accurate voxelized model of the cylinder possible. In cases, where the speed of calculation is more critical than high accuracy, the discrete method can be used.

4.6.2.1 Description of the Discrete Method

Figure 27:
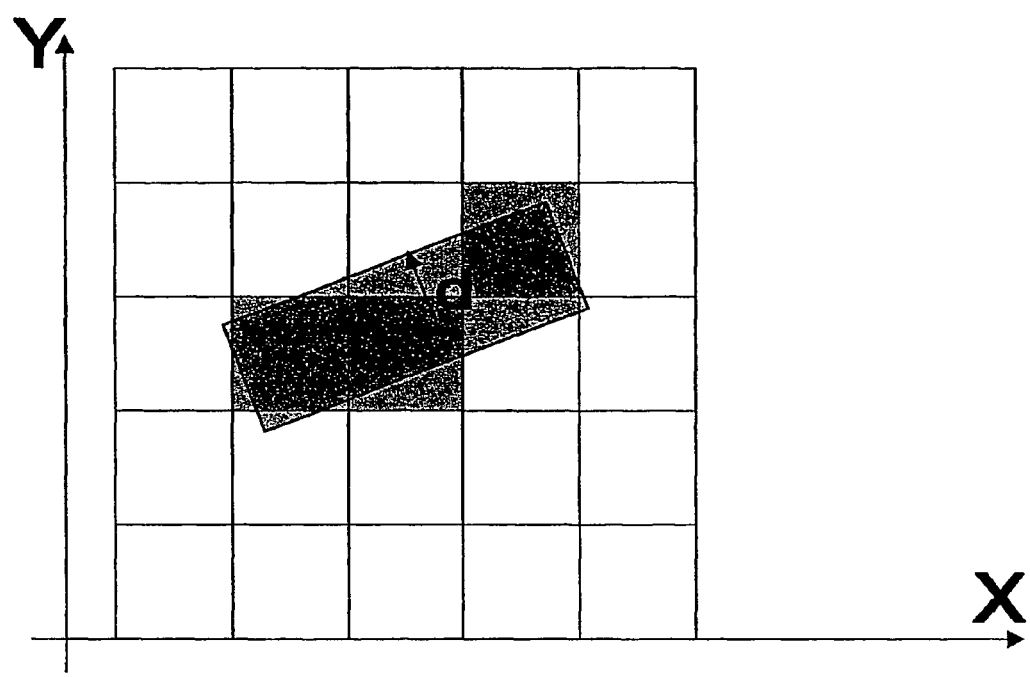
FIG. 27 illustrates a principle of the discrete voxelization algorithm.

In the discrete voxelization method, the discrete space (D-space) consists of cubic elements, where the width, length and height of each cube is equal to the diameter of cylinder. As an approximate discrete model of cylinder, a corresponding segment in D-space is taken. The construction of this discrete segment can be done by using the well-known Bresenham's algorithm, as illustrated in FIG. 27. Without loss of generality, FIG. 27 shows a slice of D-space that is parallel to XY plane and passes through the centers of elements of D-space and the axis of cylinder. The width, height, and length of each element of D-space is equal to the diameter of cylinder d. By using Bresenham's algorithm we can find all these elements which have center points inside the cylinder. The shaded elements form the segment in D-space. This segment is an approximation of the cylinder.

4.6.2.2 Description of the Discrete Algorithm.

The discrete algorithm for cylinder voxelization consists of the following steps:

1. Initially the resultant list of voxels L is empty.
2. By using a three-dimensional version of Bresenham algorithm and cylinder parameters, a corresponding segment S in D-space is formed.
3. For each cube C in segment S, the following operations are performed:

3.1. By using transformation T, cube C is transformed to the atlas space. The result is a body C'.

3.2. Each voxel inside C' is added to the resultant list L. If T is a linear combination of linear scaling and linear translation then C' is a parallelepiped and we can add whole C'to L.

Figure 28:
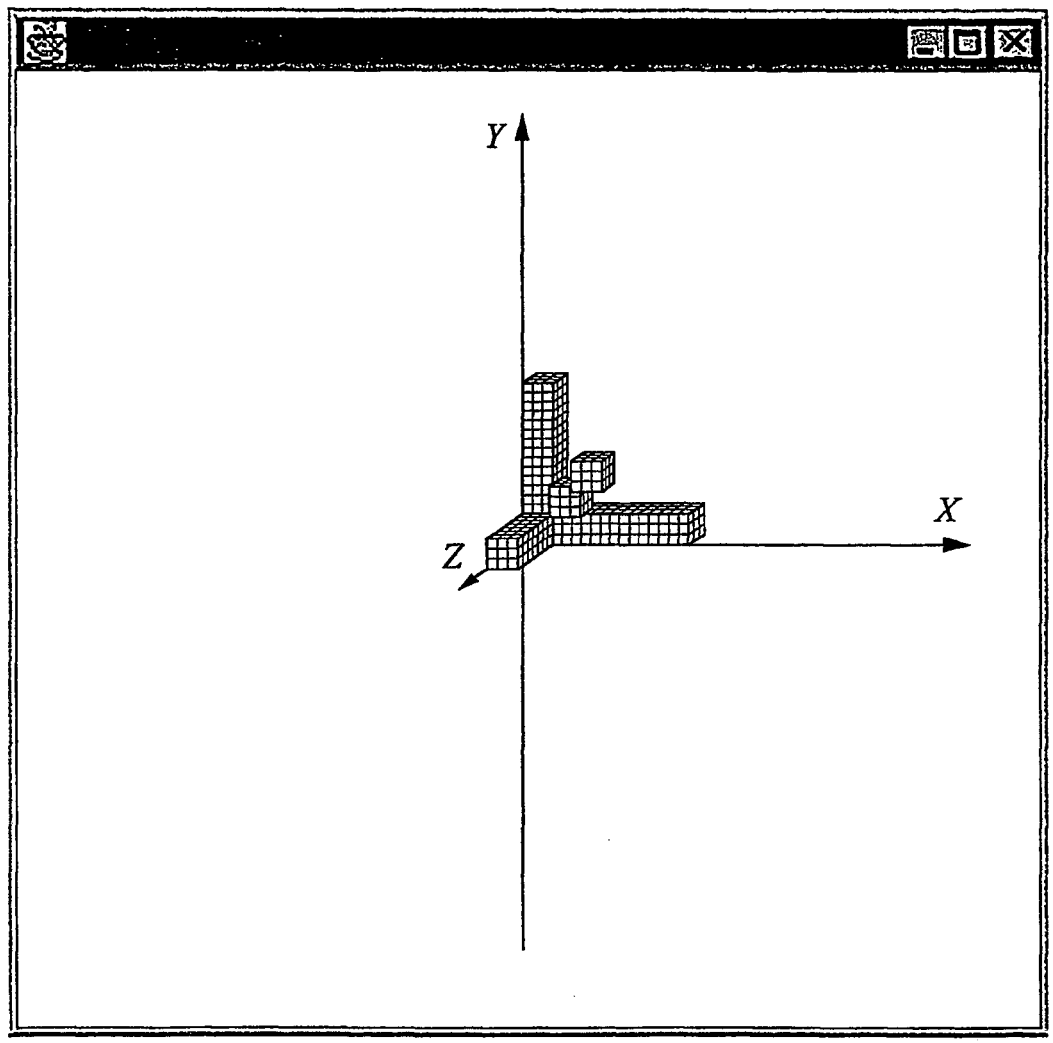
FIG. 28 presents the result of cylinder voxelization by the discrete algorithm.

FIG. 28 shows the result of cylinder voxelization created by the discrete algorithm without antialiasing. Four cylinders are used with parameters r=1, h=8. By comparing FIG. 28 and FIG. 26 it is evident that the continuous method of cylinder voxelization is more precise than the discrete one.

4.7. Probability Calculation

This invention proposes several ways of calculating probabilities. In general, two approaches are proposed: intuitive, easy to understand and use by the clinicians, and formal, defined in a mathematical sense.

4.7.1 Finding Probability of Structure at Given Point

Let V denote the integral of a(x,y,z) over the whole space, N be the total number of active contacts, and MAX denotes the maximum value of atlas function a(x,y,z), CONST denotes a constant value which corresponds to assumed MAX. The probability can be calculated in one of the following ways:

1. Probability of a given structure at point (x,y,z) equals to the result of division a(x,y,z) by N (an intuitive definition).
2. Probability of a given structure at point (x,y,z) equals to the result of division a(x,y,z) by MAX (an intuitive definition).
3. Probability of a given structure at point (x,y,z) equals to the result of division a(x,y,z) by CONST (an intuitive definition).
4. Probability of a given structure at point (x,y,z) equals to the result of division a(x,y,z) by V (a formal definition).

These definitions are applicable both to the original and the reconstructed atlas functions.

4.7.2 Calculation of the Best Target

The best target is calculated as the set of points, where the probability of a given structure has the maximum value.

5. Presentation of Probabilistic Functional Maps

The probabilistic functional maps along with the best targets have to be available to the user in a friendly and efficient way. We propose techniques for the presentation of the PFM along with the best targets and the way in which the user can manipulate this information within an atlas based application (i.e. an application developed based on the PFM).

One of most natural ways of presentation is to find the intersection of the atlas (array of voxels) with an arbitrary plane and display the result as a PFM slice. We introduce two approaches, one with three dimensional (3D) presentation and another with two-dimensional (2D) presentation.

The atlas function-assisted application provides the following functionality:

1. Navigation in the atlas space, such as changing parameters of the plane for rotation and/or translation.
2. Finding elements of PFM, such as voxels which belong to the intersection of the plane and the atlas.
3. Displaying PFM such that every voxel is coded with color or grayscale corresponding to its probability.
4. Switching between different types of probability.
5. Overlaying PFM on anatomical atlases [8].
6. Showing the probability distribution histogram representing the statistical estimation of the atlas function.
7. Selecting voxels using various criteria. For example, the voxels can be selected by equal value (atlas function value or probability value), by coordinates, or by threshold value. In addition, all voxels that are inside a specified domain or correspond to a specified number of contacts can be selected. Here the problem is to determine the number of active contacts inside a set of points. Let S be a restricted set of points and each contact has volume W. The problem of determining how many contacts N are in this set, is solved as follows. Let us denote by V the integral of a(x,y,z) over whole S. From the method of atlas function calculation it follows that N equals V divided by W.
8. Selecting an arbitrary voxel using a selecting device.
9. Finding all contacts such that a selected voxel intersects them.
10. Displaying complete information on a selected voxel, such as probability, the number of respective contacts and their characteristics.
11. Measuring, such as distances between selected voxels, area of intersection by a plane, and volume of selected domain.
12. Changing parameters of the voxels including voxel size and voxel shape (e.g., parallelepiped, ellipsoid, or tetrahedron).
13. Swapping between the original and reconstructed atlas functions.
14. Showing the mean value and standard deviation of the atlas function.

15. Re-generating the PFM for the specified data subtree.
16. Changing the atlas resolution (voxel size). Note that this does not changes the atlas function itself.

5.1 Interface Architecture

The interface architecture of an atlas function-assisted application delivering the PFM presentation contains two components: visual interface and event interface.

5.1.1 Visual Interface

Figure 29A:
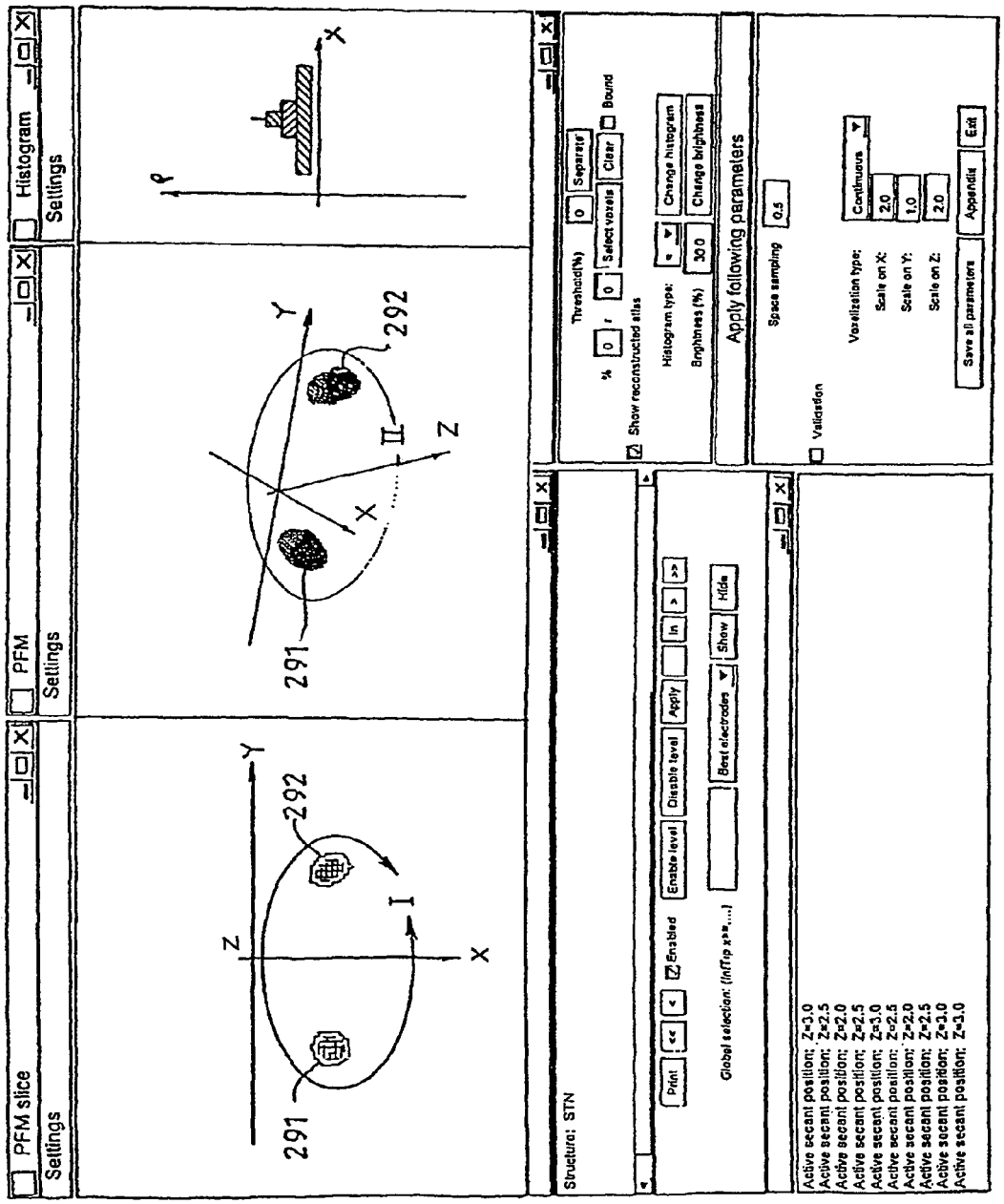
FIG. 29(a) shows the graphical user interface the embodiment, the interface having six windows.

The interface consists of the six windows shown in FIG. 29(a).

5.1.1.1 Viewing the Atlas in 2D

Figure 29B:
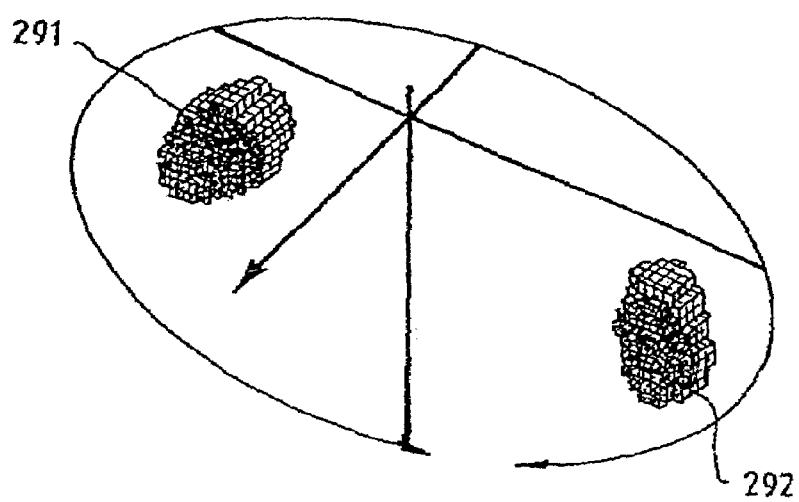
FIG. 29(b) shows the portion of FIG. 29(a) marked I.

The window for viewing the atlas function in two dimensions is named PFM slice and it is shown in upper left corner of FIG. 29(a). The portion of this window marked I is shown enlarged as FIG. 29(b). Its functionality includes:
1. Showing (or hiding) any object in the scene consisting of axis, anatomical atlases, probabilistic functional maps in two dimensions, buttons, contacts, mean value, and standard deviation of the atlas function.
2. Scale, translate, and rotate the scene.
3. Navigate in the atlas space by using buttons, such as translate plane and rotate plane.
4. Select (deselect) any contact using a selecting device.
5. Select (deselect) any voxel in the atlas by using the selecting device.
6. Show selected voxel in color.
7. Measure distance between selected voxels.
8. Show selected group of voxels in color.
9. Measure volume and area of plane intersection of a selected group of voxels.
10. Blend probabilistic and anatomical atlases.

Note that in the PFM slice window of FIG. 29(a), two generally spherical regions with a high level of the atlas function are indicated generally as 291 and 292.

5.1.1.2 Viewing the Atlas in 3D

Figure 29C:
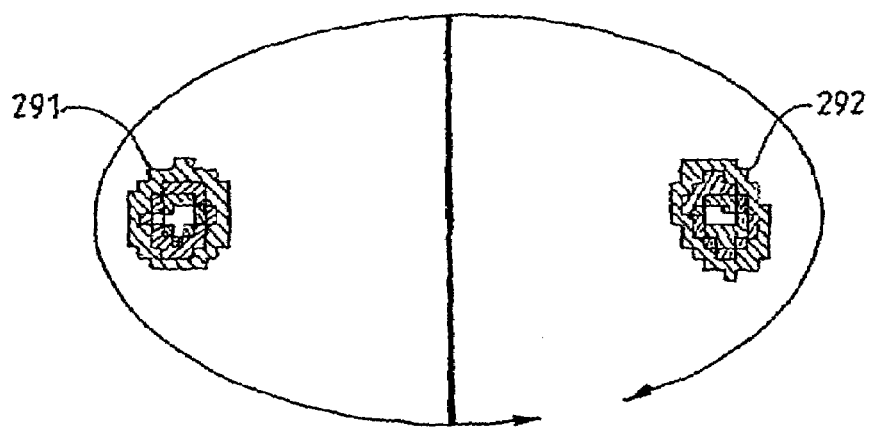
FIG. 29(c) shows the portion of FIG. 29(a) marked II.

The window for viewing the atlas function in three dimensions is named PFM and it is shown in the upper central window of FIG. 29(a). The portion of this window marked II is shown enlarged as FIG. 29(c). Its functionality includes:
1. Show (hide) any object in the scene consisting of axis, plane and atlas function, contacts, mean value, and standard deviation of atlas function.
2. Scale, translate, and rotate the scene.
3. Show plane as semi transparent plane.
4. Show atlas function as opaque voxels.
5. Show atlas function as transparent voxels with variable transparency such that the higher probability of voxel, the lower its transparency.
6. Select (deselect) any voxel with a selecting device.
7. Select (deselect) any contact with a selecting device.

Again, in the PFM window of FIG. 29(a), the two generally spherical regions with a high level of the atlas function are indicated as 291 and 292.

5.1.1.3 Viewing the Probability Distribution

The window for viewing the probability distribution is named Histogram and it is shown in the top right section of FIG. 29(a). The probability distribution is presented as a histogram. The functionality of this window includes:
1. Show (hide) any object in the scene consisting of axis and histogram.
2. Build the probability distribution histogram using the following rules:
   2.1. The probability distribution histogram consists of layers.
   2.2. The number of layers is equal to maximum value of the original atlas function.
   2.3. Each layer is a parallelepiped (the default type).
   2.4. The height of each layer is fixed.
   2.5. The width and length of the layer is directly dependent on one of the following:
      2.5.1. The number of voxels in which the atlas function value is equal to the number of this layer.
      2.5.2. The number of voxels in which the atlas function value is bigger than number of this layer.
      2.5.3. The number of voxels in which the atlas function value is bigger or equal to number of this layer.
      2.5.4. The number of voxels in which the atlas function value is less than number of this layer.
      2.5.5. The number of voxels in which the atlas function value is less or equal to number of this layer.
3. Select any layer with a selecting device.
4. Change type of layer, for example, layer can be ellipsoid, cylinder, parallelepiped, etc.

5.1.1.4 Parameter Window

Figure 30:
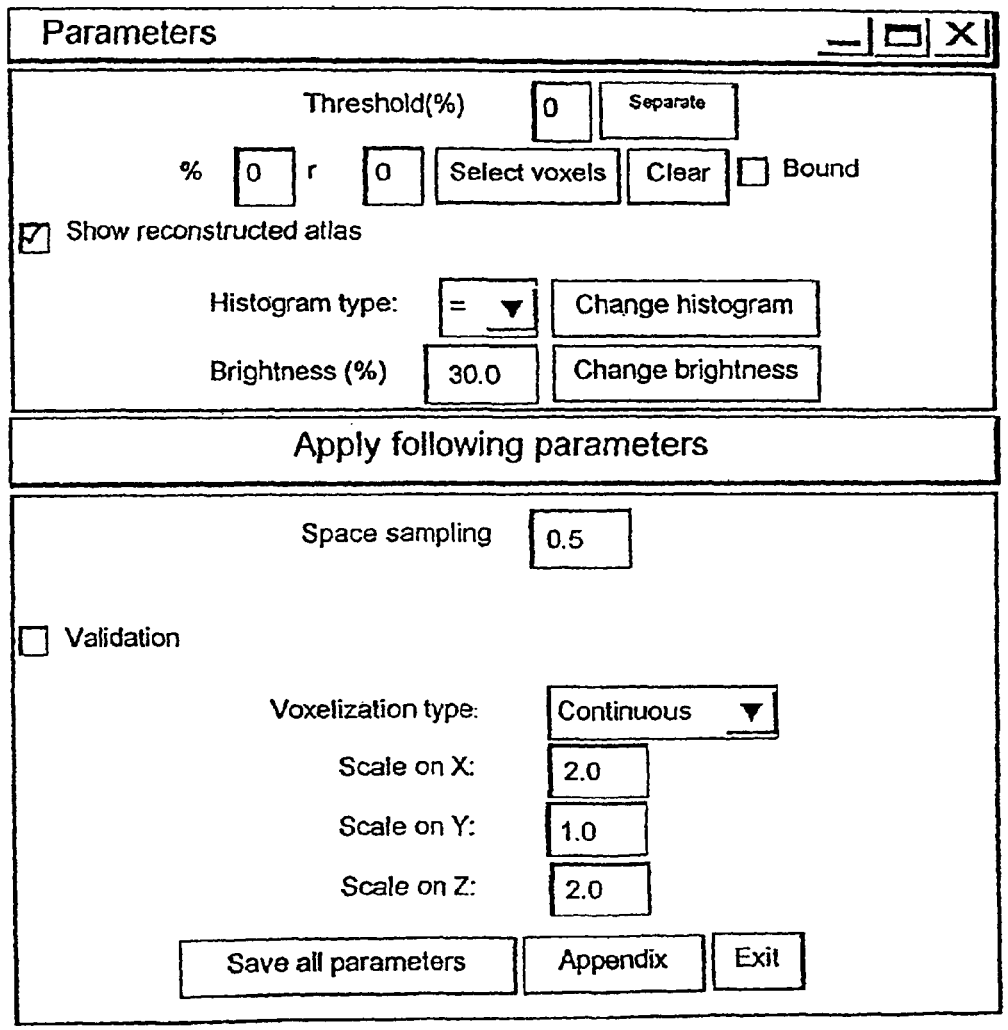
FIG. 30 shows a window named Parameters using which the key properties of all windows are set.

The window for setting the parameters is named Parameters and it is shown in the lower right side of FIG. 29(a), and in more detail in FIG. 30. Its items, as presented in FIG. 30, are from the top to bottom as follows:
1. The box in which the user can enter a numerical value to set the separation threshold of the atlas function. The separation threshold separates the visible part of the atlas function from its hidden part. By setting this parameter, the user can show (hide) some parts of the atlas function according to the value of threshold. For example, if this threshold is set to 50%, then this part of the atlas function, where probability is equal or bigger than half of the maximum value, is visible only.
2. Boxes in which the user can enter numerical values to select a group of voxels.
3. A box in which the user can add or remove a tick symbol to toggle between the original and reconstructed atlas function.
4. A box in which the user can select from a set of predetermined options a type of probability distribution histogram.
5. A box in which the user can enter a numerical value to set the brightness of the atlas function.
6. A box in which the user can enter a numerical value to set size of voxels ("space sampling").
7. A box in which the user can click on to enable (or disable) checking of an individual contact in the input data this parameter is enabled, then during the atlas function calculation for each contact the algorithm checks all voxels from the current result list L against their actual intersection with the considered contact based on conditions C3-C4. If some voxel does not actually intersect this contact, then it is marked (with special colour) and an error is reported. Two types of errors are reported: 1) external error when a voxel with center in (x,y,z) intersects the contact but a(x,y,z) is equal to 0; 2) internal error when a voxel with center in (x,y,z) does not intersect the contact but resulting a(x,y,z) is bigger than zero (by taking also into account antialiasing).
8. A box in which the user can select the voxelization algorithm: continuous or discrete.
9. A three boxes in which the user sets the scaling of the data in respective orthogonal directions (x, y and z). The input data can be scaled in all three orientations before starting the calculation of atlas function. This gives an additional flexibility in determining of the atlas space.

5.1.1.5 Data Selection Window

Figure 31:
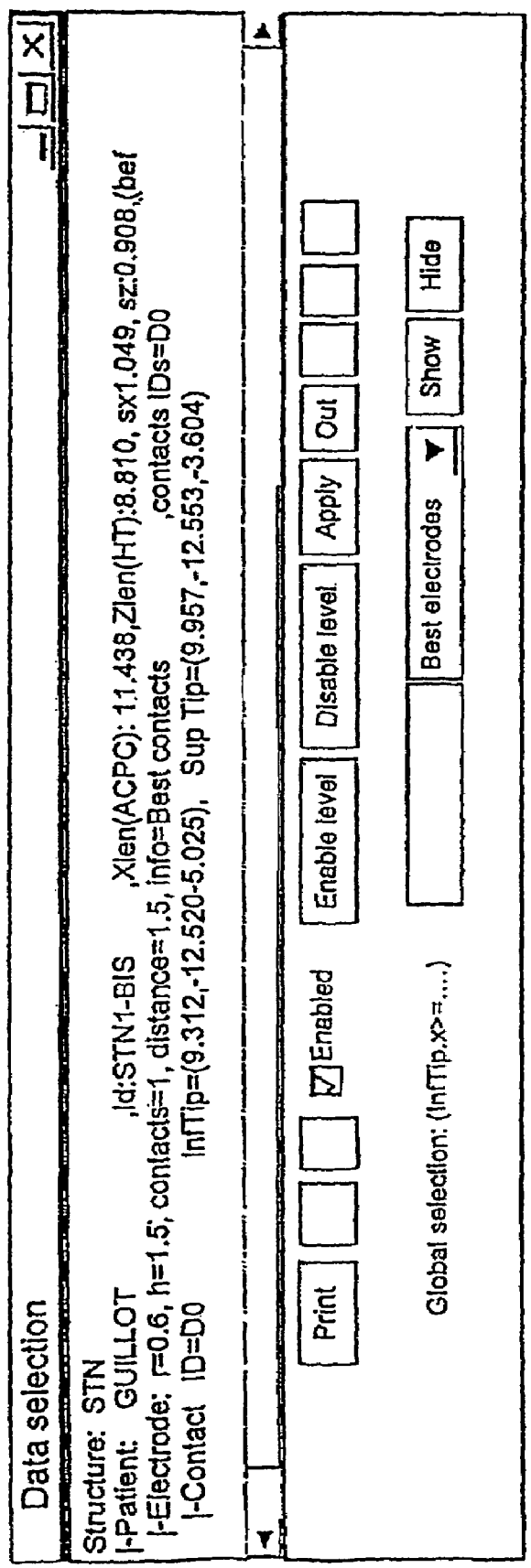
FIG. 31 shows a window named Data selection using which the input data represented as a tree structure are managed.

The window for data selection is named Data selection and it is presented in the centre of the left side of FIG. 29(*a*), and in FIG. 31. Its functionality includes, as indicated in FIG. 31:
1. Exploring the tree structure of the data (this is done using the frame near the top of the window).
2. Printing the current structure, patient, electrode, and contact (using the button "PRINT").
3. Show/hide the subtree of the current structure, or edit/delete the current structure, or add a new structure.
4. Show/hide the subtree of the current patient, or edit/delete the current patient, or add a new patient.
5. Show/hide the subtree of the current electrode, or edit/delete the current electrode, or add a new electrode.
6. Show/hide/edit/delete the current contact, or add a new contact.

5.1.1.6 Message Window

The window for displaying the messages is named Messages and it is shown at the lower left of FIG. 29(*a*). Its functionality includes:
1. Show any error messages.
2. Show any numerical and text messages.

5.1.2 Event Interface.

The atlas function-related events, such as navigation, are synchronized in all windows. The events for navigation in the atlas space and viewing control are described below.

5.1.2.1 Synchronization Between the PFM and PFM Slice Windows

Figure 32A:
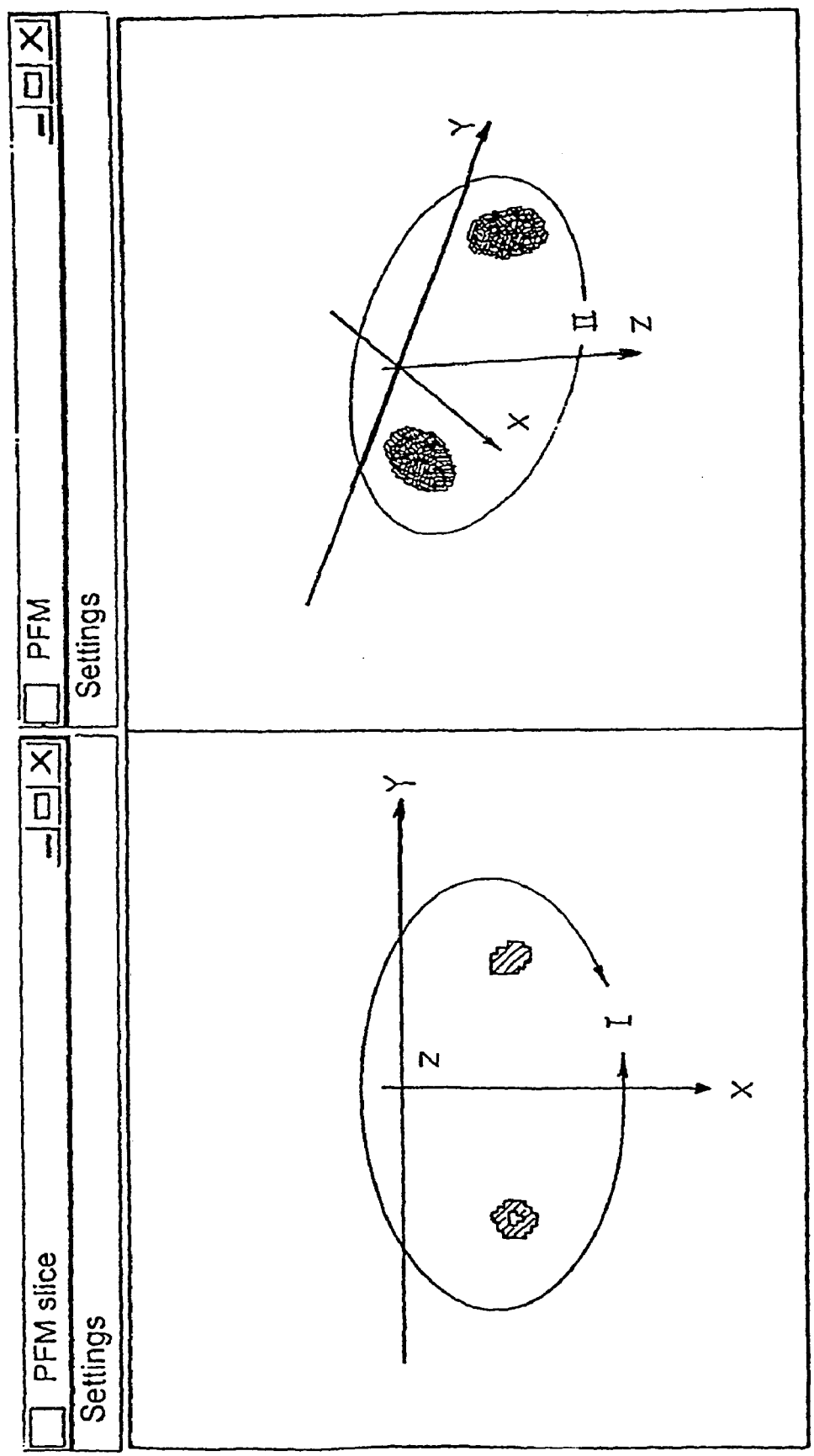
FIG. 32(a) illustrates synchronization between the PFM and PFM slice windows. An axial position of the plane is shown in the right window and the corresponding probabilistic functional map is shown in the left window.
Figure 32C:
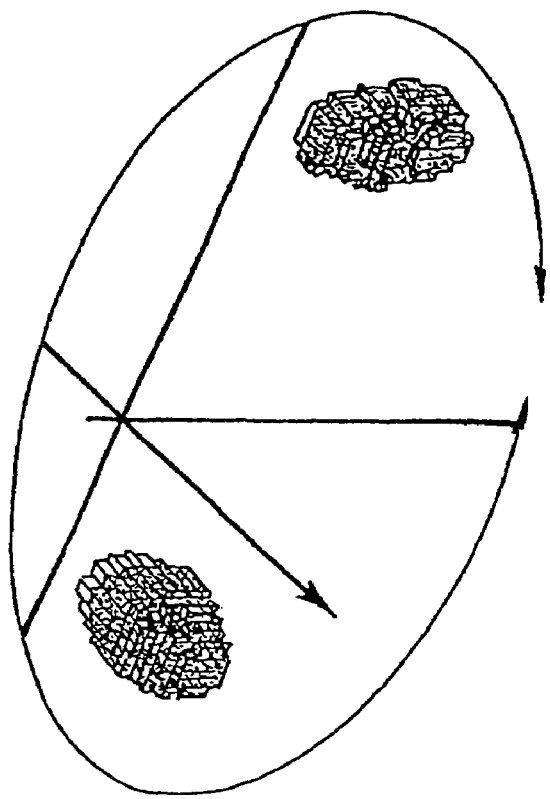
FIG. 32(c) illustrates the portion of FIG. 32(a) marked II.
Figure 32B:
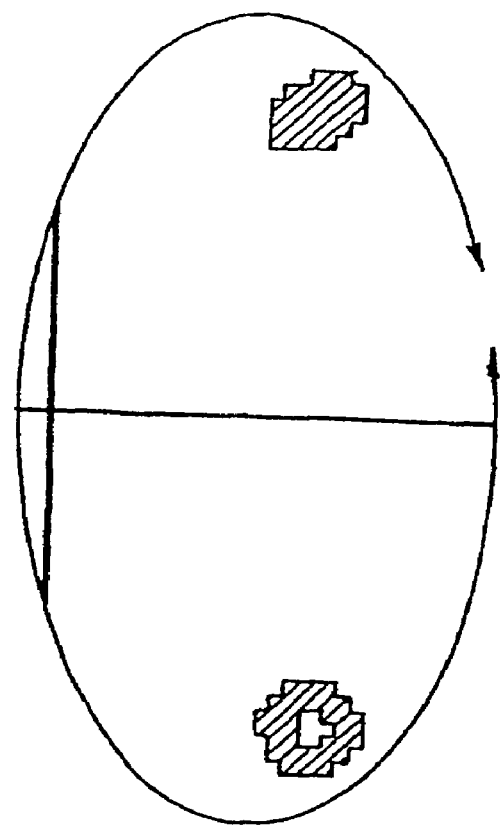
FIG. 32(b) illustrates the portion of FIG. 32(a) marked I.
Figure 32D:
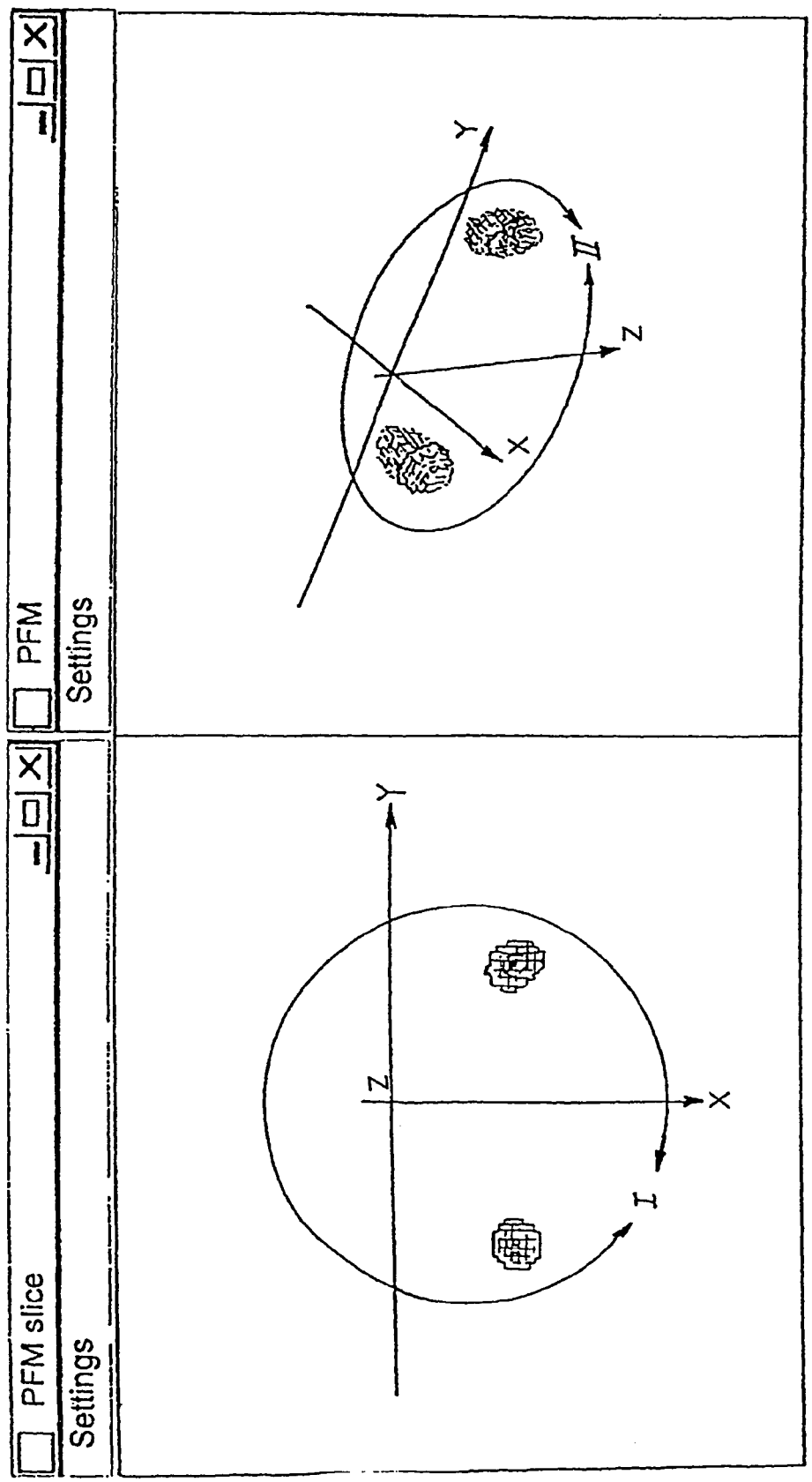
FIG. 32(d) illustrates the position of the axial plane changed by few millimetres in comparison to that in FIG. 32(a).
Figure 32F:
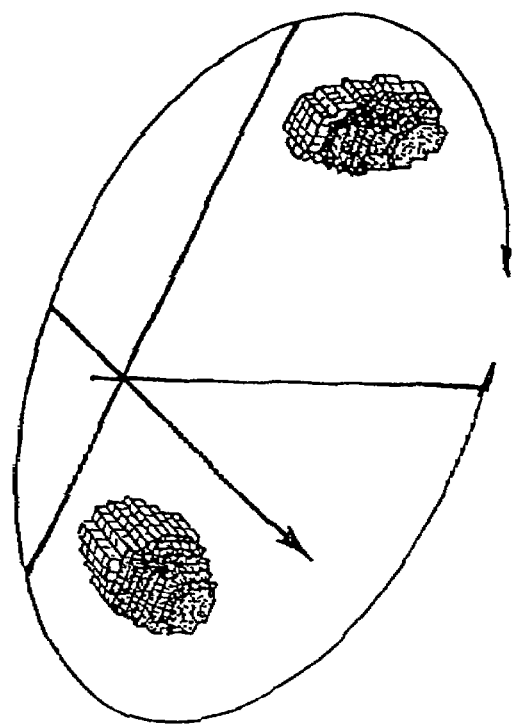
FIG. 32(f) illustrates the portion of FIG. 32(d) marked II.
Figure 32E:
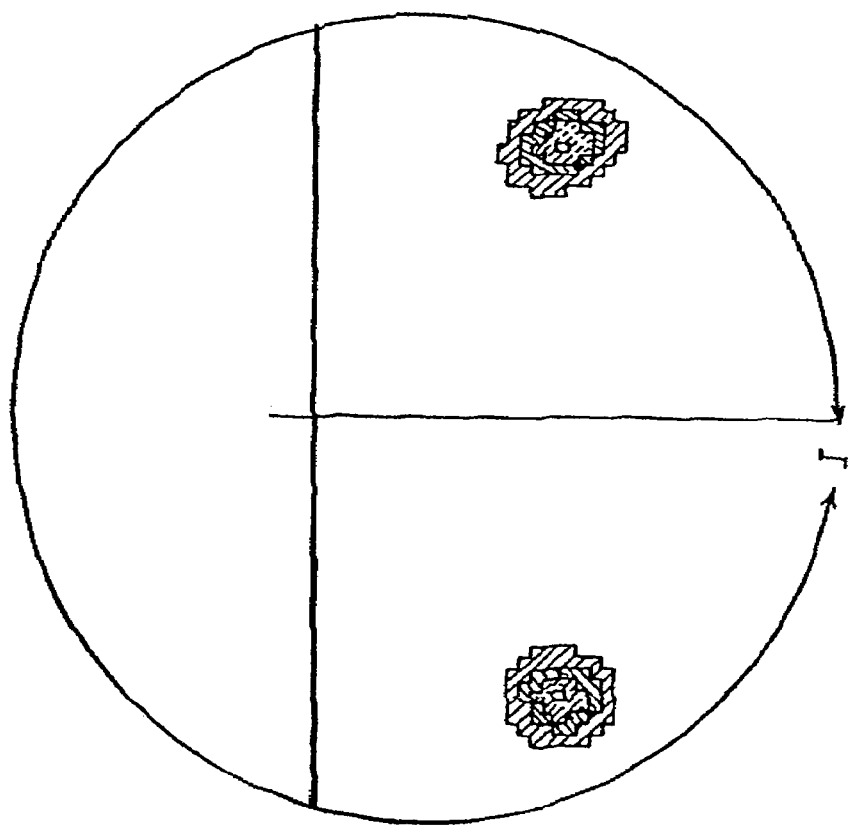
FIG. 32(e) illustrates the portion of FIG. 32(d) marked I.
Figure 32G:
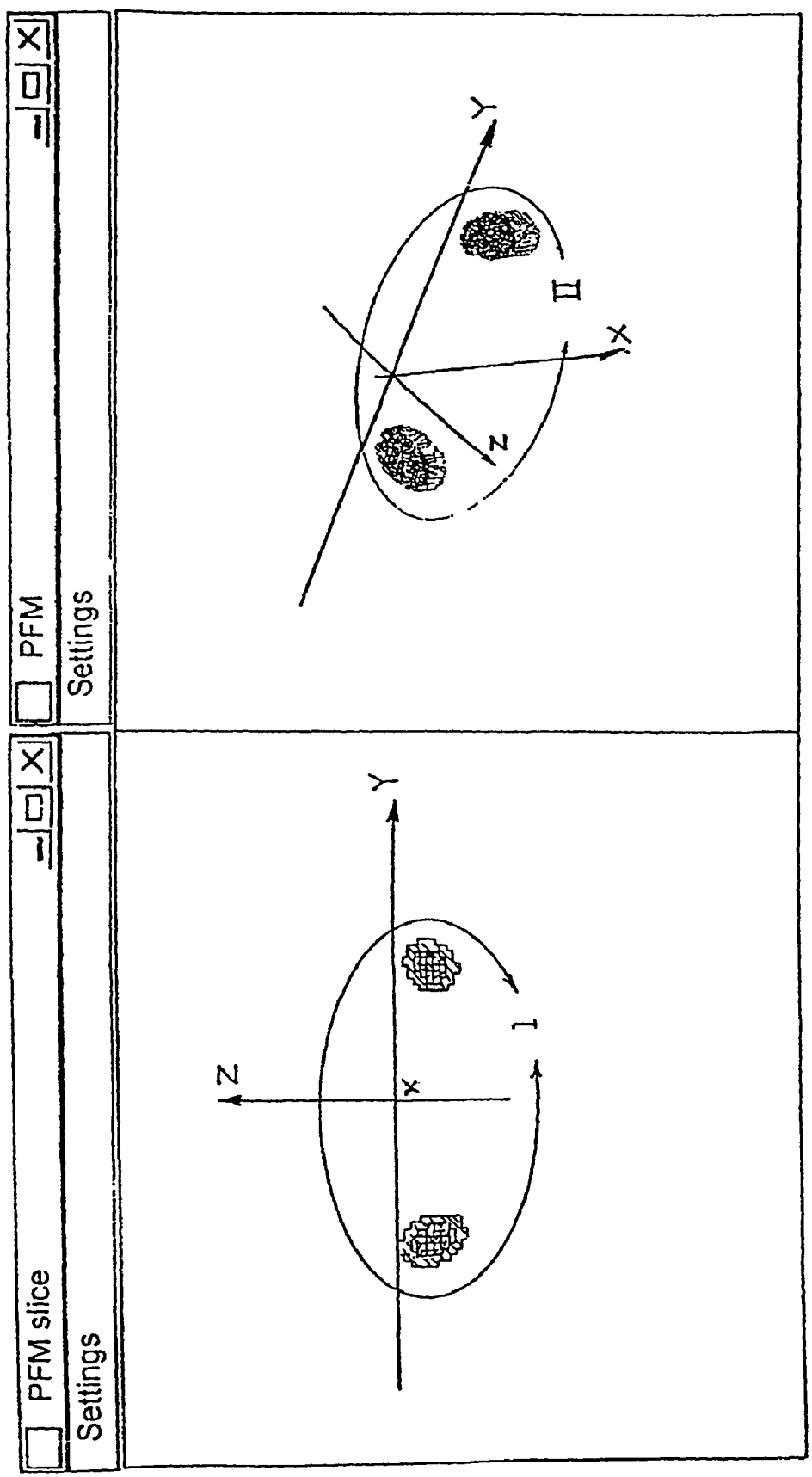
FIG. 32(g) shows a coronal position of the plane and the corresponding probabilistic functional map.
Figure 32:
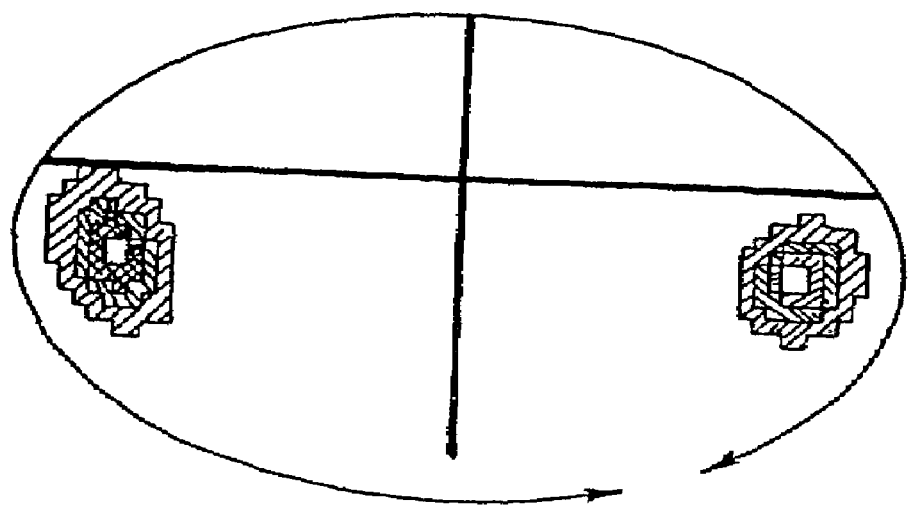
FIG. 32(h) illustrates the portion of FIG. 32(g) marked I.
FIG. 32(i) illustrates the portion of FIG. 32(g) marked II.
FIG. 32(j) shows a sagittal position of the plane and the corresponding probabilistic functional map.
FIG. 32(k) illustrates the portion of FIG. 32(j) marked I.
FIG. 32(l) illustrates the portion of FIG. 32(j) marked II.
Figure 32I:
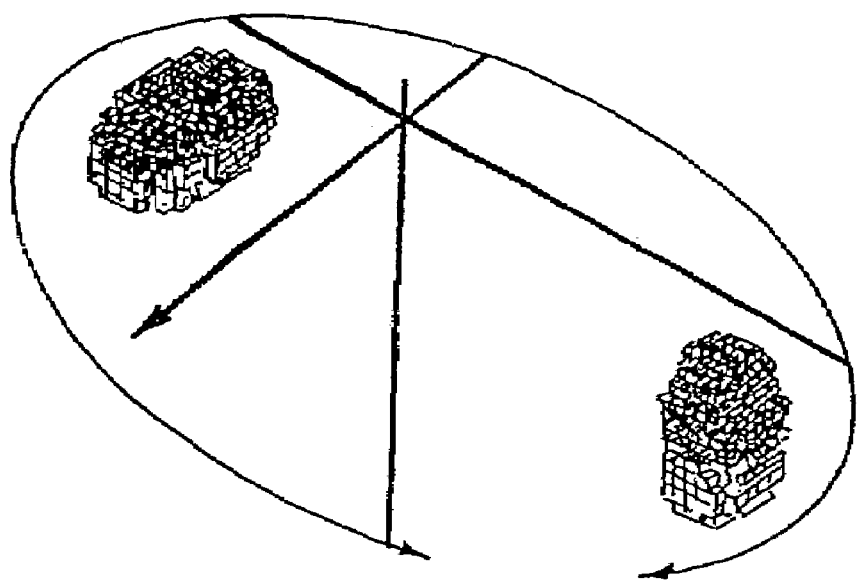
Figure 32J:
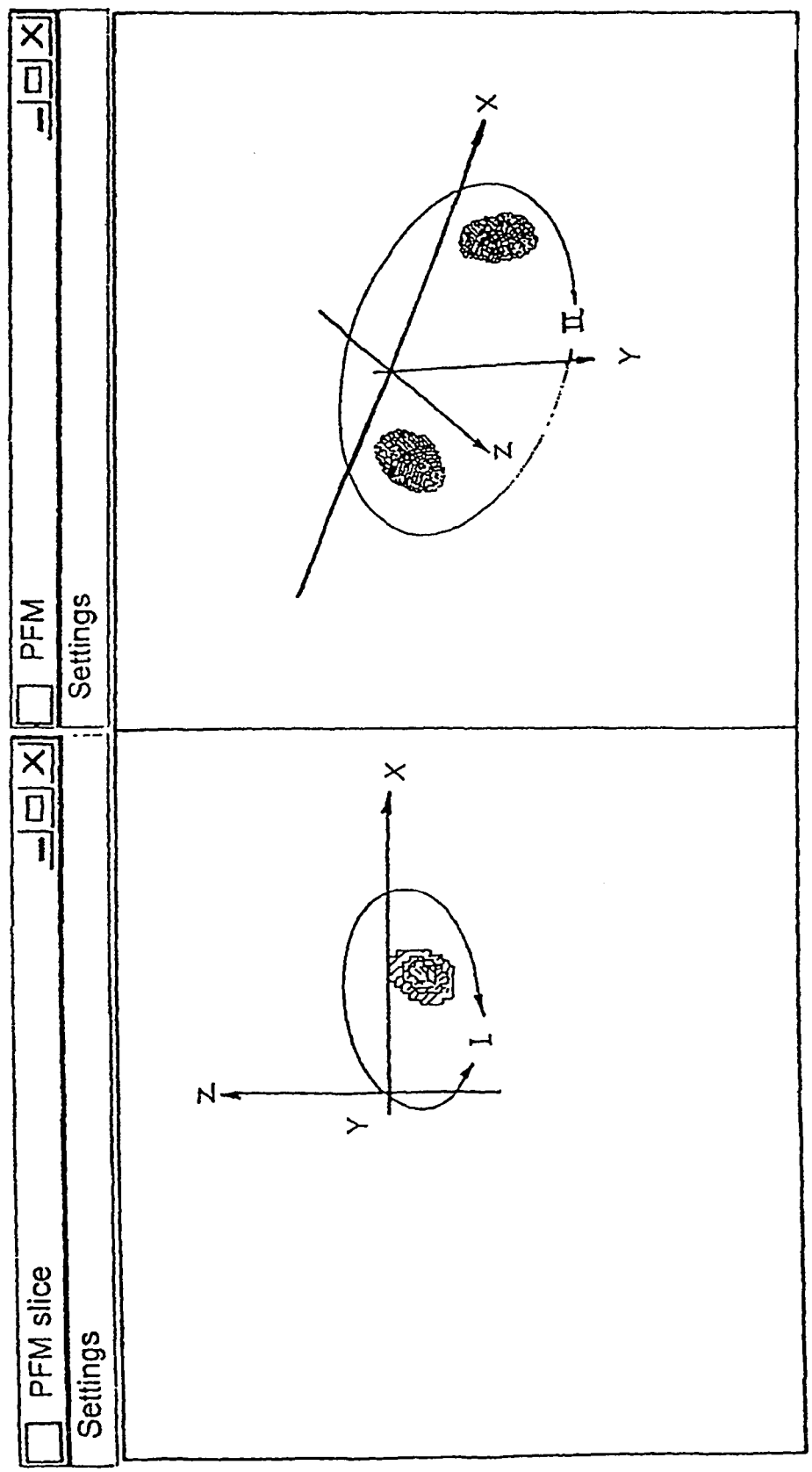
Figure 32L:
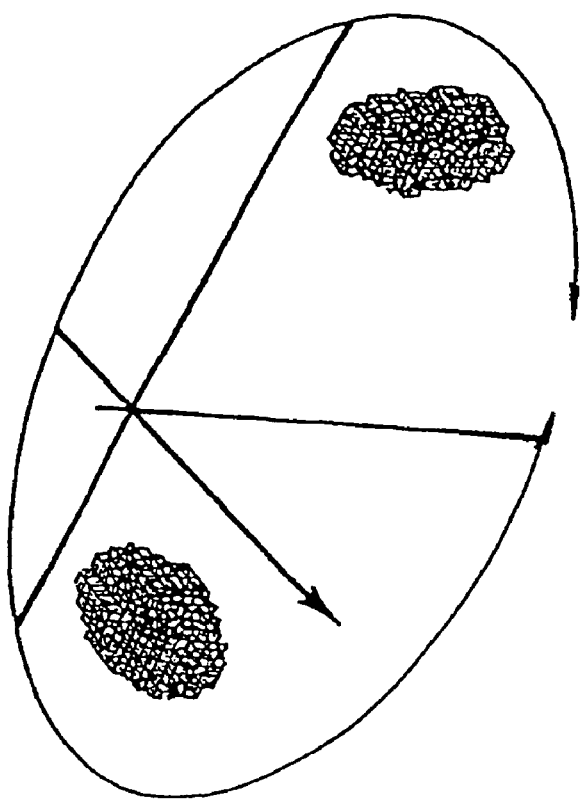
Figure 32K:
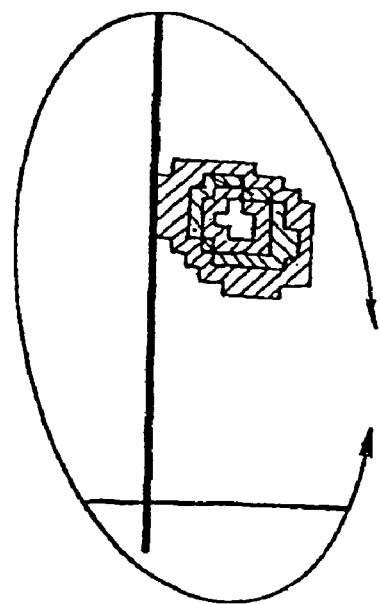

The navigation in the PFM and PFM slice windows is done by using buttons that control the position of plane and selection of orientation view as follows:
1. <<—go to the first position of the plane;
2. <—go to the previous position of the plane;
3. >—go to the next position of the plane;
4. >>—go to the last position of the plane;
5. XY(A)—set axial view;
6. YZ(C)—set coronal view;
7. XZ(S)—set sagittal view;

The selected plane is controlled in the PFM and PFM slice windows simultaneously as illustrated in FIGS. 32(*a*) to (*l*).

FIG. 32(*a*) illustrates synchronization between the PFM and PFM slice windows. An axial position of the plane is shown in the right window and the corresponding probabilistic functional map is shown in the left window. The portion of FIG. 32(*a*) marked I is shown enlarged as FIG. 32(*b*), and the portion of FIG. 32(*a*) marked II is shown enlarged as FIG. 32(*c*).

FIG. 32(*d*) illustrates the position of the axial plane changed by few millimeters. The portion of FIG. 32(*d*) marked I is shown enlarged as FIG. 32(*e*), and the portion of FIG. 32(*d*) marked II is shown enlarged as FIG. 32(*f*).

FIG. 32(*g*) shows a coronal position of the plane and the corresponding probabilistic functional map. The portion of FIG. 32(*g*) marked I is shown enlarged as FIG. 32(*h*), and the portion of FIG. 32(*h*) marked II is shown enlarged as FIG. 32(*i*).

FIG. 32(*j*) shows a sagittal position of the plane and the corresponding probabilistic functional map. The portion of FIG. 32(*j*) marked I is shown enlarged as FIG. 32(*k*), and the portion of FIG. 32(*j*) marked II is shown enlarged as FIG. 32(*l*).

5.1.2.2 Synchronization Between Histogram and PFM Slice Windows

Figure 33:
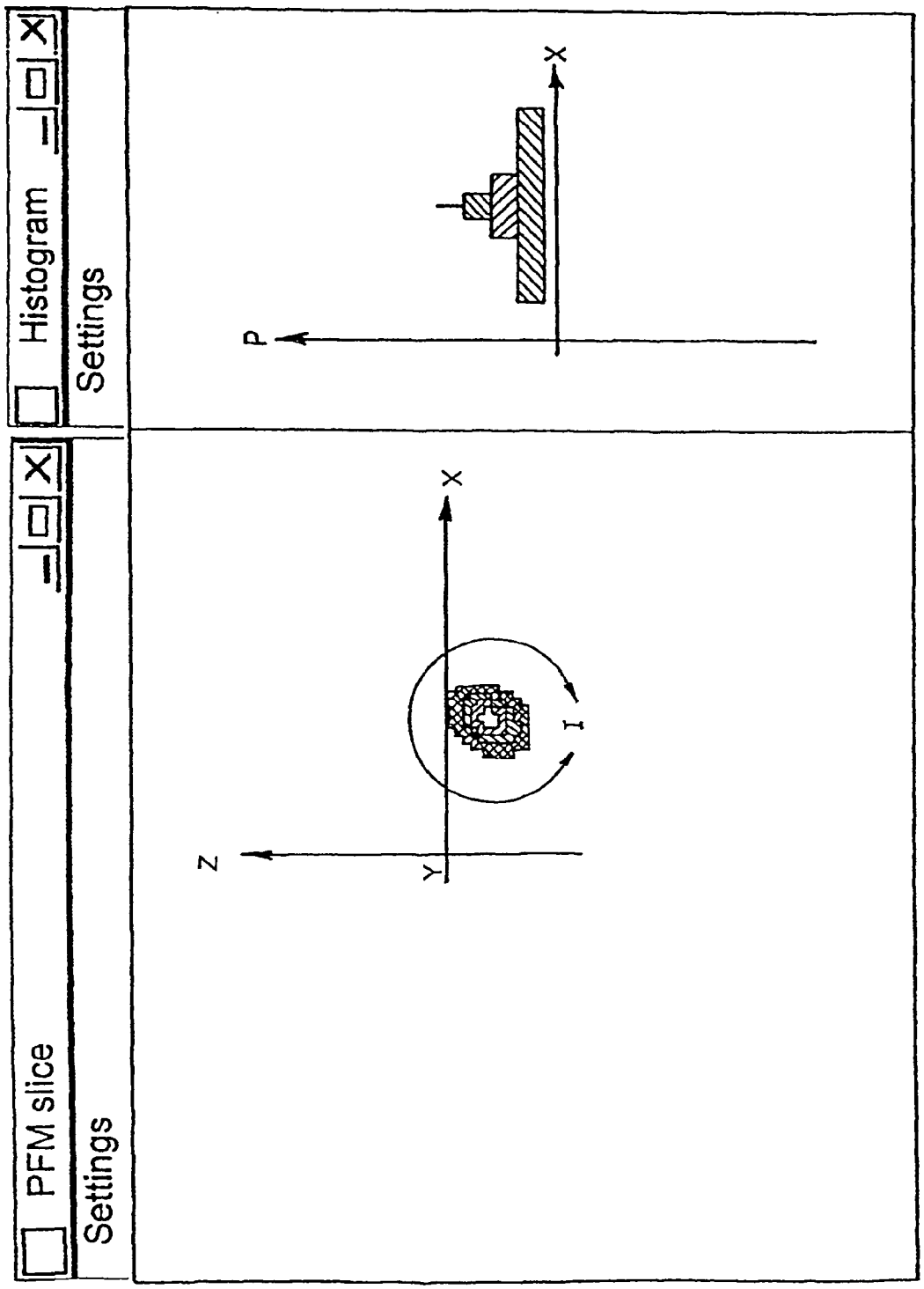
FIG. 33(a) illustrates synchronization between windows called PFM slice and Histogram. The first layer (bottom) is selected by the user in the right window, and the corresponding voxels are selected automatically by the application and marked in the left window.
FIG. 33(b) illustrates the portion of FIG. 33(a) marked I.
FIG. 33(c) illustrates synchronization between PFM slice and Histogram windows. The third layer is selected by the user in the right window, and the corresponding voxels are selected automatically by the application and marked in the left window.
FIG. 33(d) illustrates the portion of FIG. 33(c) marked I.
Figure 33B:
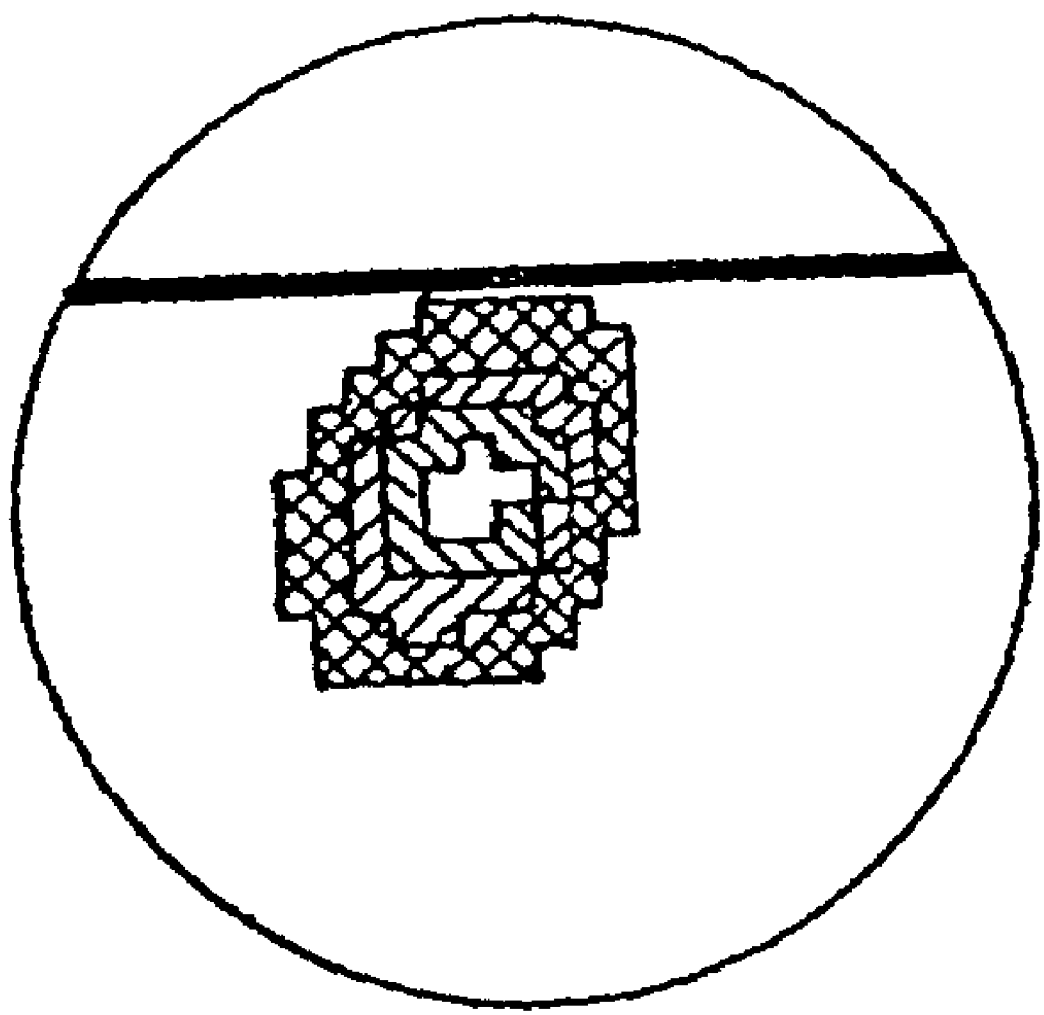
Figure 33C:
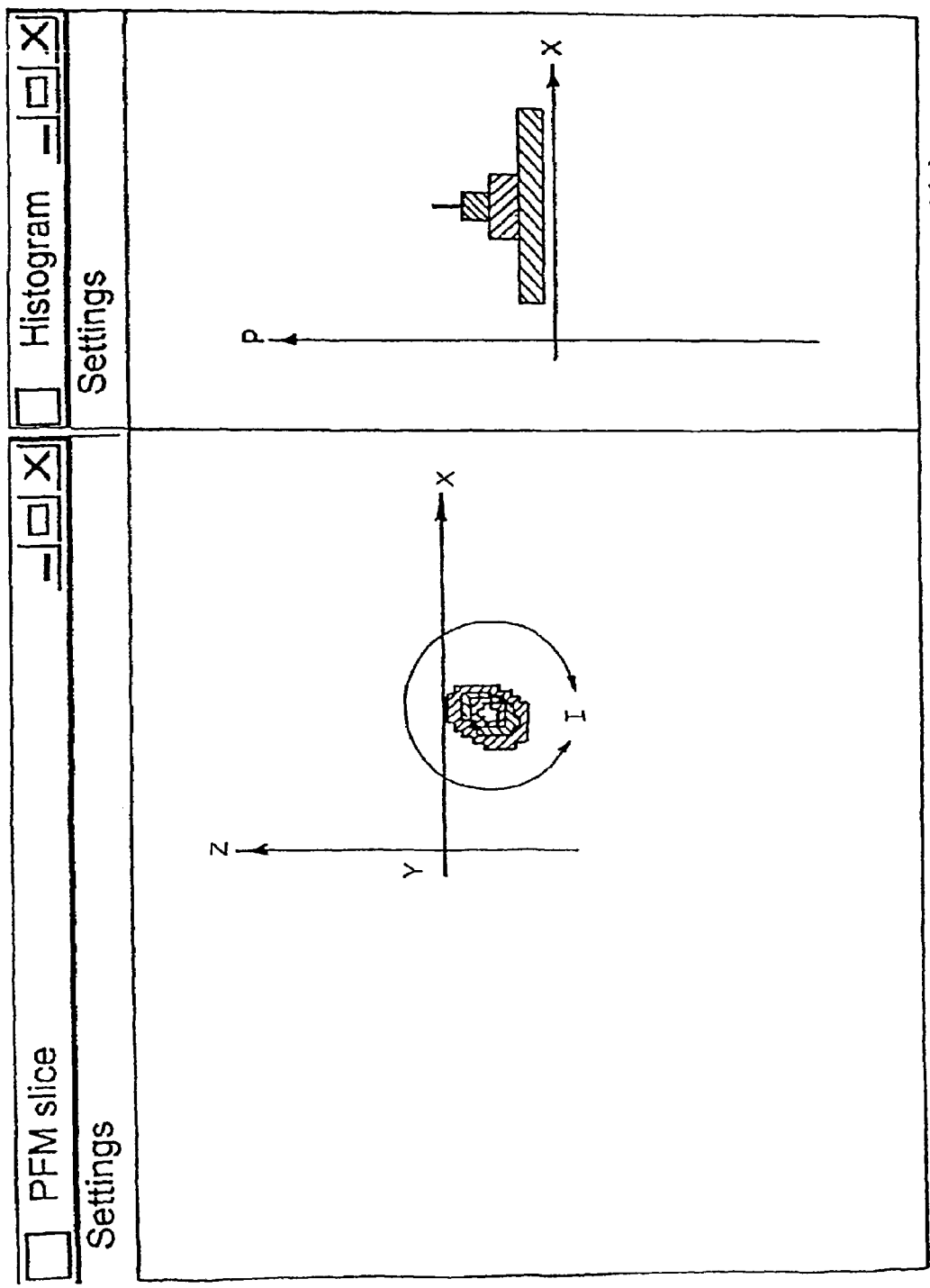
Figure 33D:
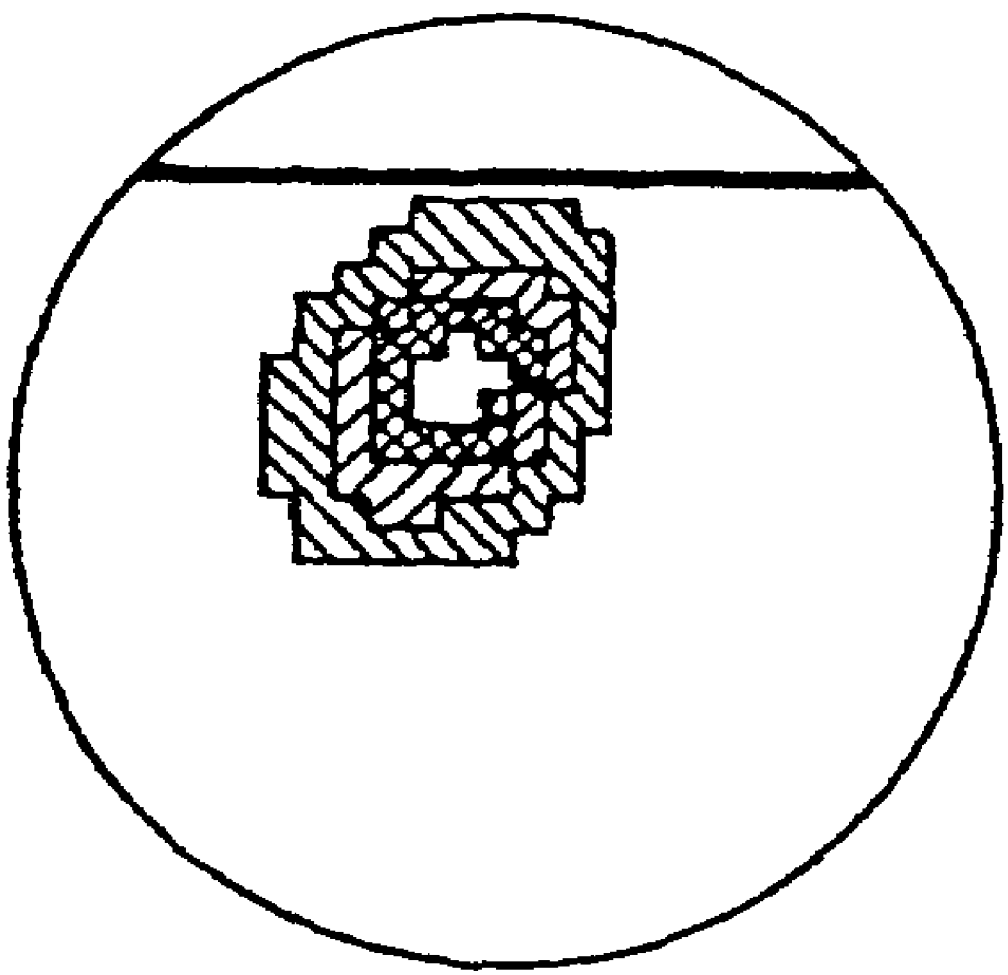

The user can select any given layer of the probability distribution histogram using his selecting device in the window called Histogram. In this case, the corresponding voxels are highlighted in PFM slice (i.e., the voxels with the probability of the selected layer). FIGS. 33(*a*) and 33(*c*) show synchronization between PFM slice and Histogram. In FIG. 33(*a*) the first layer (bottom) is selected by the user in the right-hand window by clicking on that layer, and the corresponding voxels are selected automatically by the atlas function-based application and marked in the left window. The portion of FIG. 33(*a*) marked I is shown enlarged as FIG. 33(*b*), where the selected voxels are marked cross-hatched. In FIG. 33(*c*) the third layer is selected by the user clicking on that layer in the right window, and the corresponding voxels are selected automatically and marked in the left window. The portion of FIG. 33(*c*) marked I is shown enlarged as FIG. 33(*d*), with the selected voxels again marked by cross-hatching.

Figure 34:
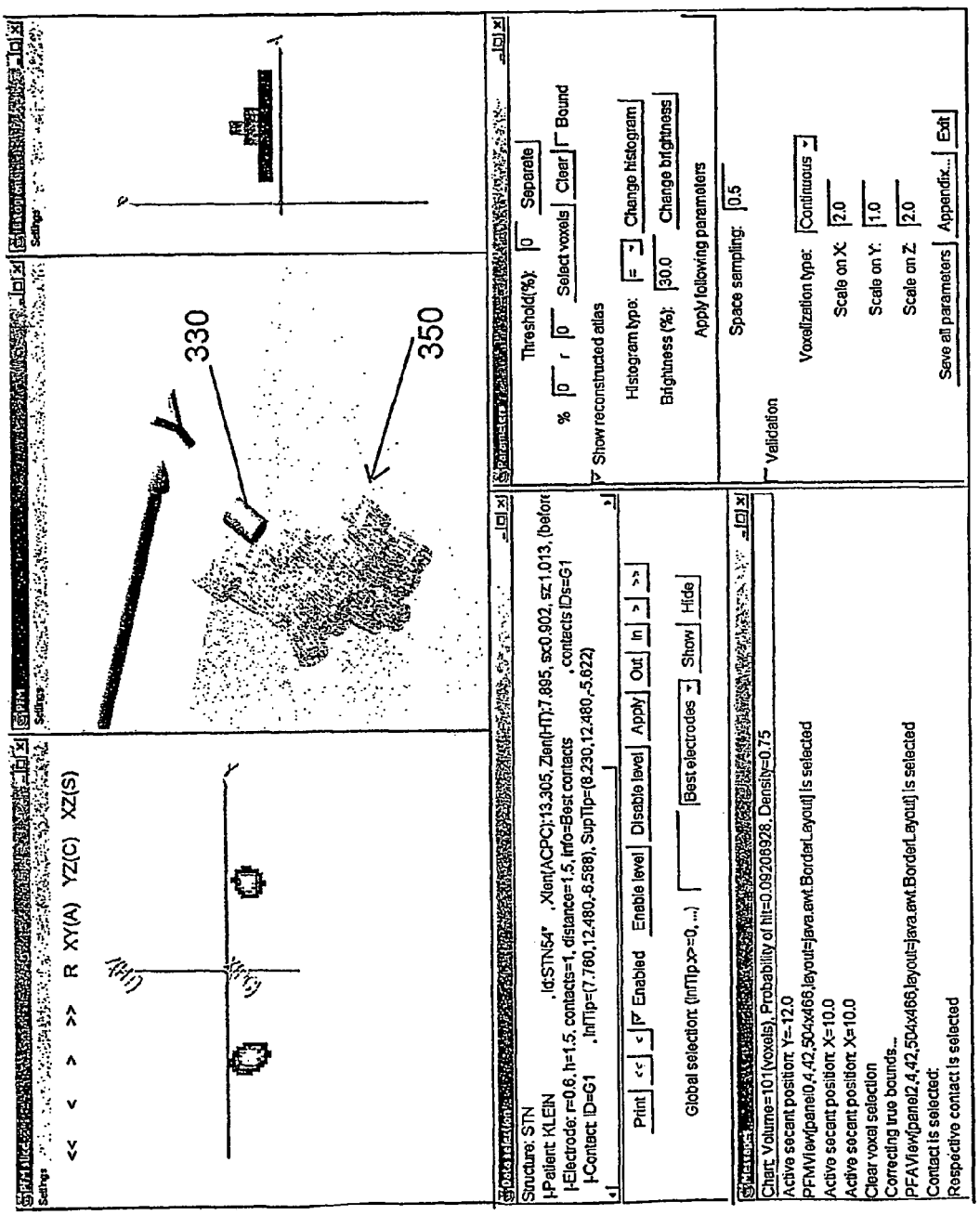
FIG. 34 illustrates synchronization between Data selection and other windows when a contact is selected.
Figure 35:
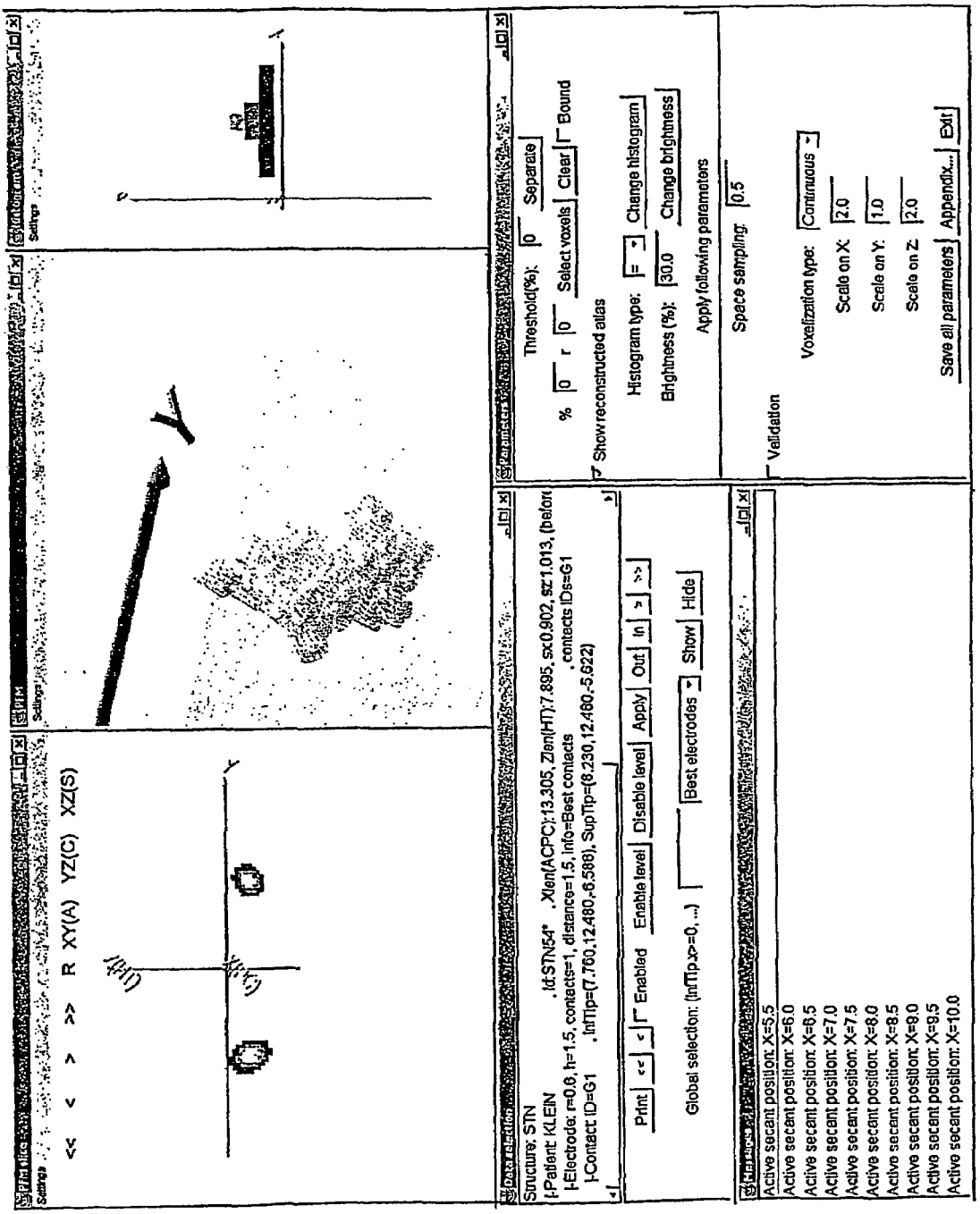
FIG. 35 illustrates synchronization between Data selection and other windows when data is changed.

5.1.2.3 Synchronization Between the Data Selection Window and the PFM, PFM Slice, and Histogram Windows There are two types of synchronizations:
1. When a contact is selected, then information about this contact is displayed in Data selection. FIG. 34 shows synchronization between PFM and Data selection windows. A cluster of contacts (each having a cylindrical shape) is labeled 350 in PFM, and the selected contact is marked (as the cylinder labeled 330) and full information about this contact is displayed in Data selection.
2. When data is changed in Data selection, then PFM, PFM slice, and Histogram are automatically refreshed. FIG. 35 illustrates synchronization between Data selection and other windows when data is changed. In FIG. 35, the contact 330 which was marked in FIG. 34 is omitted to indicate that it is disabled in Data selection and after that all windows are refreshed accordingly.

5.1.2.4 Synchronization Between the Parameters Window and the PFM, PFM Slice, and Histogram Windows When any parameter in window Parameters is changed, then PFM, PFM slice, and Histogram are refreshed accordingly.

Figure 36A:
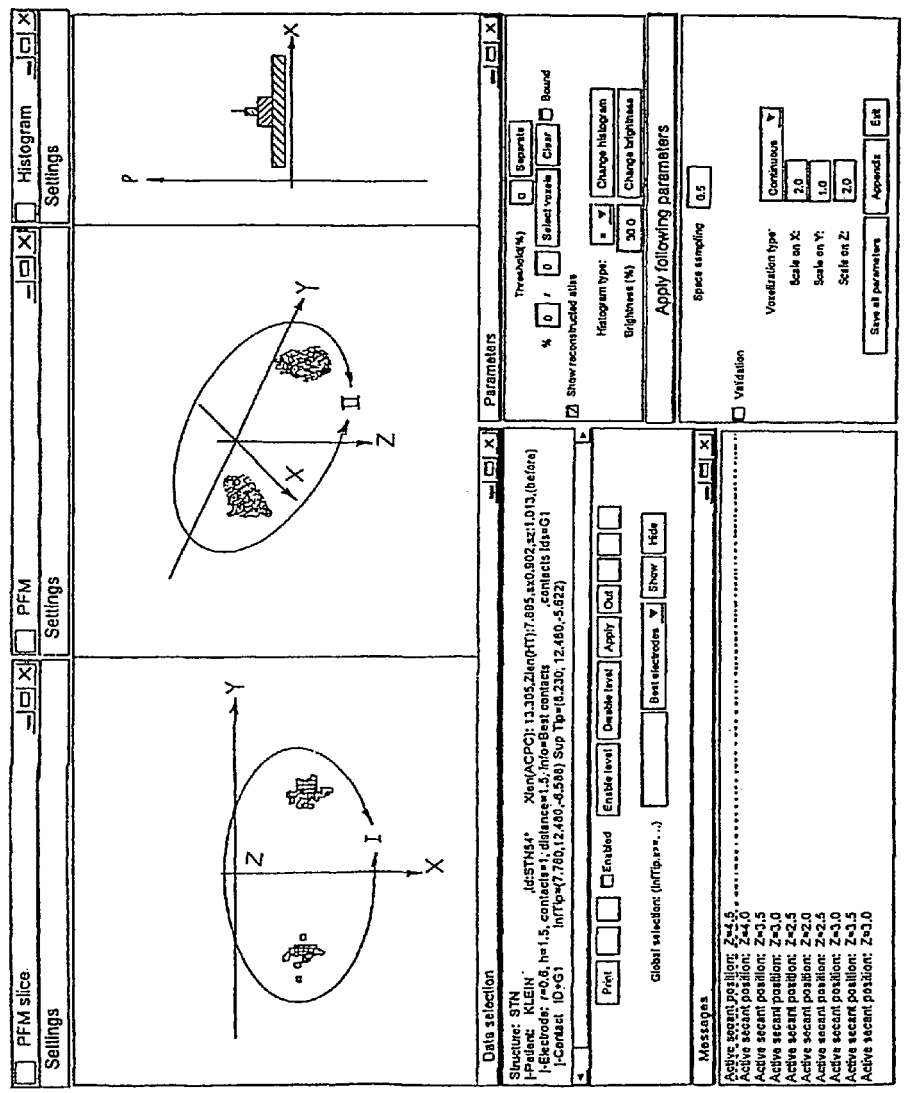
FIG. 36(a) shows synchronization between Parameters and other windows. Option Show reconstructed atlas is switched off.
Figure 36B:
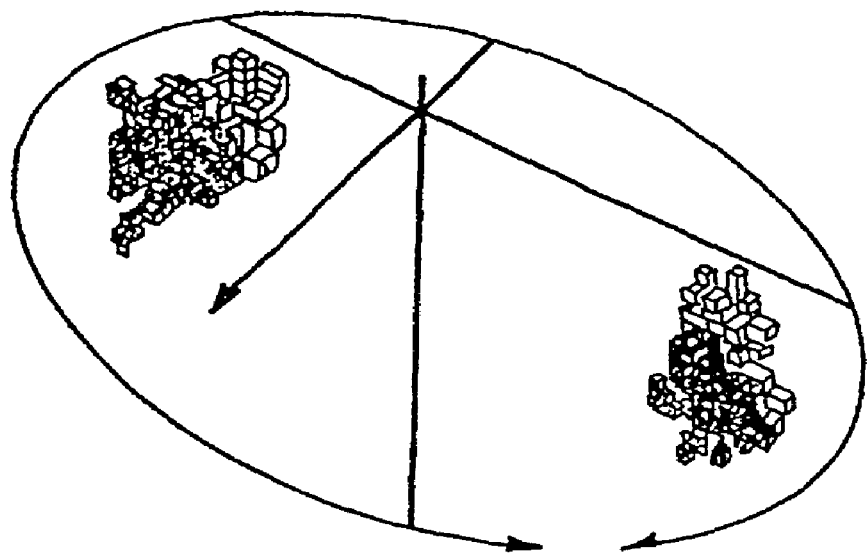
FIG. 36(b) illustrates the portion of FIG. 36(a) marked II.
Figure 36C:
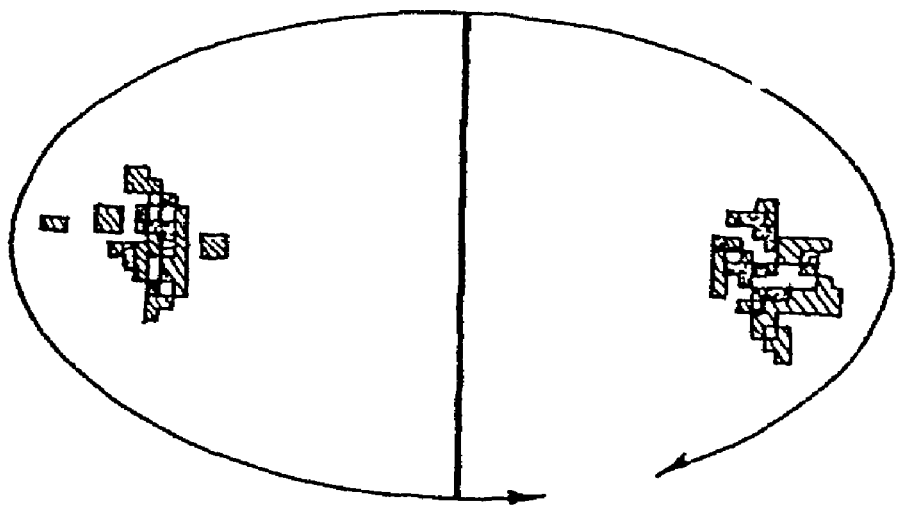
FIG. 36(c) illustrates the portion of FIG. 36(a) marked I.

For example, FIG. 36(*a*) shows synchronization between Parameters and others windows when the option Show reconstructed atlas function is switched off. The portion of FIG. 36(*a*) marked II is shown enlarged as FIG. 36(*b*), and the portion of FIG. 36(*a*) marked I is shown enlarged as FIG. 36(*c*).

Figure 37A:
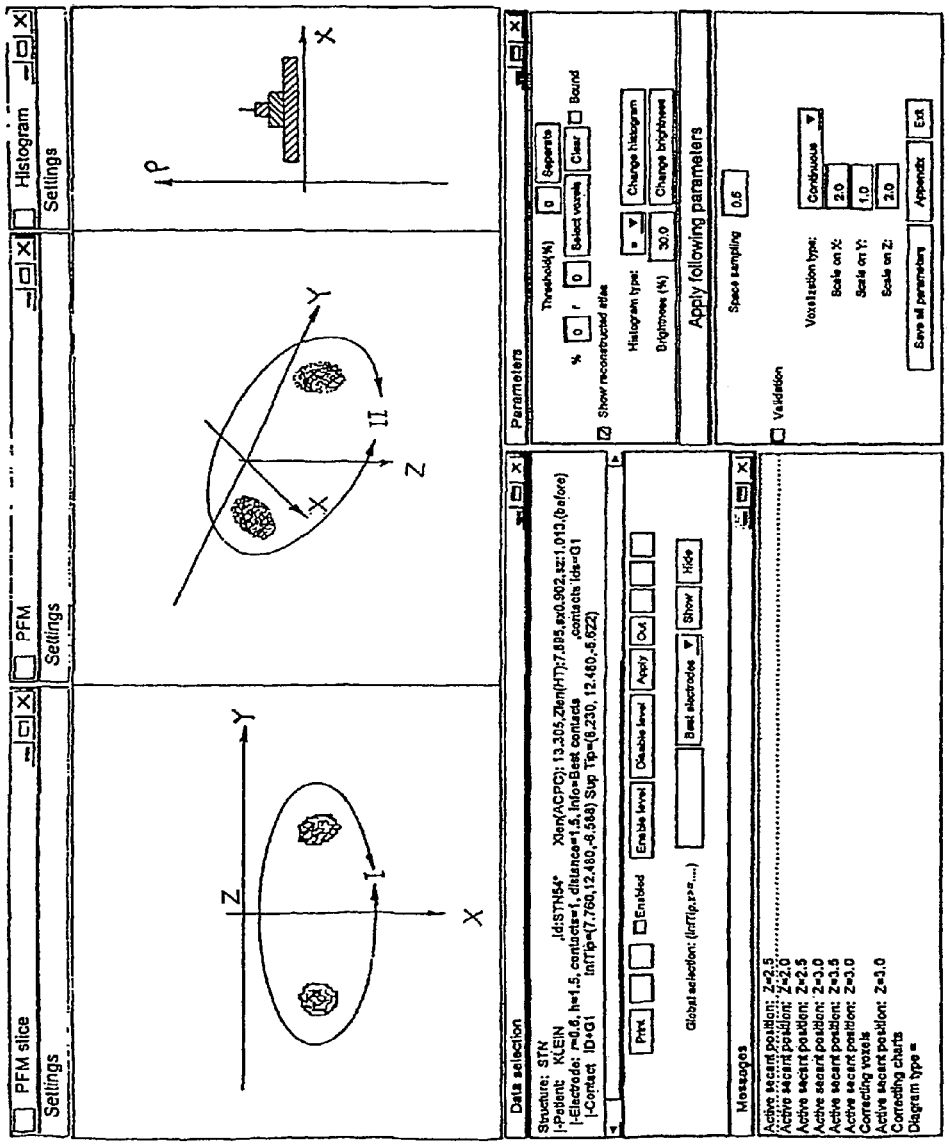
Figure 37C:
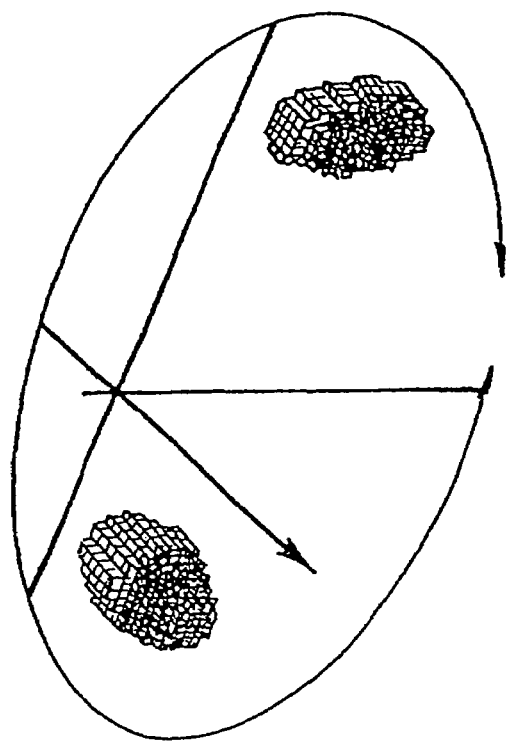
FIG. 37(c) illustrates the portion of FIG. 37(a) marked II.
Figure 37B:
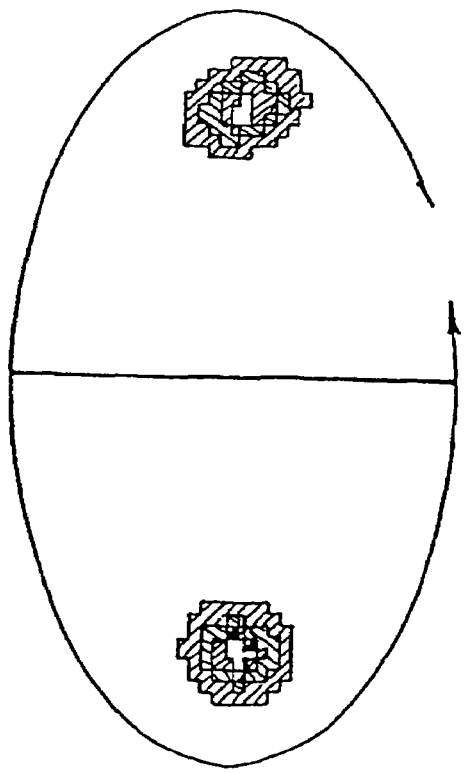
FIG. 37(b) illustrates the portion of FIG. 37(a) marked I.

FIG. 37(*a*) shows synchronization between Parameters and other windows when the option Show reconstructed atlas function is switched on. The portion of FIG. 37(*a*) marked I is shown enlarged as FIG. 37(*b*), and the portion of FIG. 37(*a*) marked II is shown enlarged as FIG. 37(*c*).

5.1.2.5 Synchronization of Message Window with Other Windows.

Figure 38A:
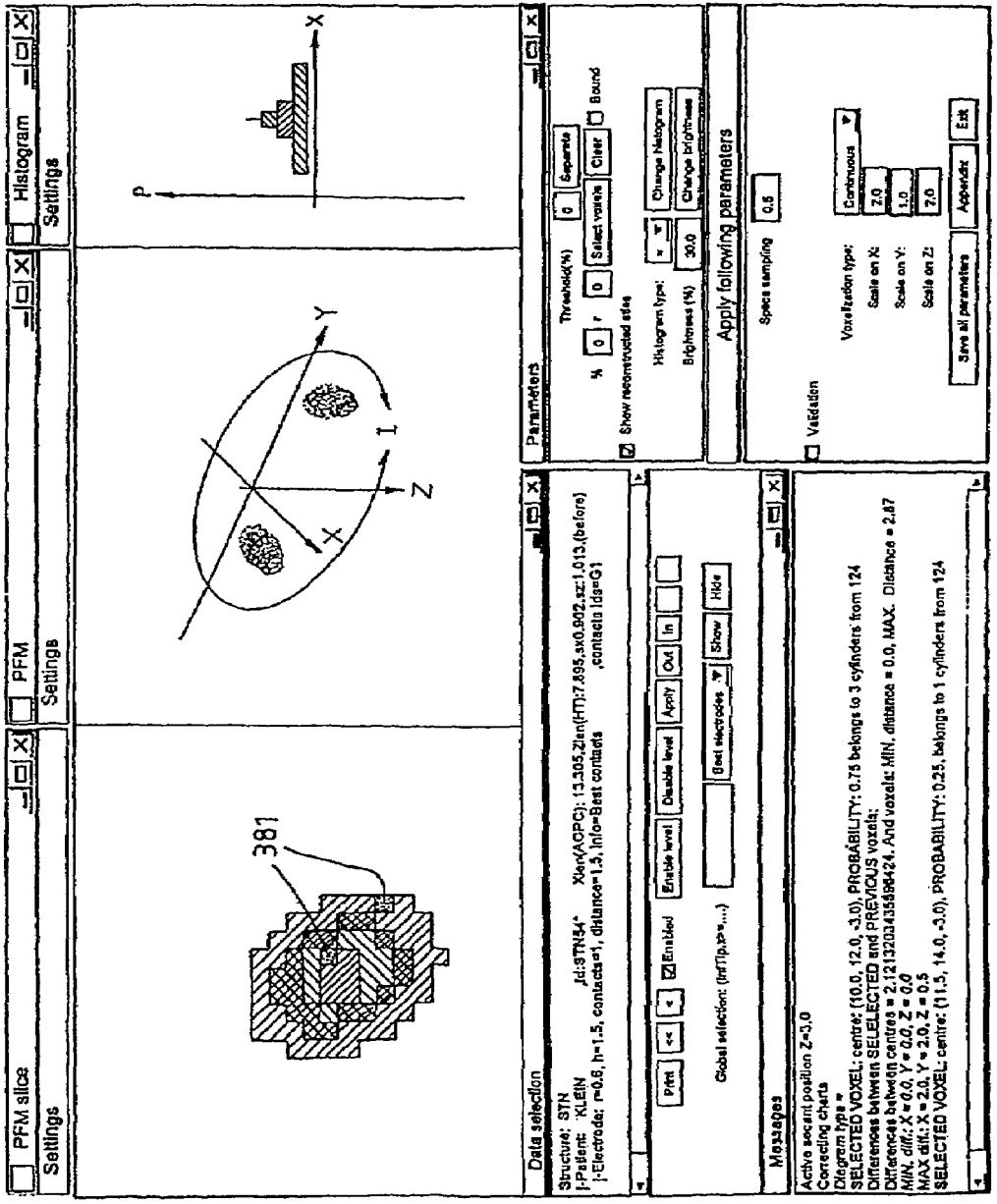
FIG. 38(a) shows synchronization between Messages and PFM slice windows. Two voxels are selected and the corresponding numerical and textual information is displayed in window Messages.
Figure 38B:
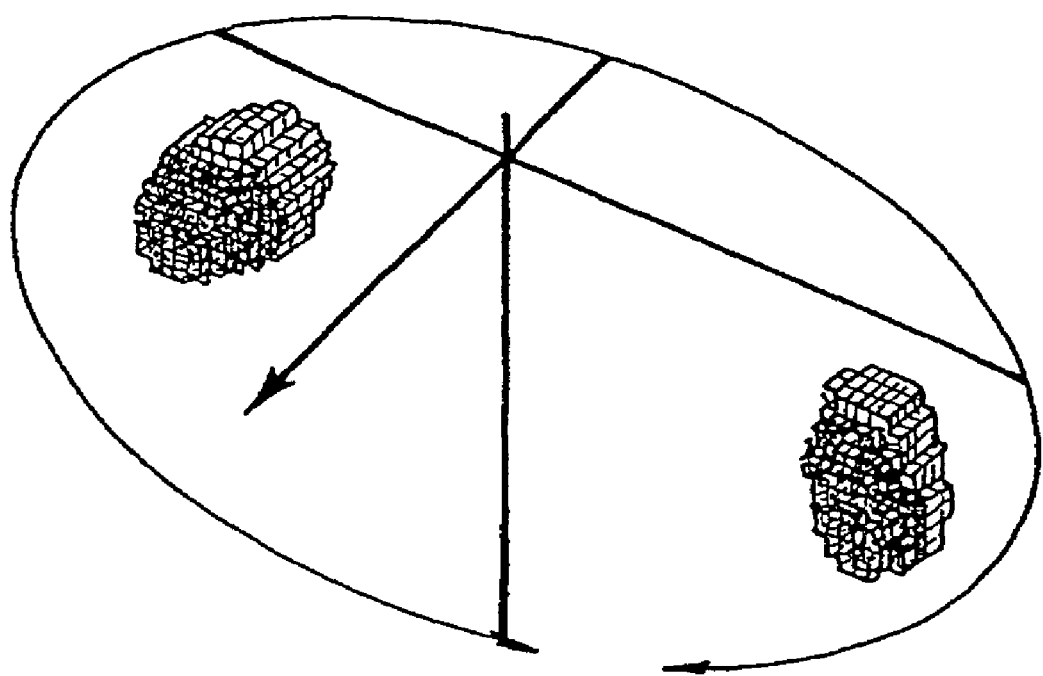
FIG. 38(b) illustrates the portion of FIG. 38(a) marked I.

During interaction, relevant numerical and textual information is displayed in the window Messages, such as messages relating to the process of atlas function building, the process of atlas function reconstruction, and the plane positioning. FIG. 38(*a*) shows synchronization between Messages and PFM slice windows. Two voxels 381 are selected and the corresponding numerical and textual information is displayed in window Messages. The portion of FIG. 38(*a*) marked I is shown enlarged as FIG. 38(*b*).

Figure 39A:
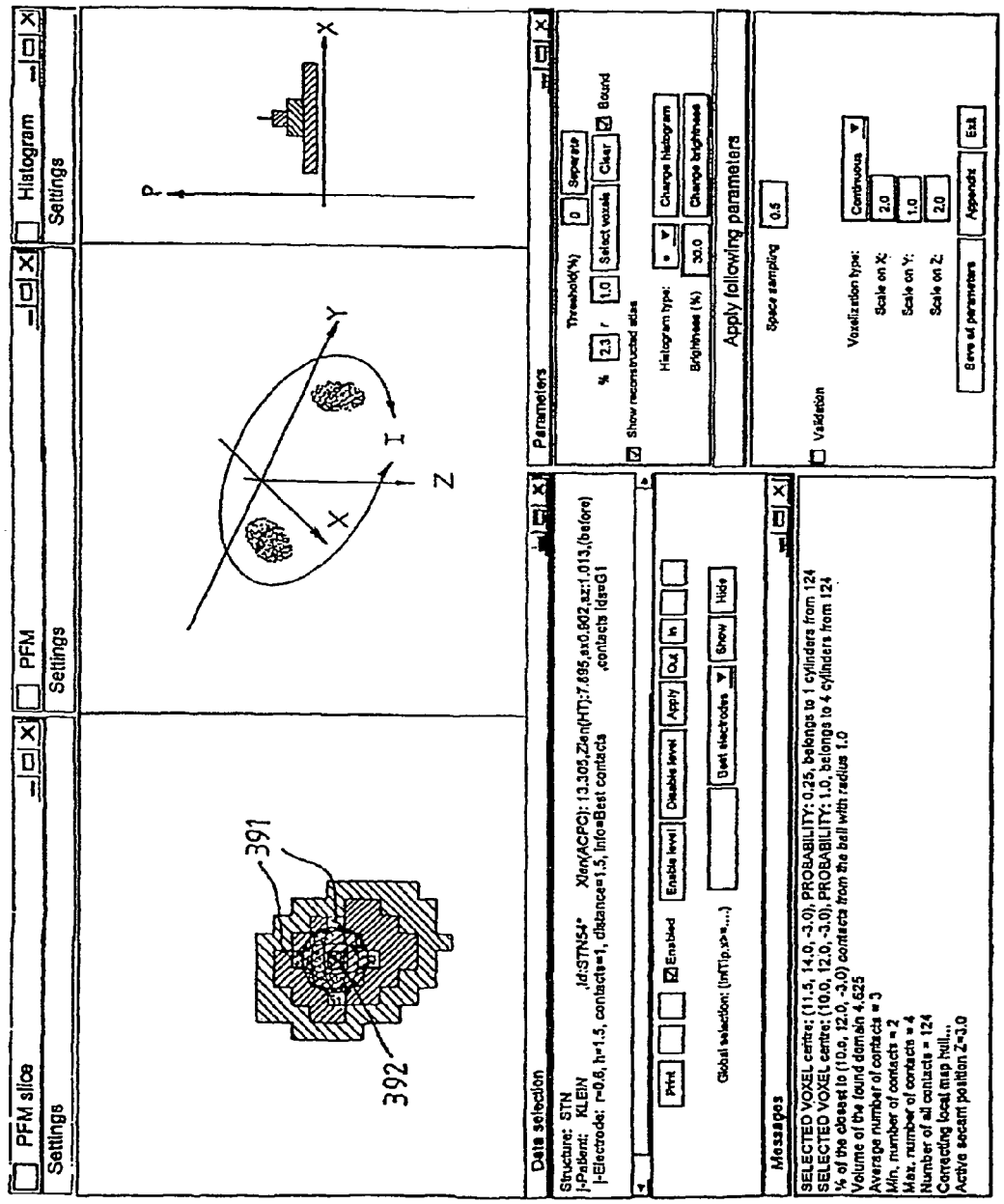
FIG. 39(a) shows synchronization between Messages, and Parameters and PFM slice windows. All voxels inside the sphere with the center in the marked voxel are selected. Window Messages displays information about the selected region and window Parameters displays the estimation of the number of active contacts (percentage of all) that are inside this sphere.
Figure 39B:
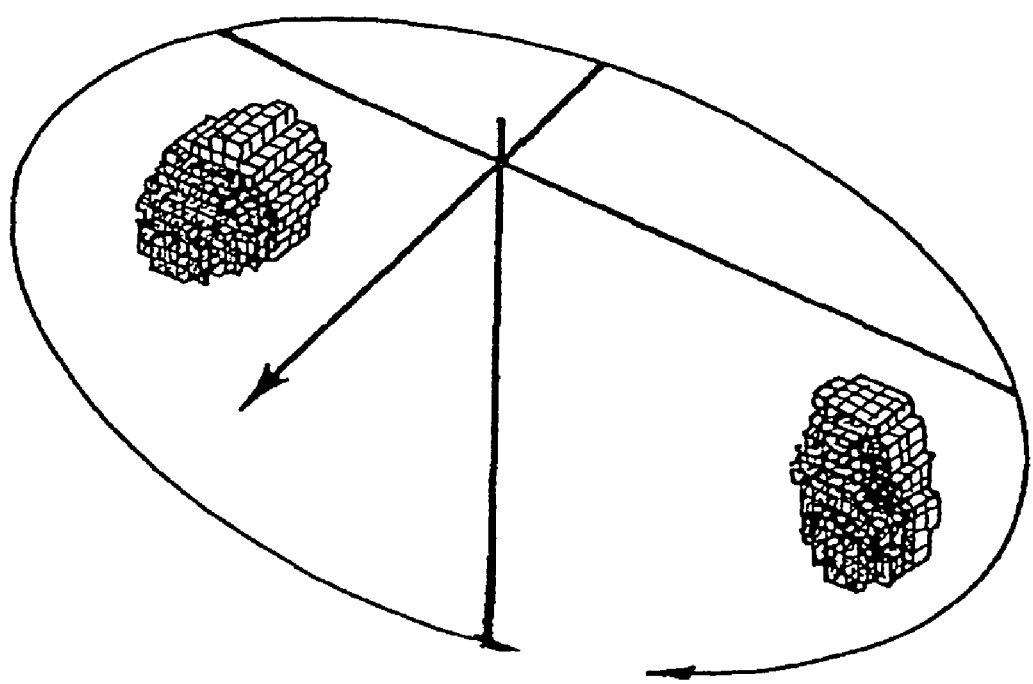
FIG. 39(b) illustrates the portion of FIG. 39(a) marked I.

FIG. 39(*a*) shows synchronization between Messages, and Parameters and PFM slice windows. All voxels inside the sphere 391 with the center in the marked voxel marked 392 are selected automatically. Window Messages displays information about the selected region and window Parameters displays the estimation of the number of active contacts (percentage of all) that are inside this sphere. The portion of FIG. 39(a) marked I is shown enlarged as FIG. 39(b).

5.2 Architecture of 2D interface

The architecture of 2D interface is obtained from the 3D interface by removing the PFM window with the 3D atlas function, and relaxing the requirements for the performance of a system on which the atlas function application runs.

6 Combination of Probabilistic Functional Maps

The method also includes combining of contact data or existing PFMs from multiple sources. Three basic scenarios are covered: two PFMs are combined (FIG. 2(a)), PFM is combined with contact data (FIG. 2(b)), or two sets of contact data are combined (FIG. 2(c)). This combination mechanism can be done recursively allowing many neurosurgeons to combine their data, create the combined probabilistic functional maps, and use them for more accurate targeting (FIG. 2(d)). This mechanism is the basis of an internet portal for stereotactic and functional neurosurgery.

6.1 Combining PFMs

When two PFMs, PFM 1 and PFM 2 are combined with atlas functions a1(x,y,z) and a2(x,y,z), respectively, the atlas function of the combined PFM is the sum of the component atlas functions. Then the following operations proceed (FIG. 2(a)):
1. Calculate a(x,y,z) as sum of a1(x,y,z) and a2(x,y,z) for each space point (x,y,z).
2. Reconstruct the atlas function; this step is optional.
3. Find probability of a given structure (as described in section 4.7.1).
4. Present the resultant PFM.

6.2 Combining PFM with Data

Figure 2A:
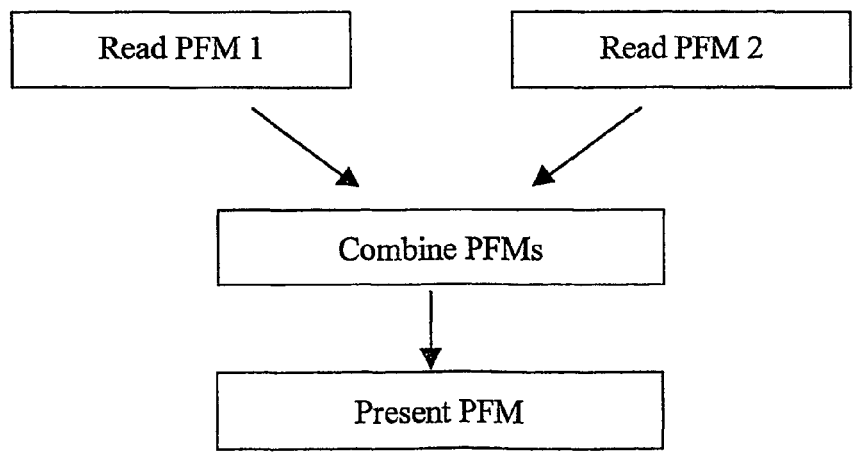
FIG. 2(a) illustrates a combination of two PFMs.
Figure 2B:
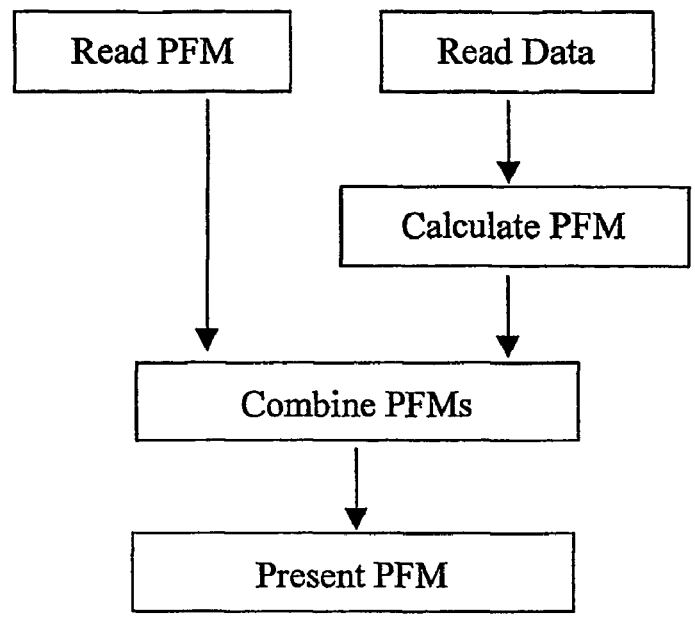
FIG. 2(b) illustrates a combination of PFM with contact data.

When PFM with atlas function a(x,y,z) and new data are combined, then the following operations proceed (FIG. 2(b)):
1. Calculate the new atlas function b(x,y,z) using a new data.
2. Combine two atlas functions, i.e., for each point (x,y,z); the resultant atlas function is equal to a(x,y,z) plus b(x,y,z).
3. Reconstruct the atlas function; this step is optional.
4. Find probability of a given structure (as described in section 4.7.1).
5. Present the resultant PFM.

6.3 Combining Two Sets of Data

Figure 2C:
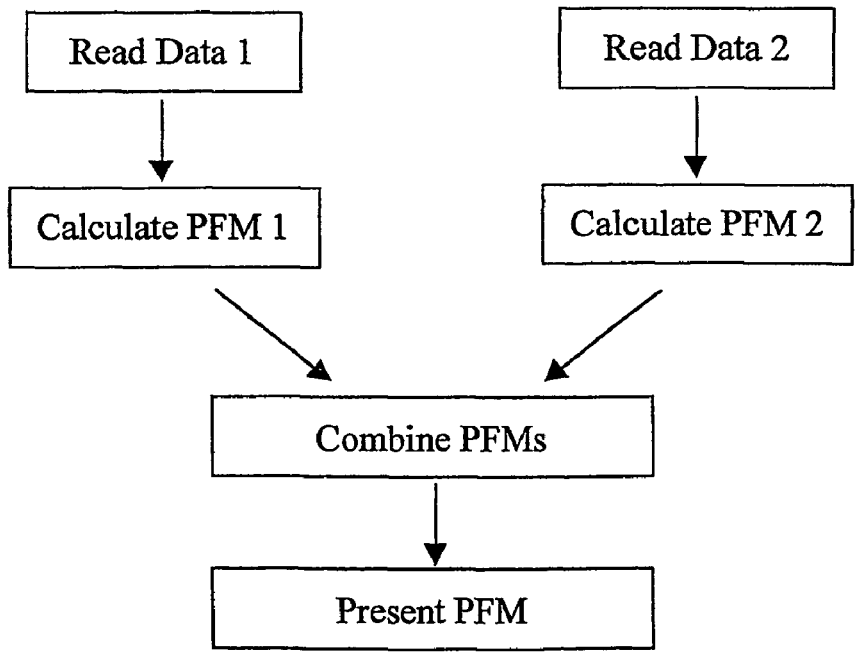
FIG. 2(c) illustrates a combination of two sets with contact data each.

When two new data Data 1 and Data 2 are combined, then the following operations proceed (FIG. 2(c)):
1. Calculate the new atlas function a1(x,y,z) using Data 1.
2. Calculate the new atlas function a2(x,y,z) using Data 2.
3. Combine two atlas functions, i.e., for each point (x,y,z) the resultant atlas function is equal to a1 (x,y,z) plus a2(x,y,z).
4. Reconstruct the atlas function; this step is optional.
5. Find probability of a given structure (as described in section 4.7.1).
6. Present the resultant PFM.

6.4 Recursive Combination

Figure 2D:
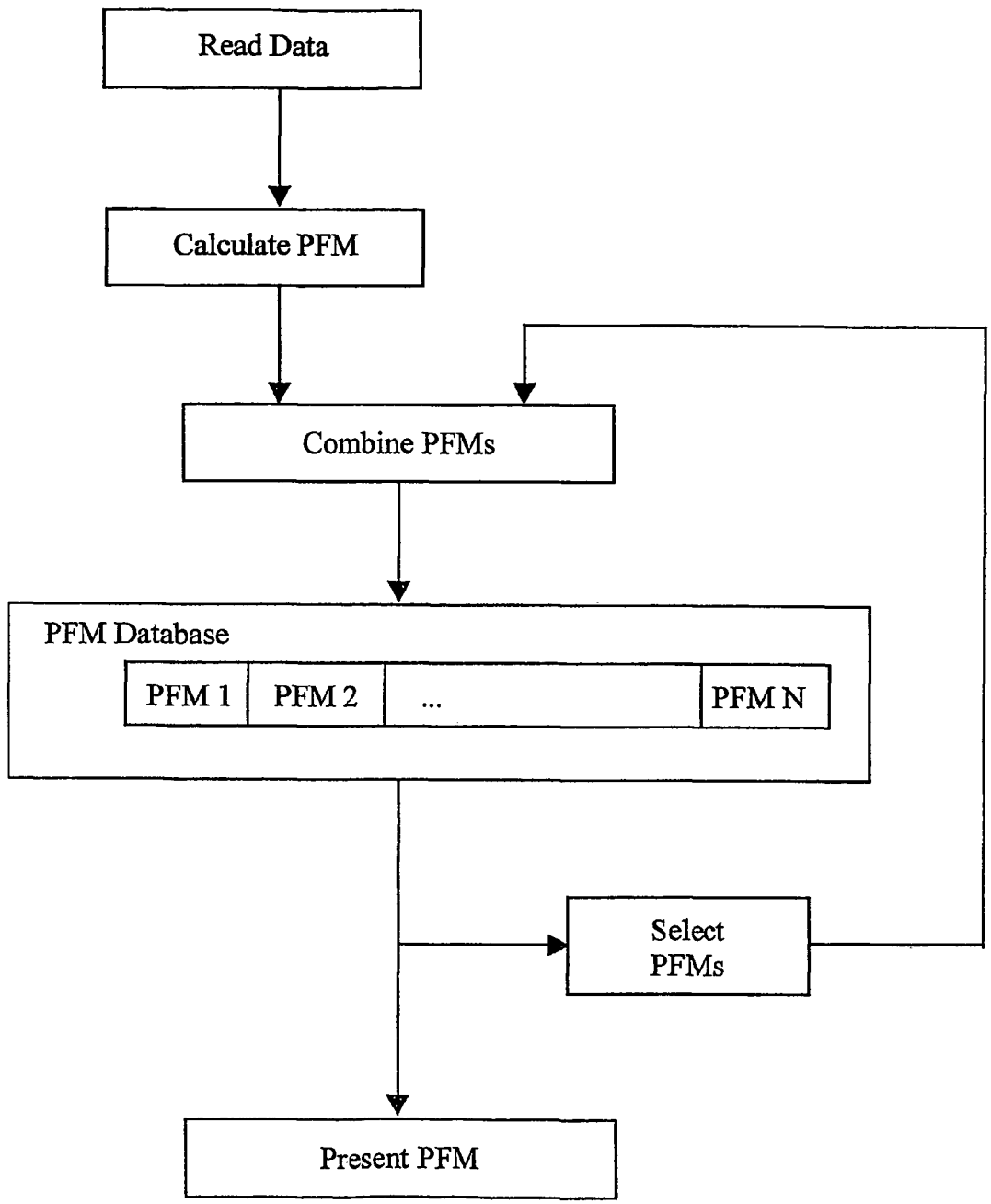
FIG. 2(d) illustrates the principle of a recursive combination of multiple PFMs with multiple sets of contact data.

When new data is combined with any PFMs available in the database, then the following operations proceed (FIG. 2(d)):
1. Calculate the new atlas function b(x,y,z) based on the new data.
2. Select a group of atlas functions a1(x,y,z), a2(x,y,z), . . . , aK(x,y,z) from the database.
3. Combine atlas functions, i.e., for each point (x,y,z); the resultant atlas function is equal to b(x,y,z)+a1(x,y,z)+a2(x, y,z)+ . . . +aK(x,y,z).
4. Reconstruct the atlas function; this step is optional.
5. Find probability of a given structure (as described in section 4.7.1).
6. Present the resultant PFM.
7. Add the new PFM to the database; this step is optional.

6.5 Combining Probabilities

When two probabilities (calculated as presented in section 4.7.1) p1(x,y,z) and p2(x,y,z) are combined, then the following operations proceed:
1. Inversing calculation of p1(x,y,z) find respective atlas function a1(x,y,z).
2. Inversing calculation of p2(x,y,z) find respective atlas function a2(x,y,z).
3. Calculate a(x,y,z) as a sum of a1(x,y,z) and a2(x,y,z) for each space point (x,y,z).
4. Reconstruct the atlas function; this step is optional.
5. Find probability of a given structure (as described in section 4.7.1).
6. Present the resultant PFM.

6.6 Best Target

For the given atlas function a(x,y,z), calculated from some existing set of contacts, the calculation of the best target for the existing and some new set of contact data is done as follows:
1. Create the new atlas function b(x,y,z) using the new set of contact data
2. Combine two atlas functions, i.e., for each point (x,y,z) the resultant atlas function is equal to a(x,y,z) plus b(x,y,z).
3. Reconstruct the atlas function; this step is optional.
4. Find the probability of a given structure.
5. Calculate the best atlas target according to a definition.
6. Present the probabilistic functional maps and the best target.

Although only a single embodiment of the invention has been explained in detail here, many variations are possible within the scope of the invention as will be clear to an expert in this field.

REFERENCES

1. Bernard W. Lindgren: *Statistical Theory*. Macmillan Publishing Co., Inc. 1976.
2. Vygodskii, M. IA (Mark Iakovlevich): *Mathematical handbook; higher mathematics* Translated from the Russian by George Yankovsky. Imprint Moscow, Mir Publishers, 1971.
3. Schalkoff R J. *Pattern Recognition: Statistical, Structural and Neural Approaches*. Wiley, New York, 1992.
4. Gass, Saul I. *Linear programming: methods and applications*. McGraw-Hill, [1994] Edition $5^{th}$.
5. James D. Foley, Andries van Dam: *Introduction to Computer Graphics*. Addison-Wesley, 1994.
6. Brian Jepson: *Java Database Programming*. John Wiley & Sons, 1997.
7. Jason Hunter, William Crawford: *Java Servlet Programming*, O'REILLY, 1998.
8. Nowinski W L, Fang A, Nguyen B T, Raphel J K, Jagannathan L, Raghavan R, Bryan R N, Miller G: *Multiple brain atlas database and atlas-based neuroimaging system*. Computer Aided Surgery, Vol. 2, No 1, 1997, 42-66.

The invention claimed is:

1. A computer-implemented method for obtaining and presenting a functional distribution of brain structures, the method comprising:
    obtaining contact data specifying the locations, within the brains of a plurality of individuals, of active electrical contacts which detect a brain structure;

generating an active contact model for each of the active contacts, wherein each active contact model represents a physical shape and/or electrical properties of one of the active contacts;

transforming the generated active contact models into a common space for the individuals;

calculating a probability function for locating the brain structure based on the obtained contact data and the transformed active contact models, said probability function indicating the space density of the active contacts; and presenting a representation of the calculated probability function.

2. A method according to claim 1 wherein said transforming includes normalizing the generated active contact models to transform said generated active contact models into the common space.

3. A method according to claim 2 in which the normalization is performed using a homeomorphism.

4. A method according to claim 1 wherein said calculating includes deriving an atlas function which, at every point in a three-dimensional region, is the number of active contact normalized models which are sensitive to a structure at that point.

5. A method according to claim 4 which includes deriving an analytic representation of the atlas function.

6. A method according to claim 5 in which the analytic representation is a set of ellipsoidal functions, where each has a centre at a mean of the atlas function defined on some cluster and semi-axial lengths determined by standard deviations and correlations of the atlas function defined on the cluster.

7. A method according to claim 4 further including smoothing the atlas function.

8. A method according to claim 4 further including using the atlas function to derive a value for each voxel of an array of voxels.

9. A method according to claim 1 further including calculating a respective atlas function for each voxel of an array of voxels, wherein said atlas function represents the number of active contacts which are sensitive to a brain structure located in or intersecting with that voxel, and wherein said calculating the probability function for locating the brain structure is based on the atlas function.

10. A method according to claim 9 in which the atlas function for each respective voxel is compensated based on a numerical factor which indicates a proportion of the corresponding voxel which is within the models of the active contacts.

11. A method according to claim 9 in which the voxels are not cubic.

12. A method according claim 1 in which the contact data is obtained from a pre-generated data file.

13. A method according to claim 1 in which the obtained data is represented as a hierarchical tree structure with levels corresponding to (i) brain structures, (ii) individuals for which each brain structure has been investigated, (iii) electrodes used for each individual and (iv) contacts on each electrode.

14. A method according to claim 1 in which at least two component probability functions are combined to generate a combined probability function, wherein the component probability functions are associated with different sets of brains.

15. A method according to claim 14 in which the component probability functions are stored as data on a website, whereby the data can be accessed for combination to generate the combined probability function.

16. A method according to claim 1 in which the model for at least one of the active contacts is substantially cylindrical.

17. A method according to claim 1 in which the probability function is calculated for each of a plurality of voxels and a graphical representation of the data includes a view generated based on the voxels.

18. A method according to claim 17 in which the graphical representation of the probability function is based on the values of the probability function at locations on a selected plane.

19. A method according to claim 17 in which the graphical representation of the probability function includes presenting a perspective view of three-dimensional regions defined using the probability function.

20. A method according to claim 19 in which the representation of the probability function includes presenting in combination a plurality of number of views resulting from different types of projections, such as perspective and orthogonal projections.

21. A method according to claim 1 in which probabilistic functional maps are presented along with radiological images and/or anatomical atlases.

22. An apparatus for obtaining and presenting a functional distribution of brain structures, the apparatus comprising:

data input means for obtaining contact data specifying the locations, within the brains of a plurality of individuals, of a plurality of active electrical contacts which detect a structure;

calculation means for using a model of each active contact representing a shape and/or electrical properties of said each active contact in a common space for the individuals, to calculate a probability function which indicates the space density of the active contacts; and presentation means for presenting a representation of the calculated probability function.

23. A computer readable medium including program instructions for executing by a computing apparatus to perform the steps of:

receiving contact data specifying the locations, within the brains of a plurality of individuals, of a plurality of active electrical contacts which detect a brain structure;

generating an active contact model for each of the active contacts, wherein each active contact model represents a physical shape and/or electrical properties of one of the active contacts;

transforming the generated active contact models into a common space for the individuals;

calculating a probability function for locating the brain structure based on the obtained contact data and the transformed active contact models, said probability function indicating the space density of the active contacts; and presenting a representation of the calculated probability function.

* * * * *

UNITED STATES PATENT AND TRADEMARK OFFICE
CERTIFICATE OF CORRECTION

PATENT NO. : 7,647,096 B2  
APPLICATION NO. : 10/477695  
DATED : January 12, 2010  
INVENTOR(S) : Nowinski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1588 days.

Signed and Sealed this

Sixteenth Day of November, 2010

David J. Kappos  
*Director of the United States Patent and Trademark Office*